(12) United States Patent
Kurtz et al.

(10) Patent No.: US 8,159,519 B2
(45) Date of Patent: Apr. 17, 2012

(54) PERSONAL CONTROLS FOR PERSONAL VIDEO COMMUNICATIONS

(75) Inventors: Andrew F. Kurtz, Macedon, NY (US); Kathleen M. Costello, Rochester, NY (US); Andrew C. Blose, Penfield, NY (US); John N. Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 1312 days.

(21) Appl. No.: 11/756,536

(22) Filed: May 31, 2007

(65) Prior Publication Data

US 2008/0297586 A1   Dec. 4, 2008

(51) Int. Cl.
*H04N 7/14* (2006.01)
(52) U.S. Cl. ............... 348/14.01; 348/14.08; 348/14.12
(58) Field of Classification Search .... 348/14.01–14.16, 348/142–143
See application file for complete search history.

(56) References Cited

U.S. PATENT DOCUMENTS

| | | | |
|---|---|---|---|
| 3,495,908 A | 2/1970 | Rea | |
| 4,928,301 A | 5/1990 | Smoot | |
| 4,987,492 A | 1/1991 | Stults et al. | |
| 5,194,955 A | 3/1993 | Yoneta et al. | |
| 5,438,357 A | 8/1995 | McNelley | |
| 5,572,248 A | 11/1996 | Allen et al. | |
| 5,639,151 A | 6/1997 | McNelley et al. | |
| 5,777,665 A | 7/1998 | McNelley et al. | |
| 5,867,209 A * | 2/1999 | Irie et al. | 348/14.15 |
| 5,999,207 A | 12/1999 | Rodriguez et al. | |
| 6,160,573 A | 12/2000 | Allen et al. | |
| 6,243,130 B1 | 6/2001 | McNelley et al. | |
| 6,275,251 B1 | 8/2001 | Hartman et al. | |
| 6,400,903 B1 | 6/2002 | Conoval | |
| 6,454,414 B1 | 9/2002 | Ting | |
| 6,611,281 B2 | 8/2003 | Strubbe | |
| 6,710,797 B1 | 3/2004 | McNelley et al. | |
| 6,771,303 B2 | 8/2004 | Zhang et al. | |
| 6,888,562 B2 | 5/2005 | Rambo et al. | |
| 6,894,714 B2 | 5/2005 | Gutta et al. | |
| 6,901,448 B2 | 5/2005 | Zhu et al. | |
| 7,015,594 B2 | 3/2006 | Asada | |
| 7,023,464 B1 * | 4/2006 | Harada et al. | 348/14.01 |

(Continued)

OTHER PUBLICATIONS

Debby Hindus et al., "Casablanca: Designing Social Communication Devices for the Home", Interval Research Corporation, Proceedings SIGCHI'01, Mar. 31-Apr. 4, 2001, ACM 1-58113-327-08/01/0003, pp. 325-332.

(Continued)

*Primary Examiner* — Melur Ramakrishnaiah
(74) *Attorney, Agent, or Firm* — Roland R. Schindler, II

(57) ABSTRACT

Video communication systems and methods for operating the same are provided with the method determining privacy settings for a video communication event; establishing a video communication link with a video communication system at a remote site; capturing video images of a field of view of at least one image capture device; determining a video context based at least in part upon a determined contextual classification for the communication event; analyzing the captured video images to identify privacy sensitive areas in the captured video images, using a scene analysis algorithm which examines a content of the video images and image context characteristics of the video images based upon the determined privacy settings; modifying the image characteristics in identified privacy sensitive image areas of captured video images, to control the image and image context characteristics to an extent consistent with the determined privacy settings; and transmitting the modified video images.

22 Claims, 21 Drawing Sheets

U.S. PATENT DOCUMENTS

| | | | |
|---|---|---|---|
| 7,034,866 | B1 | 4/2006 | Colmenarez et al. |
| 7,048,386 | B2 | 5/2006 | Buchner |
| 7,409,045 | B2 * | 8/2008 | Naidoo et al. ............... 379/37 |
| 2002/0008758 | A1 * | 1/2002 | Broemmelsiek et al. ..... 348/143 |
| 2003/0218672 | A1 | 11/2003 | Zhang et al. |
| 2004/0140973 | A1 | 7/2004 | Zanaty |
| 2004/0150712 | A1 | 8/2004 | LePennec |
| 2004/0196360 | A1 | 10/2004 | Hillis et al. |
| 2004/0257431 | A1 | 12/2004 | Girish et al. |
| 2005/0024484 | A1 | 2/2005 | Leonard et al. |
| 2005/0024489 | A1 | 2/2005 | Fredlund et al. |
| 2005/0041840 | A1 | 2/2005 | Lo |
| 2005/0128332 | A1 | 6/2005 | Tsuboi |
| 2005/0146598 | A1 | 7/2005 | AbiEzzi et al. |
| 2006/0007222 | A1 | 1/2006 | Uy |
| 2006/0075448 | A1 | 4/2006 | McAlpine et al. |
| 2007/0120968 | A1 * | 5/2007 | Krisbergh et al. ......... 348/14.09 |
| 2007/0126859 | A1 * | 6/2007 | Choi et al. ................ 348/14.02 |
| 2007/0186002 | A1 * | 8/2007 | Campbell et al. ............ 709/231 |

OTHER PUBLICATIONS

Cisco Systems, "Cisco Telepresence 3000", 2006, pp. 1-5, www.cisco.com/go/telepresence.

Carman Neustaedter and Saul Greenberg, "The Design of a Context-Aware Home Media Space for Balancing Privacy and Awareness", University of Calgary, Proceedings of the Fifth International Conference on Ubiquitous Computing (UbiComp 2003), pp. 1-18.

Digital Video Enterprises, Inc., Telepresence Products, 2006, pp. 1-6, www.dvetelepresence.com.

Claudio Pinhanez, "The Everywhere Displays Projector: A Device to Create Ubiquitous Graphical Interfaces", IBM Thomas Watson Research Center, Proceedings of Ubiquitous Computing 2001, pp. 1-18.

Emmanuel Munguia Tapia et al., "Concept and Partial Prototype Video: Ubiquitous Video Communication with the Perception of Eye Contact", Massachusetts Institute of Technology, Proceedings of UBICOMP 2003, pp. 1-2.

Ken Go et al., "Familyware: Communicating with Someone You Love", Yamanashi University, Japan, Proceedings of the IFIP HOIT Conference, HOIT 2000, pp. 1-10.

Apple Inc., iChat AV Videoconferencing, Mar. 2007, pp. 1-4, www.apple.com.

Xavier L.C. Brolly et al., "Model-Based Head Pose Estimation for Air-Traffic Controllers", NASA Ames Research Center, California, pp. 1-4.

Polycom Inc., "Polycom RealPresence Experience High Definition (RPX™ HD)", 2007, pp. 1-6.

Thomas Vetter, "Synthesis of Novel Views from a Single Face Image", Max-Planck-Institut, Germany, Feb. 1996, pp. 1-13, www.mpik-tueb.mpg.de/projects.techreport.list.html.

Robert S. Fish et al., "The VideoWindow System in Informal Communications", Proceedings of the 1990 ACM conference on Computer-supported cooperative work, pp. 1-11, Oct. 1990.

WebEx Communications Inc., WebEx Capabilities, 2005, pp. 1-16, www.webex.com.

* cited by examiner

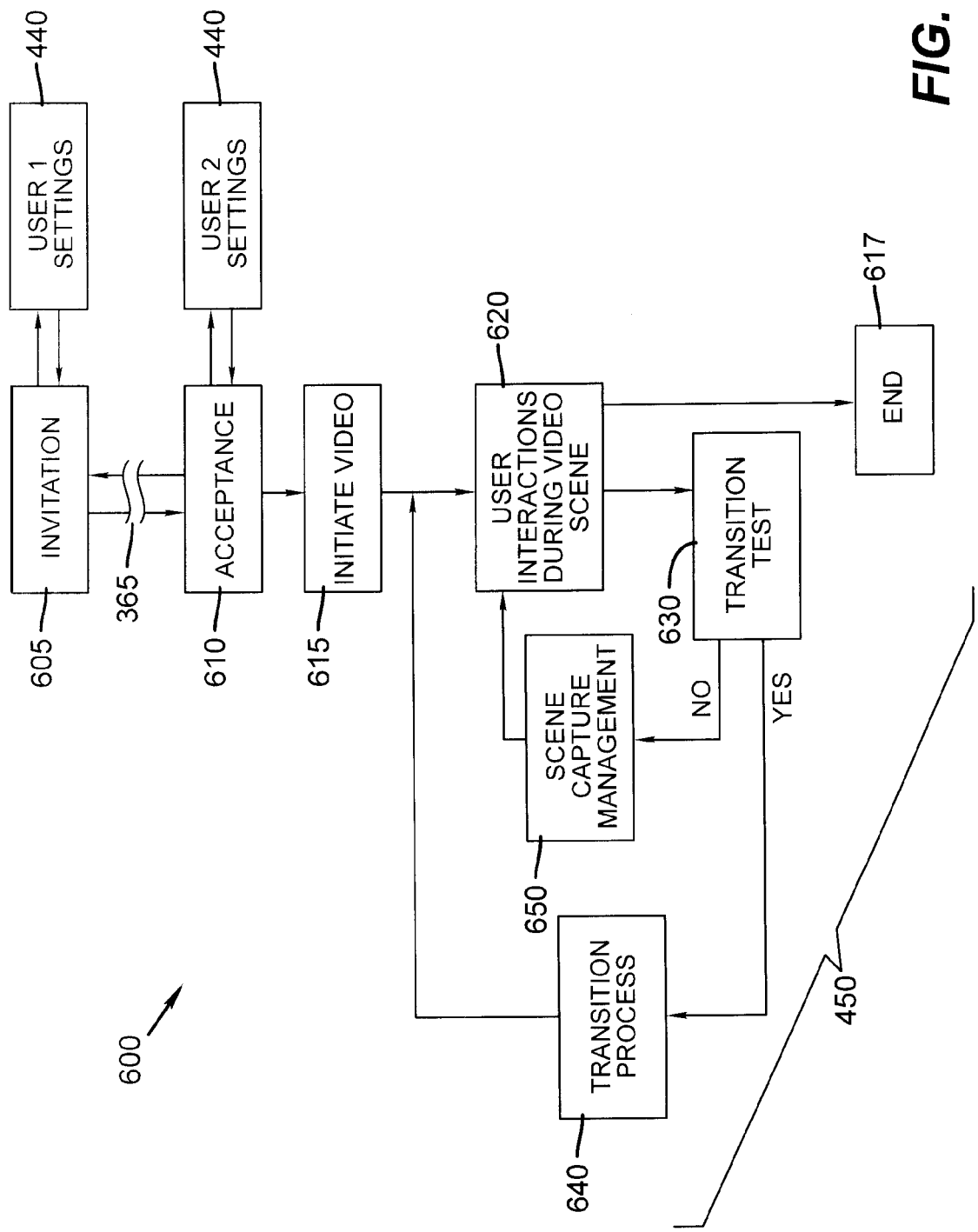

PERSONAL CONTROLS FOR PERSONAL VIDEO COMMUNICATIONS

CROSS REFERENCE TO RELATED APPLICATIONS

This application is related to U.S. Ser. No. 11/756,532, filed May 31, 2007, entitled A RESIDENTIAL VIDEO COMMUNICATION SYSTEM in the name of Kurtz et al.; U.S. Ser. No. 11/756,563 filed May 31, 2007, entitled MANAGING SCENE TRANSITIONS FOR VIDEO COMMUNICATIONS, in the name of Kurtz et al.; U.S. Ser. No. 11/756,562, filed May 31, 2007, entitled MULTI-CAMERA RESIDENTIAL COMMUNICATION SYSTEM, in the name of Kurtz et al., and U.S. Ser. No. 11/756,575, filed May 31, 2007, entitled EYE GAZE IMAGING FOR VIDEO COMMUNICATIONS in the name of Kurtz et al. all filed concurrently herewith.

Reference is also made to commonly-assigned copending U.S. patent application Ser. No. 11/555,822, filed Nov. 2, 2006, entitled "An Integrated Display Having Multiple Capture Devices", by Kurtz et al., the disclosure of which is incorporated herein.

FIELD OF THE INVENTION

The present invention relates to communication systems that enable video communications between remote and local participants. This video communication system is particularly intended for use in the residential environment, where a variety of factors, such as variable conditions and participants, ease of use, privacy concerns, and system cost, are highly relevant.

BACKGROUND OF THE INVENTION

The concept of the video-telephone has long been anticipated, including in the serialized novel "Tom Swift and His Photo Telephone" (1914). The first working videophone system was exhibited by Bell Labs at the 1964 New York World's Fair. AT&T subsequently commercialized this system in various forms, under the Picturephone brand name. However, the Picturephone had very limited commercial success. Technical issues, including low resolution, lack of color imaging, and poor audio-to-video synchronization affected the performance and limited the appeal. Additionally, the Picturephone imaged a very restricted field of view, basically amounting to a portrait format image of a participant. This can be better understood from U.S. Pat. No. 3,495,908, by W. Rea, which describes a means for aligning a user within the limited capture field of view of the Picturephone camera. Thus, the images were captured with little or no background information, resulting in a loss of context. Moreover, the Picturephone's only accommodation to maintaining the user's privacy was the option of turning off the video transmission.

In the modern world, two-way video communications are now enabled by various technologies. As a first example, cellular phones, including phone-cameras, are widely used. While currently many cell phones include cameras for capturing still images, most cell phones still lack live video capture and display capability. However, companies such as Fotonation Ltd. (Ireland) are enabling new technologies for live video phone-cameras, such as face detection and recognition, as well as face tracking, which could enhance the user experience. As an example, U.S. Patent Publication 2005/0041840 by J. H. Lo describes a camera phone with face recognition capability. While phone-cameras are easy to use, highly mobile, and have arguably become essential for modern life, the size and cost structure constraints limit their applicability for some uses.

Another realization of a device with these general capabilities is the "web-cam", where a computer, such as a lap-top unit, is equipped with a camera that often has pan, tilt, and zoom capabilities. Companies such as Creative Laboratories (Singapore) and Logitech (Switzerland) presently offer enhanced cameras as computer accessories for web-camera use. These web-cameras can have enhanced audio-capture capability, movement detection, face tracking, and other value-adding features. As an example, U.S. Patent Publication 2006/0075448 by McAlpine et al., describes a system and method for mechanically panning, tilting, and/or zooming a webcam to track a user's face.

Apple Inc. (Cupertino, Calif. U.S.A.) has further extended the web-camera, with the "iSight" and "iChat" products, where the camera is integrated into a lap-top computer, and onboard image processing automatically adjusts the white balance, sharpness, color, focus and exposure and filters out noise to ensure that the transmitted picture provides bright, focused, and true-color imagery. The "iChat" function enables one-to-one chat, multi-way chat, or audio chat with up to ten people. While these video-camera-computer systems are enabling internet-based video-telephony, these technologies have not become ubiquitous like the cell phone has. Certainly, the differential increased cost and size are reasons for this. However, there are many issues related to the user experience with the web-camera that have not yet been adequately addressed. In particular, these systems are not fully optimized for easy use in dynamic environments, such as the home. To accomplish this, technology improvements around the user interface, image-capture, and privacy factors may be needed.

Notably, WebEx Communications (Santa Clara, Calif. U.S.A.) has adapted web-camera technology for the purpose of providing inexpensive web-based video-conferencing for conducting meetings, training sessions, webinars, for providing customer support, and for other business purposes. WebEx delivers applications over a private web-based global network purpose-built for real-time communications. Security is provided on multiple levels, to control attendee access and privileges, the ability to save or print documents, and to provide desktop privacy. Network security features include authentication, meeting and document encryption, intrusion control, and non-persistent data (data not stored on WebEx servers). An exemplary patent, U.S. Pat. No. 6,901,448, by Zhu et al., describes methods for secure communications system for collaborative computing. However, the WebEx approach, while useful, does not anticipate the concerns people have when communicating by video on a personal basis.

As another alternative to the phone-camera or the web-cam, a video-phone having a larger screen, a more functional camera with zoom and tracking capability, enhanced audio, and multi-user capability, could provide an enhanced user experience. Such enhanced video-phone devices could be used in the home, office, or school environments, where mobility can be compromised for improved capture and display capabilities. Most simply, such a system could combine a camera and a television, and use a phone or Internet connection to transfer information from one location to another. U.S. Patent Publication 2005/0146598 by AbbiEzzi et al., describes a basic home teleconferencing system with this construction. This system indeed contains the basic image capture and display elements for a residential teleconferencing system. Like the web-cameras, the system can capture and display a large field of view, which improves on the contextual capture over the original Picturephone. However, there are many aspects of residential video-telephony, relative to managing privacy and personal context in a dynamic residential environment that this system does not anticipate.

A system described in U.S. Pat. No. 6,275,258 by N. Chim provides an enhanced teleconferencing system, which may have residential use, wherein multiple microphones are used to enable enhanced subject tracking using audio signals. The Chim '258 system also improves the eye contact aspects of the user experience, by locating the camera behind the display. In particular, Chim '258 has an enhanced tracking process, which employs multiple microphones to localize and track individuals in their local environment. An audio processor derives an audio tracking signal, which is used to drive a camera to follow an individual. The field of view captured by the camera can be optimized, by both mechanical movement (pan, tilt, and zoom) and image cropping, to follow and frame an individual in their environment. The camera may be hidden behind the display, to improve the perception of eye contact, by capturing direct-on (to the screen) images of the local individuals for display to the remote viewers. While Chim '258 suggests that this system might be used in a residential environment, in most respects, the system is really targeted for the corporate conference room environment, as the privacy and context management aspects are underdeveloped.

As another approach to video communications, enhanced video-telephony has been realized by video-conferencing equipment, which is largely targeted for the corporate market. As an example, companies such as Cisco Systems (San Jose, Calif. U.S.A.); Digital Video Enterprises (Irvine, Calif. U.S.A.); Destiny Conferencing (Dayton, Ohio, U.S.A.); and Teleris (London, United Kingdom), are offering enhanced video-teleconferencing equipment targeted for use by corporate executives. Exemplary teleconferencing prior art patents associated with some of the above companies include U.S. Pat. No. 5,572,248 and U.S. Pat. No. 6,160,573 both by Allen et al., and U.S. Pat. No. 6,243,130 and U.S. Pat. No. 6,710,797, both by McNelley et al. The product offerings of these companies emphasize image and sound fidelity, environmental aesthetics and ergonomics, eye contact image capture and display, and the seamless and secure handling of large data streams through networks. For example, improved eye contact is typically achieved by hiding a camera behind a screen or beam splitter, through which it unobtrusively peers.

Although video-conferencing systems are designed to handle multiple participants from multiple locations, the systems are optimized for use in highly controlled environments, rather than the highly variable environments typical to personal residences or schools. In particular, these systems assume or provide standard conference rooms with a central table, or more elaborate rooms, with congress-like seating. As image capture occurs in structured environments with known participants behaving in relatively formalized ways, these conference systems are not enabled with capabilities that could be desired in the dynamic personal environments. These systems can also be equipped to extract the images of the local participants from their contextual backgrounds, so that when the image of that participant is seen remotely, the image appears contextually in the remote environment or in a stylized virtual environment. As with the WebEx technologies, privacy and security are considered relative to the access and transferal of data across a network. As an example, the patent application U.S. 2004/0150712 by Le Pennec, describes an approach for establishing secure videoconferences between multiple nodes, which uses at least three encryption devices, including link-unique encryption keys, a secure interface connecting the encryption keys, and a secure data archive to hold the link-unique encryption keys. Additionally, the cost of teleconferencing systems is often in excess of $100,000, which is not supportable by the residential market.

It is noted that some enhanced teleconferencing systems, which are adaptive to multi-person conversational dynamics, have been anticipated. In particular, a series of patents, including U.S. Pat. No. 6,894,714 by Gutta et al., and U.S. Pat. No. 6,611,281 and U.S. Pat. No. 6,850,265, both by Strubbe et al., which are all assigned to Philips Electronics (Eindhoven, Netherlands), suggest methods for teleconferencing under dynamic circumstances. As a first example, the Strubbe et al. '281 patent proposes a video-conferencing system having a video locator and an audio locator whose output is used to determine the presence of all participants. In operation, the system focuses on a person who is speaking and conveys a close-up view of that person based on the video and audio locator outputs. Thereafter, if the person speaking continues to speak or becomes silent for a predetermined time period, the system operates to adjust the camera setting to display other participants in sequence who are not speaking, or it zooms out the camera by a specified amount to include all participants. The system is also configured to capture a new person entering or an existing participant exiting the videoconference session. The videoconference scenario of FIG. 2 of the Strubbe et al. '281 patent, which depicts a conference room like setting with participants sitting around a table, does seem particularly suited to handling a formal or semi-formal corporate meeting event, where the various participants are of relatively equal status, and certain amount of decorum or etiquette can be expected. In such circumstances, the formalism of capturing and transmitting the non-speaking participants in sequence could be applicable and appropriate.

The Strubbe et al. '265 and Gutta '714 patents basically expand upon the concepts of the Strubbe et al. '281 patent, by providing adaptive means to make a videoconferencing event more natural. In the Strubbe et al. '265 patent, the system applies a set of heuristic rules to the functionality provided by the camera, the audio locator, and the video locator. These heuristic rules attempt to determine whether the system should follow a current speaker or a switch to a new speaker. Various factors, such as time gaps between speakers, and 5-degree co-location thresholds are measured and assessed against confidence level estimations to determine whether the system should switch to another individual or switch to wide field of view image capture. The Gutta '714 patent extends the concepts of dynamic videoconferencing further, as it identifies a series of behavioral cues from the participants, and analyzes these cues to predict, and then pro-actively make a seamless transition in shifting the video-capture from a first speaker to a second speaker. These behavioral cues include acoustic cues (such as intonation patterns, pitch and loudness), visual cues (such as gaze, facial pose, body postures, hand gestures and facial expressions), or combinations of the foregoing, which are typically associated with an event. As depicted in the respective FIG. 1 of each patent, these patents basically anticipate enhanced video-conferencing appropriate for the conference room or for congress-like seating arrangements, where there is little movement or change of the participants. These patents also seem particularly suited to handling a formal or semi-formal corporate meeting event, where the various participants are of relatively equal status, and certain amount of decorum or etiquette can be expected. Although the Gutta '714 suggests broader applicability, and modestly anticipates (see Col. 11 table) a situation with a child present, the systems proposed in the Strubbe et al. '281, Strubbe et al. '265, and Gutta '714 patents are not targeted to the residential environment. Thus, they are not sufficiently adaptive to residential dynamics, and the privacy and context management aspects are underdeveloped.

U.S. Patent Publication No. 2004/0257431, by Girish et al., entitled "Video Conferencing Apparatus and Method", describes a video conferencing system that has a few features to enable a user to preserve their privacy. In particular, the Girish et al. '431 disclosure provides a hard-wired indicator light to signal that video capture and audio capture are enabled. Girish et al. '431 also provides an audio mute control and a mechanical iris (with an iris cap) in front of the camera to provide further visual confirmation that the video capture is disabled. Girish et al. '431 is particularly concerned with the potential circumstance of an inadvertent video transmission during a video communication event, in which a network link is established and image transmission is occurring without the local users knowledge. However, the Girish et al. '431 approach does not provide a sufficiently versatile approach for a user control the privacy of their environment, or for themselves or others (such as family members). This system also lacks contextually interpretive controls and features that would be useful in a residential environment.

Teleconferencing or enhanced video communications has also been explored for the office and laboratory environments, as well as the conference room environment, to aid collaboration between colleagues. The first such example, the "media space", which was developed in the 1980's at the Xerox Palo Alto Research Center, Palo Alto, Calif. U.S.A., provided office-to-office, always-on, real-time audio and video connections. As a related example, the "VideoWindow", described in "The VideoWindow System in Informal Communications", by Robert S. Fish, Robert E. Kraut, and Barbara L. Chalfonte, in the Proceedings of the 1990 ACM conference on Computer-Supported Cooperative Work, provided full duplex teleconferencing with a large screen, in an attempt to encourage informal collaborative communications among professional colleagues. Although such systems enabled informal communications as compared to the conference room setting, these systems were developed for work use, rather than personal use in the residential environment, and thus do not anticipate residential concerns.

Prototype home media spaces, for facilitating communications between a telecommuter and in-office colleagues have also been developed. For example, an always-on home media space is described in "The Design of a Context-Aware Home Media Space for Balancing Privacy and Awareness", by Carman Neustaedter and Saul Greenberg, in the Proceedings of the Fifth International Conference on Ubiquitous Computing (2003). The authors recognize that personal privacy concerns are much more problematic for home users than for office based media spaces. As the paper discusses, privacy encroaching circumstances can arise when home users forget that the system is on, or other individuals unwarily wander into the field of view. The described system reduces these risks using a variety of methods, including secluded home office locations, people counting, physical controls and gesture recognition, and visual and audio feedback mechanisms. However, while this system is located in the home, it is not intended for personal communications by the residents. As such, it does not represent a residential communication system that can adapt to the personal activities of one or more individuals, while aiding these individuals in maintaining their privacy.

Thus, there is a remaining need and opportunity, which is not anticipated in the prior art, for residentially targeted system that is generally useful for aiding family video-conferencing or video communications with one or more remote individuals. Such a system should function as seamlessly as is reasonably possible while being adaptable to the dynamic situations present in a residence. In particular, the system should enable the users to readily manage and maintain their privacy, relative at least to image capture, recording, and transmission. This system should also manage the contextual information of the user and their environments, to provide an effective communication experience.

SUMMARY OF THE INVENTION

A video communication system and methods for operating a video communication system are provided. In one aspect, a method is provided for operating a video communication system at a local site, the method comprising the steps of: determining privacy settings for a video communication event; establishing a video communication link with a video communication system at a remote site; capturing video images of a field of view of at least one image capture device; and determining a video context based at least in part upon a determined contextual classification for the communication event.

The captured video images are analyzed to identify privacy sensitive areas in the captured video images, using a scene analysis algorithm which examines a content of the video images and image context characteristics of the video images based upon the determined privacy settings. The image characteristics in identified privacy sensitive image areas of captured video images, are modified to control the image and image context characteristics shared with the remote viewer, to an extent consistent with the determined privacy settings; and transmitting the modified video images to the remote site.

BRIEF DESCRIPTION OF THE DRAWINGS

FIGS. 7A, 7B, 7C, and 7D depict flow diagrams describing aspects of various methods;

DETAILED DESCRIPTION OF THE INVENTION

The quality of video teleconferencing or video telephony is loosely described today by the term "telepresence", which has been defined as the experience or impression of being present at a location remote from one's own immediate environment. This term has been particularly applied to corporate teleconferencing, relative to enabling teams who cannot be together, work together. The video-conferencing systems that provide eye-contact life size images of the remote participants, with the remote background extracted, such that the remote participants appear as if they are in the local environment, are perhaps an idealized implementation of a telepresence system. However, in some sense, the telepresence concept is a misnomer, as the various controls and tools, including camera zoom, can create an artificial experience, which is in some respects equivalent to "better than being there".

While the telepresence concept may be useful for residential video-telephony, it is not necessarily an optimal approach for residential use. Thus in particular, the systems, devices, and methods described herein can be used to address the need for improved systems for residential video communications from one or more local participants to one or more remote participants. The key functional attributes of various embodiments of the video communication system described herein can include any of the following but are not limited thereto:

- It can have an image display device, which may be sized for portability.
- It can have one or more image capture devices that acquire video images, and which enable both wide field of view (WFOV) and narrow field of view (NFOV) image capture.
- It can have an audio subsystem having both an audio emission device and an audio capture device.
- It can have a privacy interface for managing the privacy of the local scene, including the individuals therein.
- It can have a contextual interface for managing the image capture of the local scene and the individuals therein. The contextual interface complements the privacy interface, but can also provide other useful functions.
- It can be enabled by individual identification (keyed, face recognition, audio recognition, for example)

Figure 1:
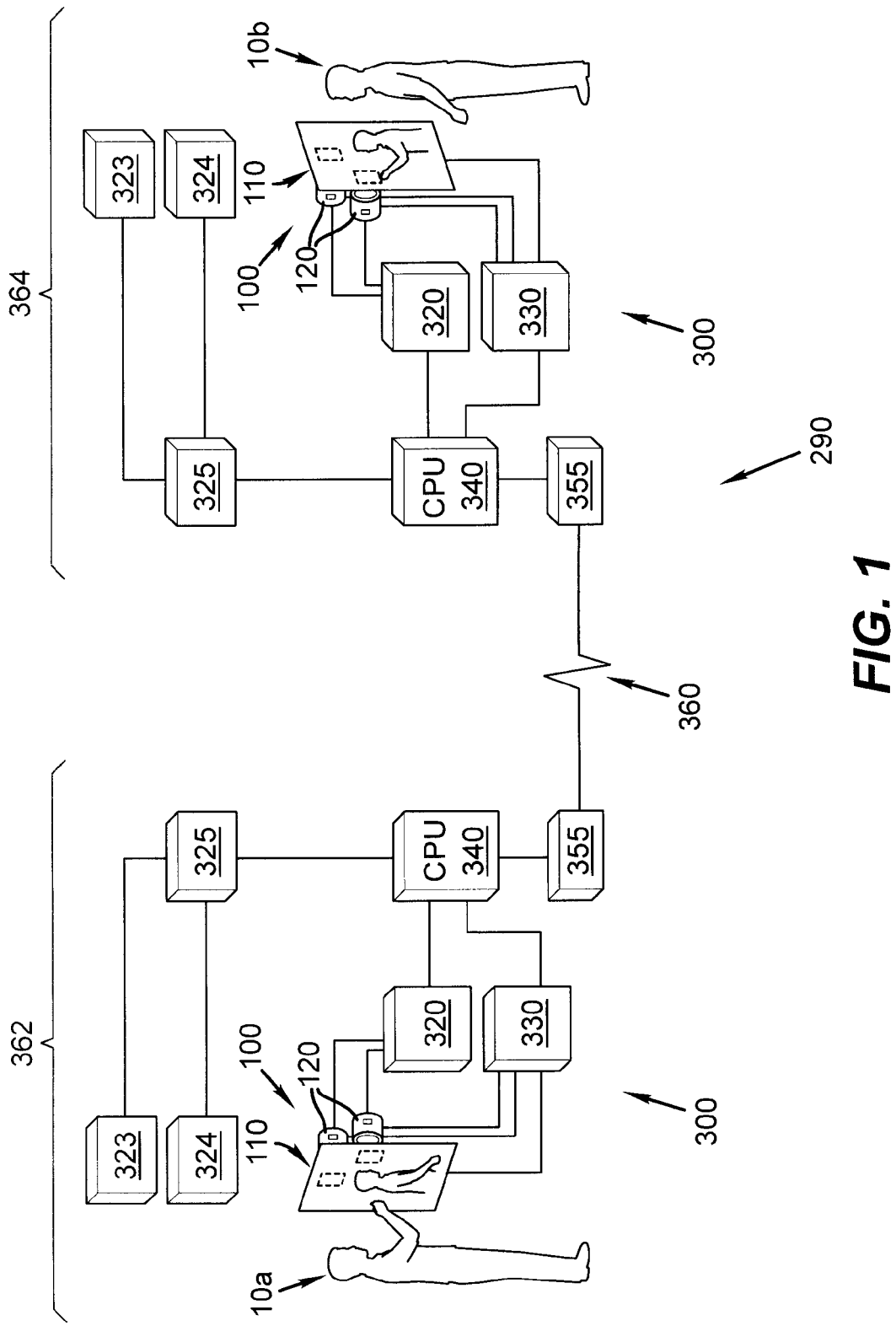
FIG. 1 is an overall system figure depicting a local system linked to a remote system over a network.

The block diagram of FIG. 1 shows one embodiment of such a two-way video communications system 290 having a video communication device 300 located at a local site and a video communication device 300 at a remote site. In the illustrated embodiment, communication devices 300 have an electronic imaging device 100, including a display 110 and an image capture device 120 for communication between a viewer 10a at a first site 362 and a viewer 10b at a second site 364. Each device 300 manages the capture, processing, transmission or receipt of video images across a network 360, subject to handshake protocols, privacy protocols, and bandwidth constraints. The network 360, which can be supported by remote servers (not shown), connects two sites 362 and 364, each of which has a system 300. Each viewer 10a, 10b has an electronic imaging device 100 comprising a display 110 with one or more image capture devices 120. A computer (or control logic processor (CPU)) 340 coordinates control of an image processor 320 and a system controller 330 that provides display driver and image capture control functions. System controller 330 can be integrated into computer 340 or not as desired. Computer 340 is nominally located locally, at a communication device 300 located at a given site for example local site 362, but some portions of functions can be located remotely at a remote server in system 290 or at a communication device 300 at remote site 364. Controller 330 can provide commands to an image capture device 120, controlling the camera view angle, focus, or other characteristics. A communications controller 355 acts as interface to a communication channel, such as a wireless or wired network channel, for transferring image and other data from one site to the other.

The two-way video communication system 290 is intended to advantageously support video conferencing or video-telephony, particularly from one residential location to another. During a video communication event (600), comprising one or more video scenes (620), a system typically transmits both local video signals and local audio signals to the remote site and receives remote video and remote audio signals from the remote site. As would be expected, a local viewer 10a at a first site 362 is able to see a remote viewer 10b (located at a second site 364) as an image displayed locally on display 110, thereby enhancing human interaction for teleconferencing. Image processor 320 can provide a number of functions to facilitate two-way communication, including improving the quality of image capture at the first site 362, improving the quality of images displayed at the local display 110, and handling the data for remote communication (by improving the image quality, data compression, encryption, etc.). It must be noted that FIG. 1 shows a general arrangement of components that serve an embodiment. Image capture devices 120 and display 110 can be assembled into a single frame or housing (not shown) as part of the integration for device 300. This device housing can also include other components for device 300 at site 362 or 364, such as image processor 320, communications controller 355, computer 340, and system controller 330.

As is also shown in FIG. 1, video communication system 300 also comprises an audio capture device 322 and an audio emission device 324 that are connected to an audio system processor 325, which, in turn is connected to computer 340. In the embodiment illustrated, audio capture device 325 comprises at least one microphone 323 such as omni-directional or directional microphone or other devices that can perform the function of converting sonic energy into a form that can be converted by audio processing circuit 325 into signals that can be used by computer 340 and can also include any other audio communications and other support components known to those skilled in the audio communications arts. Audio emission device 324 can comprise a speaker or any form of device known that is capable of generating sonic energy in response to signals generated by audio processor and can also include any other audio communications and other support components known to those skilled in the audio communications arts. Audio processor 325 can be adapted to receive signals from computer 340 and to convert these signals, if necessary, into signals that can cause audio emission device 324 to generate sound and/or other forms of sonic energy such as ultrasonic carrier waves for directional sonic energy. It will be appreciated that any or all of audio capture device 323, audio emission device 324, audio processor 325 or computer 340 can be used alone or in combination to provide enhancements of captured audio signals or emitted audio signals, including amplification, filtering, modulation or any other known enhancements.

Figure 2:
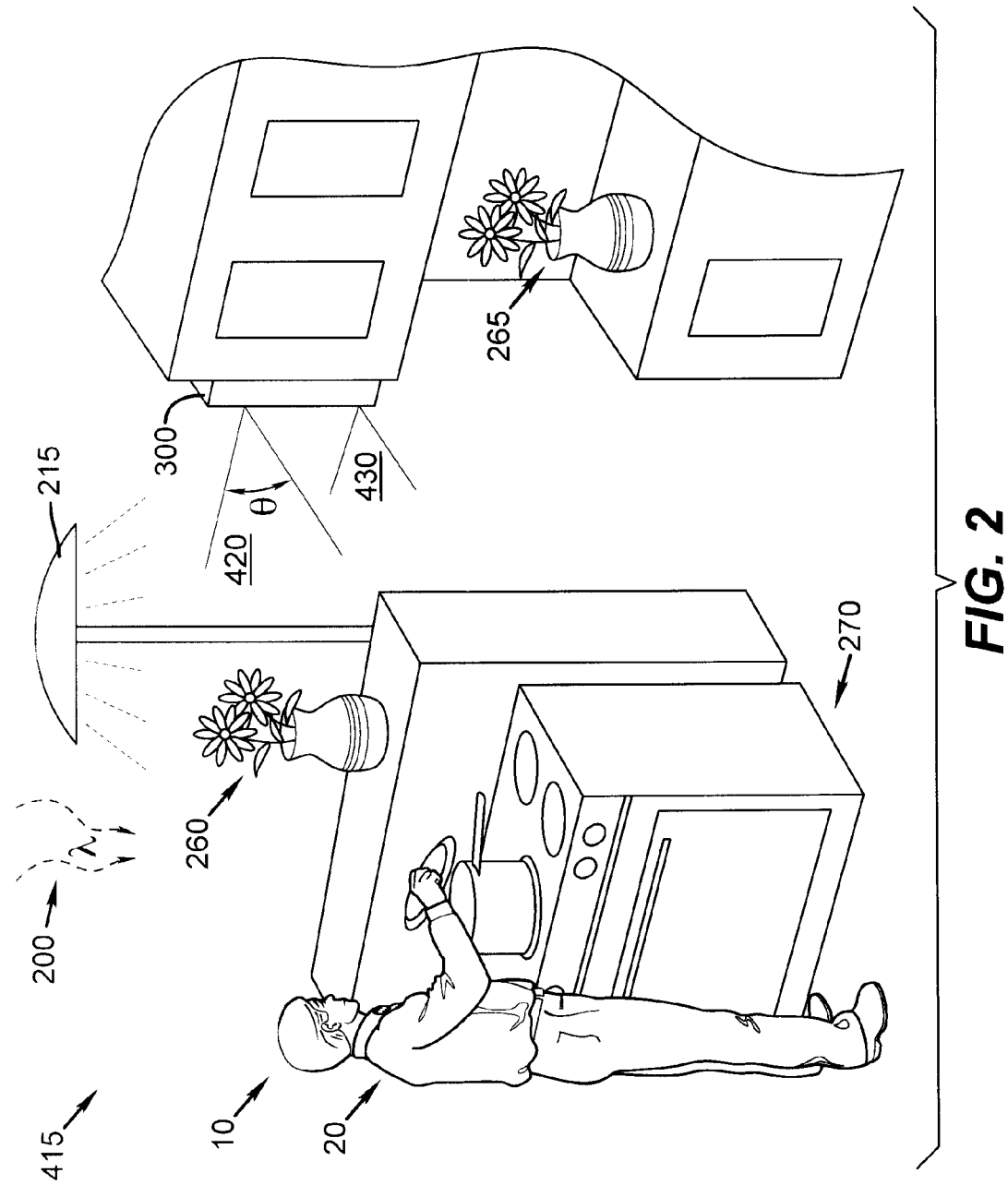
FIG. 2 depicts the general concept of the video communication system of the embodiment of FIG. 1 being operated in the context of a local environment.

FIG. 2, depicts a viewer (user) 10 operating an interactive video communications system 300 within their local environment 415 or scene, which is at a local site (362). In this illustration, user 10 is shown in a kitchen, cooking at a stove (home appliance 270), while also interacting with the video communications system 300, which is mounted on a home structure 265 (a nearby kitchen cabinet). The video communication system 300 utilizes image capture devices 120 and microphones 144 (neither is shown in this figure) to acquire data from an image field of view 420 from an angular width (full angle θ) and an audio field of view 430, which are shown by dashed lines as generally directed at a user 10.

Figure 3A:
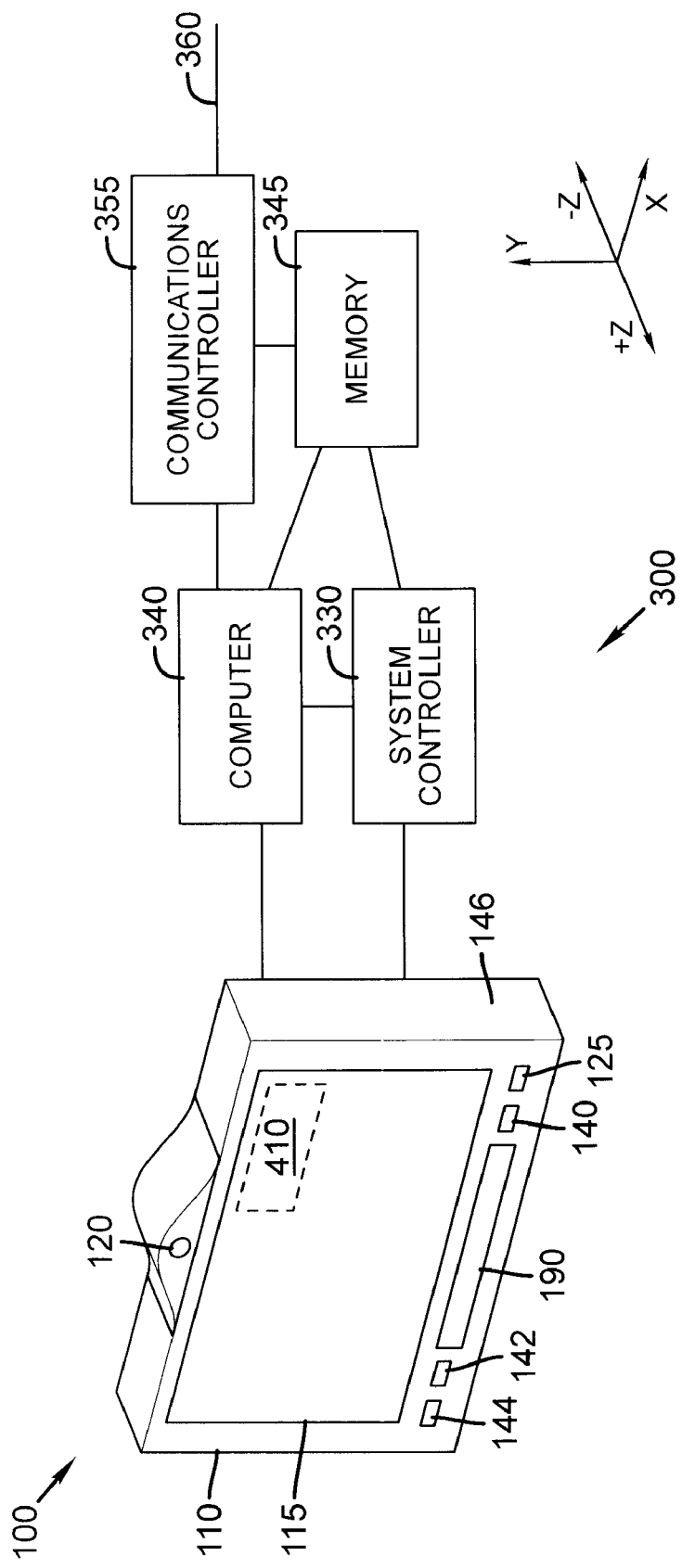
FIG. 3A provides a detailed illustration of the operational features of the video communication system.
Figure 3B:
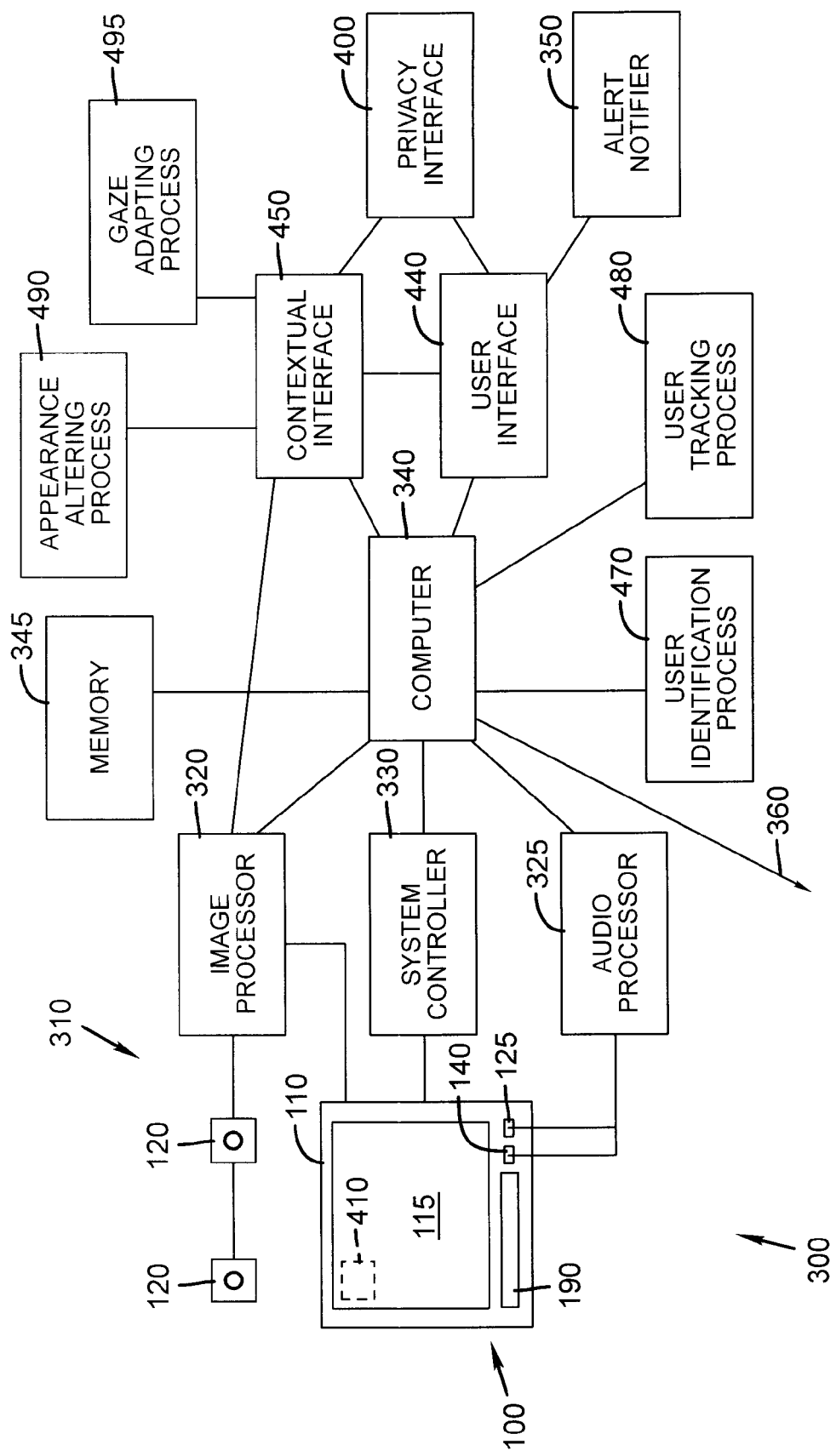
FIG. 3B depicts the operational features of one embodiment of the video communication system in greater detail.

FIGS. 3A and 3B then illustrate the architecture for one embodiment of a video communication device 300 having an electronic imaging device 100. FIG. 3A, in particular, expands upon the construction of the electronic imaging device 100, which is shown as including an image capture device 120 and an image display device (display 110), having a screen 115. The computer 340, system controller 330, data storage 345, and communications controller 355 can be assembled within the housing 146, or located separately, and be connected wirelessly or via wires to an electronic imaging device 100. The electronic imaging device 100 also includes at least one microphone 144 and at least one speaker (audio emitter) 125. The display 110 has picture-in-picture display ability, such that a split screen (or partial screen) image 410 can be displayed on a portion of the screen 115. Each image capture device 120 is nominally an electronic or digital camera, using an imaging lens system (not shown) and an image sensor (not shown), the latter likely being a CCD or CMOS type array device, having a resolution of ~1-10 megapixels. The image display device (display 110) may be a liquid crystal display (LCD) device, an organic light emitting diode (OLED) device, a CRT, a projected display, a light guiding display, or other type of electronic display appropriate for this task. The electronic imaging device 100 can also include a motion detector 142 and an ambient light detector 140, as separate devices that can be integrated within the housing 146 of the electronic imaging device 100. It is also possible that the ambient light sensing functions can be supported directly by an image capture device 120, without having a separate dedicated sensor (ambient light detector 140). Likewise, an image capture device 120 and a microphone 144 may support the motion detection functions, without having a separated dedicated sensor (motion detector 142). FIG. 3A also illustrates that the electronic imaging device 100 can have interface controls 190 integrated into the housing 146. These user interface controls 190 can use buttons, dials, touch screens, or a combination thereof or other interface components.

By comparison, FIG. 3B particularly expands upon the design of the system electronics portion of the video communications device 300. One subsystem therein is the image capture system 310, which includes image capture devices 120 and image processor 320. Another subsystem is the audio system, which includes microphones 144, speakers 125, and an audio processor 325. The computer 340 is operatively linked to the image capture system 310, image processor 320, the audio system and audio processor 325, and the system controller 330, as is shown by the dashed lines. While the dashed lines indicate a variety of other important interconnects (wired or wireless) within the video communications system 300, the illustration of interconnects is merely representative, and numerous interconnects that are not shown will be needed to support various power leads, internal signals, and data paths. The computer 340 also is linked to a user tracking process 480, which can be an algorithm operated within the computer 340, using motion detection data acquired from a motion detector 142. Likewise, the computer 340 can access a user identification process 470, which again can be an algorithm operated within the computer 340. Similarly, the computer can access a gaze adaptive process 495, which can include both a gaze correction process and a gaze tracking process (or algorithms). The memory or data storage 345 can be one or more devices, including a computer hard drive or a flash drive, and can contain a frame buffer to hold a number of video frames, to support ongoing video image data analysis and adjustment. The computer 340 also accesses or is linked to a user interface 440. This user interface 440 includes interface controls 190, which can take many physical forms, including a keyboard, joystick, a mouse, a touch screen, push buttons, or a graphical user interface. Screen 115 can also be a functional element in the operation of the interface controls 190. The user interface 440 also includes a privacy interface 400 and a contextual interface 450, and may further include an appearance-altering interface 490. The user interface 440 can also include a cue-based interface, which can be a portion of the contextual interface 450. The cue-based interface essentially observes cues, including speech commands, voice cues (intonation, pitch, etc.), gestures, body pose, and other interpretive cues, and then derives or determines responsive actions for the video communication system 300. These interfaces combine database, analysis, and control functions, which are enabled by the computer 340, the memory 345, the display 110, the image capture devices 120, the interface controls 190, and various other device components.

Most simply and obviously, the user interface 440 can include interface controls 190 such as a system on/off switch, an audio output volume control, a display brightness control, and other common user controls typical to televisions and computer monitors. As the device 300 may also provide television-viewing functionality, the interface controls 190 can include a remote control or other means for selecting channels, or controlling television recording or the display of video content from record-able media, such as a DVD. The interface controls 190 can also include control functions to support standard telephony, such as "dialing", caller ID, and contact number lists. Additionally, these interface controls 190 can provide or enable control of an image capture device 120, relative to zooming, panning, tilting, and other camera type functions. In particular, the interface controls 190 can also include automated functionality, for example, using a user identification process 470 and a user tracking process 480 to direct image acquisition by one or more image capture devices 120, such that the video communications system 300 provides a seamless and graceful experience for the users 10.

Figure 4A:
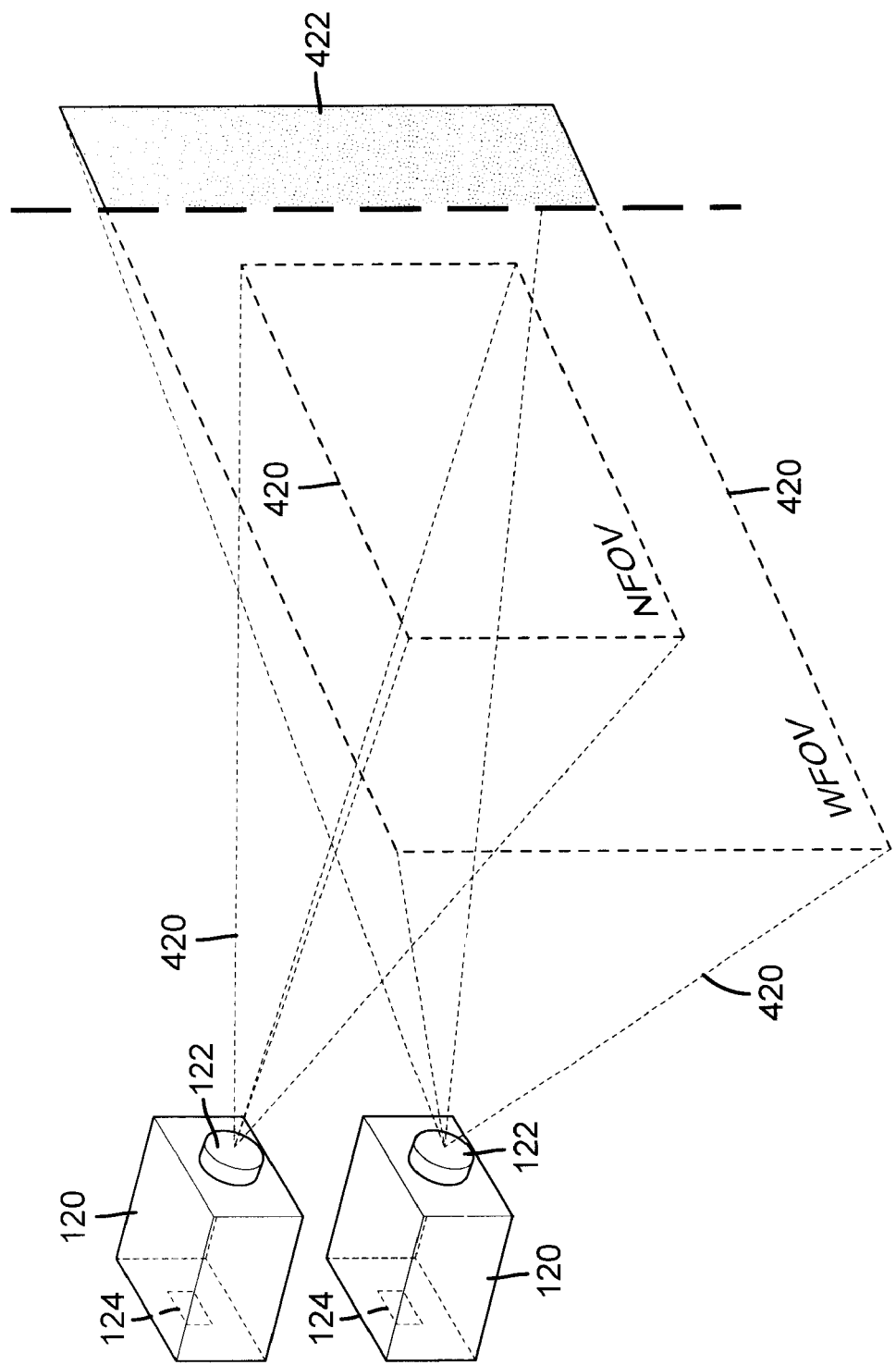
FIGS. 4A and 4B illustrate both narrow and wide image capture fields of view that can be captured by an arrangement of cameras.

Although video communication device 300 is depicted in FIG. 3A with a single image capture device 120, FIGS. 1 and 3B illustrate that the device 300 can utilize two image capture devices 120 for capturing video images, in accordance with defined video capture settings. Indeed, it is particularly useful for the video communication device 300 to utilize at least two image capture devices 120, and particularly a wide field of view (WFOV) camera and narrow field of view (NFOV) camera. For example, wide-angle camera lenses generally cover an angular width (θ) that spans between 60° and 120° full field, while a (fixed focus) telephoto lens generally spans a field of view with a full angle (θ) between 5-15 degrees. Although the image capture devices can be integrated via a beamsplitter, such that they share a common optical axis, and perhaps common lenses, in the direction towards object space, it is more likely that separate image capture devices 120 with separate lenses will be used. This is shown in greater detail in FIG. 4A, where one image capture device 120 captures imagery from a narrow image field of view 420 (NFOV 420), while the second image capture device 120 captures imagery from a wide image field of view 420 (WFOV 420). In FIG. 4A, the upper image capture device 120 is depicted as capturing a NFOV 420 which is centered within the WFOV 420 captured by the second image capture device 120. However, the NFOV camera can have automatic pan, tilt, and zoom adjustment capabilities, such that its NFOV 420 can be changed in size and location, in response to signals from a remote device or from computer 340 enabling device 300 to follow activity within a local environment 415. While the narrow field of view information can be extracted in image processing from the images captured by a WFOV camera, the image quality is likely to be better by having a separate dedicated NFOV camera.

Figure 4B:
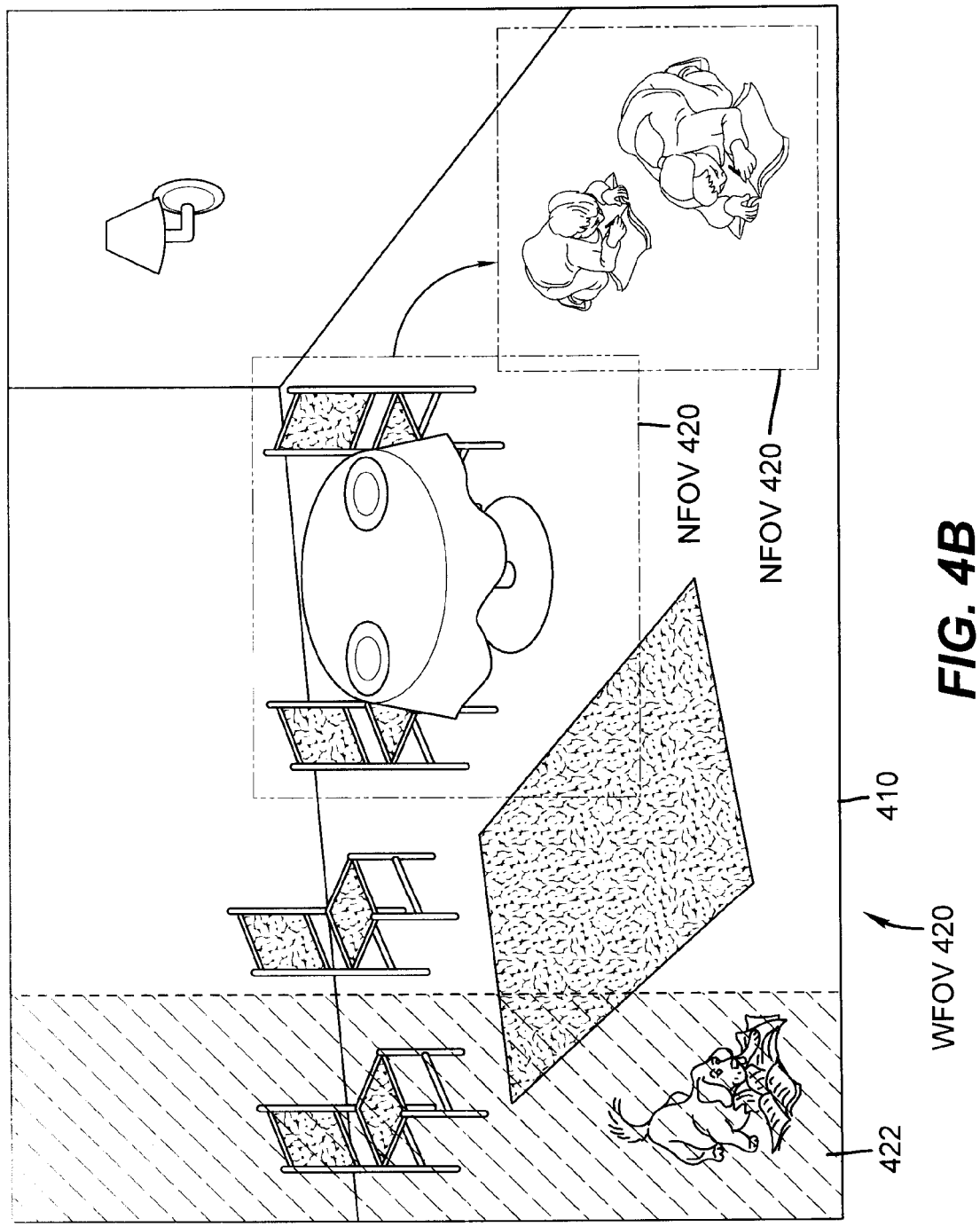

Additionally, multiple NFOV cameras can be used in the image capture device 120 to provide multiple NFOV's across the WFOV. It can be expected that the captured NFOV 420 will generally fall within the captured WFOV 420, as depicted in FIGS. 4A and 4B. However, as multiple NFOV cameras can be used, and as the residential experience can be quite dynamic, that may not always be the case. Thus, while a NFOV camera and a WFOV camera may be simultaneously used in a local environment 415, their fields of view 420 may be only partially overlapping, or entirely separate and non-overlapping.

One valuable functionality of the video communications device 300 resides in the user interface 440, and particularly in the privacy interface 400 and the contextual interface 450, which are sub-portions of the user interface 440. The more sophisticated aspects of the user interface 400, relating to privacy and context can best be understood with respect to potential user behavior and the dynamics of residential (and family) living. While the mere presence of a video communications device 300 in a residence may suggest that the resident users would have certain expectations and tolerance relative to using the device, in reality, the users 10 will likely want a range of user controls to identify and limit contextually restricted content. The privacy controls need to be flexible and adaptable, as privacy expectations can vary from event to event, and are subject to individual, familial, generational, societal, cultural, and religious variations. Thus, as will be subsequently discussed, the user interface 440, through the privacy interface 400 and the contextual interface 450, will provide enabling user determined privacy settings and controls with varying levels of sophistication.

In particular, the following issues regarding user control and privacy can be anticipated as being of interest in particular situations:

The local users may want direct control and knowledge of outgoing images and audio.
The local users may want the device 300 to respond automatically so as to protect privacy.
The local users may want control and knowledge of new parties being added to a video-communications event.
The local users may want knowledge of the remote users changing the locally captured field of view.
The local users may want to alter the appearance or context of the images of objects within the capture field of view.
The local users may want to know if other participants are recording images.

This list of issues, and the need for a privacy interface 400 and a contextual interface 450 may best be understood by example. Considering again FIG. 2, a local individual (user 10) is depicted in the local environment 415 of a kitchen, working at a home appliance (stove) 270 while participating in a video communications event (600) with video communications system (290) via a video communications device 300. As an example, the user 10 may intend to communicate with a distant relative while cooking, for example, to obtain cooking suggestions. Prior to the communications event, the user 10 may be displeased with their own physical appearance or with the appearance of their local site 362. Obviously, the user 10 may physically change their own appearance, or that of their environment (for example, by combing their hair, or picking up debris and objects for their local environment), but they may also want the video communications to have features to assist this process. The users 10 will likely then want knowledge that a video communications event (600), particularly an event that includes image capture, has started. Then, once the event is underway, they may want the device 300 to adapt readily to changing situations, such as the appearance of another individual in the local environment 415 of the site 362, or the departure of the original individual from the local environment 415. The adaptive changes to situational dynamics can include both the management of privacy, as well as alteration of the capture field of view. The local users 10 may also want influence or control over the transmission of the video data from a capture event, relative to local or remote recording of the event or the addition of a further party to the transmission (from 2-way to 3-way participation, for example).

The controls provided to users 10 by the user interface 440 can be implemented in a manner that provides the desired functionality, while providing sufficient ease of use that users 10 will be willing to utilize the video communication device 300 on a regular basis. Thus, many of the variable privacy and contextual settings may utilize default or pre-established privacy settings that are retained by the privacy interface 400. The user interface 440 can include an easy interface that enables users 10 to make quick customized changes before or during a communication event. Therefore, the privacy interface 400 can be a two-level interface, that organizes relatively transient privacy settings (that tend to change from event to event) separately from relatively stable or default privacy settings that tend to be changed infrequently. Basically, the privacy interface 400 enables users to control the capture, display, and recording of outgoing or incoming video image content for personal video communications for their residence. In a general sense, the video communication device 300, via control over privacy and contextual image transmission, enables etiquette for modern personal video communications.

The video communications device 300 can utilize a variety of networking technologies to communicate with remote participants, including telephone or data streaming landlines (cable, optical fiber), wireless, satellite based communications, and the Internet. Although bandwidth limits for streaming video have historically limited the adoption of video telephony and video-conferencing, these technologies keep improving. Ideally, the users 10 can either initiate a communication event through the video communication device 300, or switch over to it from an existing phone connection, enabled by a process for invitation (605) and acceptance (610) that is supported by the devices 300. It is anticipated that many users would apply a default privacy setting that ensures that video communications device 300 initially transmits only voice data first from a first site 362 to a second site 364 before switching to video communication. The video communication devices 300 at the first and second sites 362 and 364 can utilize a privacy language protocol to communicate privacy settings across the intervening network 360. For example, both a user 10a at a site 362 and a user 10b at a site 364 would have to authorize visual communications before the respective devices 300 individually or both switch to video transmission (that is, an "electronic handshake"). The video data streams between sites 362 and 364 can be transmitted over the intervening network 360 in an encrypted form. The privacy language protocol can then supply electronic keys to enable decryption at the corresponding remote site. Additionally, each of the devices 300 include feedback features to alert local users 10 that local image capture is occurring at their local site 362. Specifically, each device 300 can be equipped with a variety of indicators, such as an emitted audio tone or visual cue (such as a flashing light) that provide notification of video capture and transmission, particularly when the event commences. Additionally, the image capture devices 120 may be equipped with physical light blocking shutters (not shown) that are readily visible to the local users 10 to indicate that image capture has been enabled or is disabled.

As a further privacy control, the video communication devices 300 are provided with a picture-in-picture or split screen image 410, as shown in FIG. 3A. In particular, while the primary portion of the screen 115 of display 110 can supply incoming imagery from remote users 10b at a remote second site 364, the split screen image 410 can display the outgoing video image captured at the local site 362. Thus, via the split screen image portion of the display, the local users 10 can have a direct visual presentation of the images being captured and/or transmitted (to a remote site 364) by their device 300. This feature gives the local users 10 the opportunity to verify that the transmitted image has the privacy level that is desired and adjustments can be made as required.

Of course, once a video communication event has started, video transmission across the network 360 may fail. While it can be expected that a local user 10a and a remote user 10b will verbally communicate the problem to each other, the privacy protocol language can also communicate this failure across the network 360. In particular, the local device 300 can activate an indicator (alert notifier 350), including an icon overlaid on the split screen image 410, to provide a transmission failure alert. Additionally, the device 300 can provide a quick and easy interface control 190 for muting the outgoing audio signal or suppressing (blanking) the outgoing video transmission, without necessarily terminating an ongoing communication event. During a period of suppression of the outgoing video transmission, the video image can be replaced by another video image, including a paused image.

Additionally, local users 10 can be legitimately concerned as to whether a communication event, and particularly the video portion thereof, is recorded either locally or remotely. Privacy settings can be provided by the privacy interface 400 that enables local users to authorize whether the video communication device 300 will enable either local or remote video recording. The privacy language protocol can also be used to communicate recording authorization status between devices 300 at a local site 362 and a remote site 364. Subsequently, the device 300 at a remote site 364 communicates back to the device 300 at a local site 362 that recording of the video or audio signal has been initiated. An alert notifier 350, such as a visual icon on display 110 or a light on the housing 146 can be activated at the local site 362 or the remote site 364 to indicate that recording is underway. Similarly, if a video communication event switches from 2-way transmission to multi-way (3+) transmission, predetermined default privacy settings, conveyed via a privacy language protocol, could convey a user's willingness to participate. It can be anticipated that a user 10 may want to change the privacy settings for local or remote recording and multi-way transmission during the course of a communication event. As another example, a local user 10a may be comfortable with turning off the presentation of split screen image 410 for a communication event, while perhaps recording it for possible later viewing. Therefore, the interface controls 190 can provide easy access to these and other settings.

The video communication device 300 can also enable the users 10 to change the capture conditions, and particularly the image capture field of view 420. As shown in FIG. 2, a device 300 may view a local site 362, such as a kitchen. However, as an example, the entire image capture field of view 420 that can be captured by a camera 120 may extend further within a residence than just the kitchen. For any variety of reasons, the local user may want to limit the image field of view 420. This may be done simply by closing a door or turning off some locally positioned room lighting. The local image capture can also be limited by using the privacy settings to predefine that only a NFOV image capture device 120 be used. As a further step, the pan tilt and zoom controls for a NFOV image capture device 120 can also be restricted, thereby limiting the expanded field of view and motion tracking capabilities of device 300 for a communication event.

Alternately, a local user 10 can electronically modify the image captured to form a modified image for transmission that removes a portion of the field of view 420 denoted as image area 422. Although users 10 may define image areas 422 for exclusion from video capture for various reasons, maintenance of personal or family privacy is likely the key motivator. As shown in FIG. 4A, an image capture device 120 (the WFOV camera) has a portion of its image field of view 420, indicated by image area 422, modified, for example, by cropping image area 422 out of the captured image before image transmission across network 360 to a remote site 364. The local user 10 can utilize the privacy interface 400 and the contextual interface 450 to establish human perceptible modifications to a privacy sensitive image area 422. It is expected that a user 10 may pre-determine privacy settings, based partially on human perception and emotional sensitivity to image features or content, during a preview mode prior to a video communication event, although users 10 may want to modify the captured image area during the course of an ongoing event. Preview mode setting may be done with images displayed on the larger display screen 115, or on the split screen image 410.

The contextual interface 450, for example using scene analysis algorithms, then enables the modifications of the image area 422 or image context, which are subsequently automatically applied by image processor 320 to the ongoing video capture to create a modified video signal. For example, a privacy sensitive image area 422 may simply be cropped out of the captured images. Alternately, an image area 422 can be modified or obscured with other visual effects, such as distorting, blurring (lowering resolution), or shading (reducing brightness or contrast). For example, the shading can be applied as a gradient, to simulate a natural illumination fall-off. Device supplied scene analysis rules can be used to recommend obscuration effects. Depending on the circumstances, one or another of these effects can make the activities and objects within the image area 422, or the obscuring of image area 422, more difficult to discern and less obvious to a remote user 10b viewing the resulting images. It is also noted that the shape of image area 422 can be arbitrary to enable various portions of the field of view to be removed or altered in the transmitted image.

The split screen image 410 on display 110 can display the resulting privacy limited and modified image, or larger areas images of the local environment that also depict the image areas effected by active privacy settings. For example, FIG. 4B depicts a portion of a local environment 415 that has been captured in WFOV 420 by an image capture device 120, which can then displayed locally as a split-screen image 410. An image area 422 has been defined as a privacy limited portion, which is outside the transmitted field of view. The privacy limits bound the ranges of panning, tilting, or zooming of the image capture devices. The split screen image 410 can display the entire WFOV 420, with the obscured image area 422 visually marked (for example, partially shaded), so a local user 10a has an immediate ongoing knowledge of the obscured or removed image area and content. Alternately, the split screen image 410 can only show the transmitted image only (WFOV420—image area 422). The split screen image can also display just the portion (a NFOV 420) of the WFOV image that a remote user is presently viewing, or display the larger WFOV image, with the presently remotely viewed NFOV image marked, as with the dashed lines around the children in FIG. 4B.

The user defined privacy settings can be translated from human perceptible image content terms into privacy setting parameters, which express the privacy settings in terms of the video or audio data, to enable device operation. The privacy-setting parameters can relate to obscured image areas 422 (area and location), visual effects for obscuration (type), the amount of obscuration, personal body privacy, voice, gestures, user and remote viewer identity, objects, and other factors. These privacy content and context settings for image capture and transmission can be relatively static or transient from one communication event (600) to another. If the device 300 is used in the same local environment on an ongoing basis (such as mounted to the home structure (cabinet) 270 of FIG. 2), these settings (and associated parameters) for image area modification can be defined as a set of default conditions that are quickly accessible or automatically applied for repeated use. The contextual interface 450 can also recognize the various local environments 415 it is typically used in using scene analysis algorithms, and apply default predetermined privacy settings accordingly.

While the privacy settings may be static for a communication event 600 or a video scene 620, the application of the privacy settings onto image content may not be static, particularly if a camera 120 is moved or if objects of interest are in motion. As an example, the use of privacy settings to protect user personal body privacy may result in arbitrarily shaped and obscured privacy sensitive image areas 422, which may change in position and size, if for example, an unclothed child is moving around with the image field of view 420. In the case that cameras 120 are fixed in position, privacy related image obscurations can be provided based on the field of view geometry. However, to compensate for relative camera to object motion, the scene analysis algorithms of the contextual interface 450 can use an object centric approach, in which objects are examined for the presence and location of privacy sensitive areas, as defined by the user privacy settings, and identified privacy settings are linked to the objects using privacy-setting parameters.

Additionally, it can be expected that users would want their device 300, via the scene-analysis algorithms to automatically identify and apply privacy settings as activities unfold. To accomplish this, the scene analysis algorithms evaluate the video images relative to the privacy setting parameters using privacy-setting metrics. These metrics, which are indicative of potential privacy issues, can relate to both image content (including image area and geometry, image data indicative of surface structure) and image context cues (such as inappropriate attire). The scene analysis algorithms use these metrics to identify and locate privacy sensitive image areas 422 in the image FOV 420 (or in the video frames of the video imagery) that potentially need obscuration. The scene analysis algorithm can evaluate imagery for current video frames from one or more cameras 120, seeking correlation with prior video frames to improve the analysis process and results. If necessary, privacy correction confidence values can be statistically calculated, and the identification of privacy sensitive regions tested or validated, before the video imagery is altered. The scene analysis algorithms proceed by comparing or correlating the image data (via the metrics) to the privacy settings (via the associated parameters). As then appropriate, the ongoing video imagery can be automatically altered according to scene analysis rules, which apply obscurations to the identified privacy sensitive image areas 422, based on user preferences (as expressed by the privacy-setting parameters), capture conditions, the video context for the scene, or other factors.

Figure 4C:
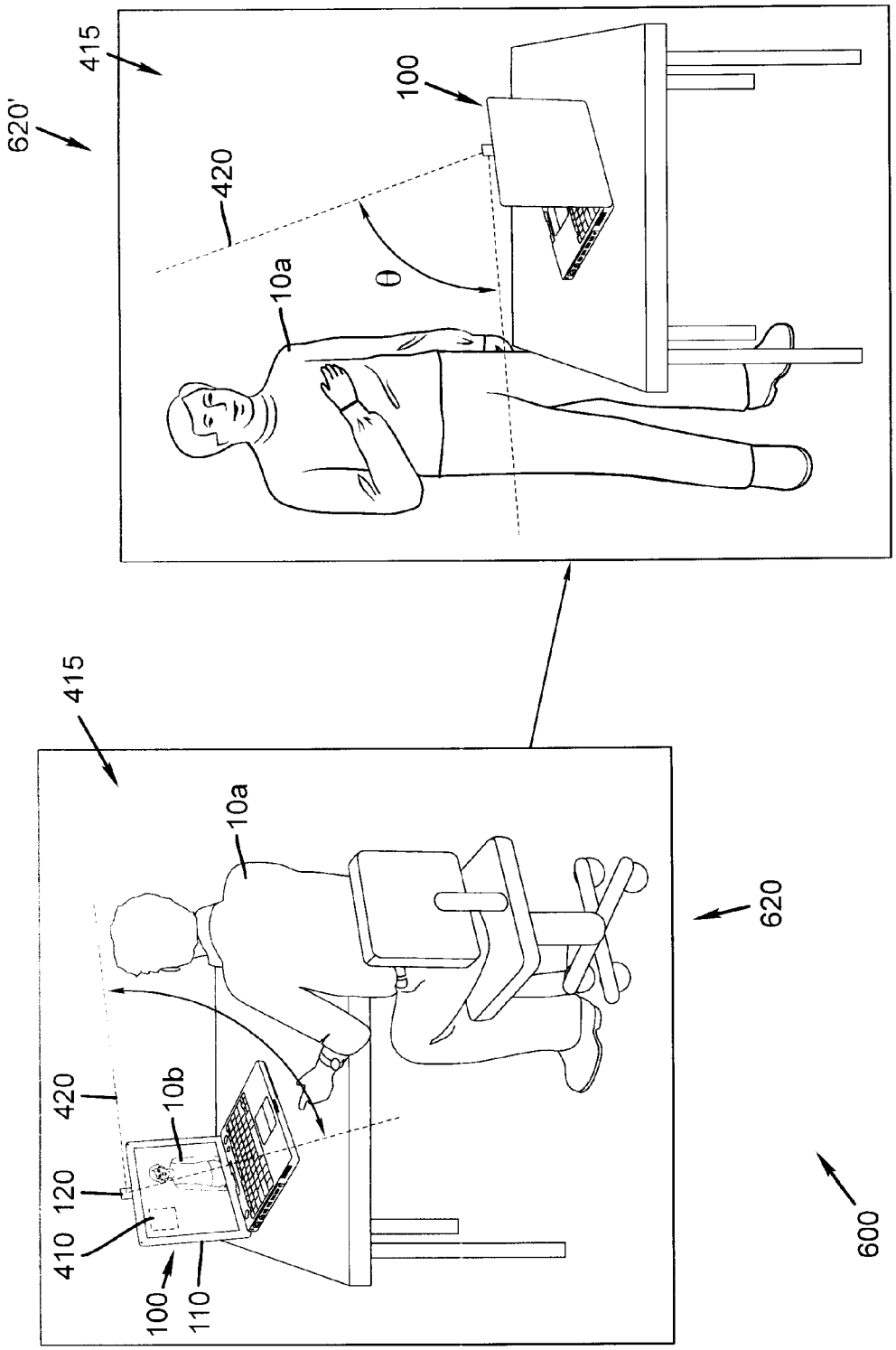
FIG. 4C illustrates an example of the capture field of view changing with a transition during a communication event.

In anticipating the use of visual communication device 300 in a residential setting, it is recognized that the dynamics, informalities, and etiquette can change during a communication event. For example, an additional individual may enter the field of view observed by the video communication device 300. The device will then need to respond appropriately, contextually, in providing imagery conveying the presence of this individual in the local environment 415 to a remote viewer. Furthermore, additional privacy settings can suddenly become applicable, as a new individual appears, that the device 300 will need to recognize, access, and apply. These responses or transitions from a prior video capture target to a new video capture target can be specific, to the situation or the individual, or both. As an example, FIG. 4C depicts a video communication event 600 occurring in a local environment 415 involving a local individual (user 10a). In a first video scene or video interaction (620), a user 10a is sitting at a table, looking at a display 110 where an image of a remote user 10b is displayed. If, for example, users 10a and 10b are engaged in a purposeful conversation regarding serious concerns, then the image field of view 420 may be relatively narrow. As the communication event continues, the participating users (10a and 10b) may relax, and transition into a more spontaneous event, where a wider image field of view 420 may be more appropriate. Such a scenario is depicted in FIG. 4C, where user 10a goes from a sitting position in a first video scene 620 to a more relaxed behavior in a second video scene 620'. In general, in the present invention, it is intended that the contextual interface 450 of video communication device 300 will manage the human interactive operation of the device 300 through transitions in scene content, particularly when the device 300 is operating automatically.

The scenario depicted in FIG. 4C illustrates one common use case scenario that can be anticipated for device 300. Alternately, there are many use case scenarios where the communication event may be initially more relaxed and spontaneous, and the initial image capture field of view 420 will be relatively wide. Thus, it can be anticipated that the default settings for camera control at the beginning of many communication events will have a WFOV image capture device 120 capture imagery for all or most of its image capture field of view 420. As a result, a remote user 10b will at least initially observe a local user 10a in the larger context of their local environment 415. As a typical communication event continues, either a local user 10a or a remote user 10b may desire the image capture to be closed in on localized activity (a NFOV) within the local environment 415. For example, the remote user 10b make seek to have the direction of narrow field image capture change from an initial NFOV 420 to an alternate NFOV 420 (for example, from the table to the children, as depicted in FIG. 4B). Either the local user 10*a* or the remote user 10*b* can initiate this transition, using interface controls 190. As the video capture transition occurs, a local user 10*a* will be able to observe the outgoing transmitted imagery on the split screen image 410. The privacy interface 400 can also enable the local user 10*a* to decline or modify requests by a remote user 10*b* to capture a localized field of view 420. The reduction of the field of view 420 can be attained via the image processor 320, which can crop and zoom in the images for outgoing transmission across a network 360. However, at some point, the resulting image quality (particularly the resolution) obtained by electronic zooming will be sufficiently reduced that use of optical zooming or a NFOV image capture device 120 (or the combination thereof) will be appropriate. It is noted that a camera lens with optical zoom capabilities is typically equipped with several internal moving lens groups. The device 300 can also apply the user tracking process 480, to lock onto and track a local user 10*a* around within the local environment 415, as bounded by the image field of view 420.

Although enabling both local users 10*a* and remote users 10*b* to interactively effect the image field of view 420 during the course of a communication event is a valuable feature, in many instances, users 10 will prefer to have the video communication device 300 control the image capture automatically. In such cases, the contextual interface 450 can then apply a series of algorithms and default conditions to interpret the ongoing activities, define a video communication context, and make decisions. Thereafter, the device 300 would realize these decisions by changing from a prior to a new video capture mode, as appropriate. For example, if a communication event commences with image capture by a WFOV image capture device 120, the contextual interface 450 can observe that a local user 10 is remaining in a localized area within the field of view 420. The contextual interface 450 can apply temporal and spatial criteria, to determine that a local user 10*a* has remained in a localized area for a given time period (for example 30 seconds), and then direct the device 300 to have a NFOV camera zoom in, so that for example, the local user 10 occupies ~30% or more of the image area to be displayed on the display screen 115. The contextual interface 450 can also utilize the user tracking process 480, enabled by motion detector 142, to lock onto and follow a user 10 about their local environment 415. A given user may be preferentially followed based upon user classification, user identity, or user activity. As a user's detected range of motion and location expands, the contextual interface 450 can also change the relative sizing of the user 10 within the captured image area. Device 300 can also operate in an intermediate or semi-automatic capture mode, where local or remote users 10 and the contextual interface 450 can effect the localization of the image capture and transmission, with users 10 having override authority.

Further complications arise when an individual enters (or leaves) the field of view of a local environment 415 during an ongoing communication event. In the instance that a local user 10 (particularly the only local user at the moment) leaves the local environment, the device 300 can adapt to this transition in the local image content. For example, the device 300 can modify the subsequent video capture to be either a WFOV image or a NFOV image. As one option, these image capture transitions (changes in participating individuals or their activities) can be provided by direct user input. Alternately, the device 300 can transition the image capture according to prior user-established settings. As another option, the device 300 can transmit paused imagery or alternate imagery of other than the local environment 415, until the local user 10 returns. The video communication device 300 also needs to adapt to the circumstance that an additional individual enters the field of view. As before, a local user 10 who is previously engaged in a communication event will typically be aware of the arrival of an additional individual. This prior local user 10 can, for example, then control the device 300 to expand (reduce, or re-direct) the image field of view 420 to include (or exclude) the new individual.

Alternately, the video communication device 300 can have the adaptive functionality, through the contextual interface 450 to automatically manage video capture through content transitions. For example, the device 300 can include or exclude an additional individual in the event based on the location and duration of activity of the individuals. In effect, cues regarding the location and duration of activity can provide a context for a video communication, for which the contextual interface 450 can define an appropriate video capture mode, which encompasses video, audio, privacy, management of transitions (both intra-scene and inter-scene), and other factors. In particular, scene transition assessments considering the location and duration of activities can use quantitative measures for the range, magnitude, and rate of the activities, without having to identify the activities themselves.

Various examples of how a device 300 can key on the location and duration of activities can be anticipated. As one example, an ongoing video communication event 600 may proceed using an automatic video capture mode for which the outgoing video image has been selected by the contextual interface 450 from a NFOV 420, such as having a NFOV camera 120 targeted at the boys depicted in FIG. 4B. Meanwhile, the device 300, via contextual interface 450 and a WFOV camera 120 can acquire images from a larger field of view (such as WFOV 420 of FIG. 4B), and simultaneously monitor activity in the larger imageable environment 415. The contextual interface 450 can use cues based on the location and duration of activity to analyze any activities observed outside the field of view for the current outgoing transmitted video images, to determine their potential interest to remote viewers. The contextual interface 450 supports this monitoring function using scene analysis algorithms that evaluate images from the WFOV 420, using appropriate metrics and rules to identify potential changes or transitions in user activities. It is important to note that the outgoing video image can be composed of: the NFOV 420, the WFOV 420, portions of the NFOV 420, portions of the WFOV 420 or composite image combinations thereof, as selected by the contextual interface 450 and as limited by the privacy interface 400.

While the contextual interface 450 can monitor activity beyond a field of view 420 for the outgoing video images using imagery acquired by an image capture device 120, audio data acquired by microphones 144 can also be used. The microphones 144, together with the geometry of the local environment 415, define an audio field of view 430, which can be larger or smaller than the image field of view 420. Although the image field of view 420 principally defines the operation of the device 300, monitoring of the typically larger audio field of view 430 can provide an earlier warning of change in the presence of individuals.

This function of simultaneously monitoring activities occurring in a WFOV 420 and an audio field of view 430 is useful relative to anticipating a change in the presence of individuals in the local environment 415. As an example, the contextual interface 450 can utilize scene analysis algorithms to determine whether an additional individual (or potential subject or user 10) is passing through the periphery of the local environment 415 or is actually entering the central or primary portion of the local environment 415. These algorithms can use data, from both current and prior video frames, regarding the location and duration of the peripheral activities, based on image areas, time thresholds, and motion tracking data. As will be subsequently discussed, contextual information related to video context, including user classification, user identity, event classification, or contextual classification of user activities, gestures, and behaviors can also be used by a scene analysis algorithm during monitoring and analysis of activities outside a current NFOV 420. The image data and the contextual information are used in combination by a scene analysis algorithm, in accordance with appropriate scene analysis rules, to determine whether peripheral activities may be included in the video capture. In particular, peripheral activities should correlate with the defined video context (for example, a spontaneous event) to be included, assuming the identified transition is not prevented by privacy settings. Capture transition algorithms, using scene adjustment rules, can then determine the rate and timing of an adjustment in the video capture.

As an example, in an instance where the contextual interface 450 determines that an additional individual is merely passing through the periphery, scene analysis can direct the device 300 to ignore the individual. However, in an instance where the contextual interface scene analysis determines that an individual is actually entering a primary portion of the local environment 415, it can direct the device 300 to expand the captured image field of view 420 from a prior, narrower range, to a more expansive view that includes the prior local user 10 as well as a new individual (a second user 10). Then, if the two local users (both 10) cluster together locally for some period of time, the contextual interface scene analysis can determine that the device 300 should narrow the image field of view to a localized portion of the scene, upon which the image capture devices 120 or image processor 320 will be directed accordingly. Likewise, the contextual interface 450 can then adapt the image capture to the circumstance that one or more local users 10 who are within the current image field of view 420 then subsequently leave. For example, the contextual interface 450 can expand the image field of view 420 to show these individuals leaving. As another example, the device 300 can recognize a need to expand the capture field of view to include an individual outside a current NFOV 420, if an individual within the current NFOV starts conversing with the peripheral or excluded individual. It is noted that the user defined privacy settings can define a very constrained video context, such that activities outside a current image field of view 420 are to be excluded, regardless of their potential interest, for the duration of a communication event or video scene.

As another approach for managing transitions, the contextual interface 450 of the video communication device 300 can manage content capture and content transitions using tags based on user classifications as cues to define a video context and an appropriate video capture mode. For example, a local user 10 who initiated the communication event can be tagged as the primary user for that event. In particular, the device 300 can use the user identification process 470, which includes both face and voice recognition processes or algorithms, together with the contextual interface, to apply semantic classifications or identifiers to the users 10, such as "primary user or initial user", "secondary user", "first adult user", "second adult user", "first child user", or "second child user". In this case, the contextual interface 450 of the device 300 does not need to know the actual identity (name, relationships, age, etc.) of the users 10, but needs sufficient information to tag or categorize the users. These tags, which can be temporary, or used for multiple communication events, can, for example, prioritize towards the users who initiate the events, adult users, or repeat users. For example, a scene in a local environment 415 could include an identified primary user, an identified second user, and a first child user who are clustered together within the field of view. The primary local user may then leave the scene for a period of time. The contextual interface 450 can direct the device 300 to have the image capture devices 120 expand to a WFOV 420 to show this user leaving. Thereafter, further directions can be provided to narrow the field of view to show the activities of the remaining local users (the secondary user and the $1^{st}$ child user). During the subsequent portion of the communication event, the contextual interface 450 can interpret data for peripheral activities from the local environment 415 (relative to a wider field of view 420 and the audio field of view 430). If peripheral people and activities are deemed important by a scene analysis algorithm, for example using scene analysis rules favoring a hierarchical tagging system, then the video capture can expand to include them, using a WFOV camera or multiple cameras, and the video display can likewise be expanded using a single image or split screen images.

As this video communications device 300 is principally targeted to residential use, varying circumstances can arise, particularly in a family setting. For example, various events, such as parties, family dinner events, and game playing events, typically occur in such settings. A local user 10 can simply have the device 300 capture and transmit imagery spanning an image field of view 420 that seems appropriate for the event. Alternately, the contextual interface 450 can automatically adapt to such events, by using scene analysis algorithms that recognize different types of events or activities using a set of event classifications as cues to define a video communication context and an appropriate video capture mode. For example, the contextual interface 450 can recognize types of events, such as that a party is occurring and direct the device 300 accordingly. This event or activity recognition function can be based on a classification dataset for event type that includes quantitative descriptors of various activities, including the number of people involved, gestures used, time patterns, and object or voice recognition. Event classification can also use information regarding environmental conditions, such as temperature, sunlight, humidity, or wind.

As a starting point, the contextual interface 450 can direct the device 300 to stay with a wide image field of view 420 for image capture regardless of the identity of the individuals, or the activities the individuals are engaged in, or the localization of the activities. The contextual interface 450 can also recognize the type of event (such as a family dinner, party, a card game, small group spontaneous, purposeful, or portable) and type of location based on recognizable objects (for example, chairs, tables, desks, couches, cars, lawnmowers, bricks, windows, rug, wooden floor, concrete floor, and other objects) that would typically be associated with rooms that are likely to have different types of events associated with them, and apply a set of event capture guidelines appropriate for that type of event. These guidelines can account for factors such as field of view, audio processing, lighting expectations, privacy factors, gaze correction or tracking. The contextual interface can also monitor for changes in activities within an event (such as family dinner shifting to clean-up and then to the playing of a board game), and then manage the transitions through these changes using interim settings as necessary relative to the video capture and display, audio capture, and other factors. To aid the process of event interpretation, the contextual interface 450 can employ a cue-based assessment algorithm, which observes cues, such as voice cues (intonation, pitch, loudness, pacing, etc.), gestures, body pose, and other interpretive cues to determine the nature of the activities and to direct the image and audio capture accordingly. As in other cases, users 10 may over-ride the capture preferences determined by the contextual interface 450 operating in an automatic mode.

As another circumstance typical of the residential setting, it can be anticipated that children or pets or neighbors can wander into the capture field of view during a communication event. In particular, in such environments, it is not uncommon to have unclothed children wandering about the residence in unpresentable forms of attire. The contextual interface 450 can quickly recognize this and direct the image processor 320 to blur or crop out imagery of privacy sensitive areas. Indeed, the default settings in the privacy interface 400 may require such blurring or cropping.

As another aspect, in using the video communication device 300 in the residential environment, and particularly with a family, it can be advantageous for the device 300 to recognize individual identities using identity classification as cues to define a video context and an appropriate video capture mode. As mentioned previously, the device 300 can be provided with a user identification process 470 that can use face recognition, voice recognition, biometrics (such as fingerprints), or other techniques, either individually, or in combination to recognize the identity of individuals within the capture field of view. As an example, in the case of the family setting, a device 300 can be programmed with facial images of family members. The device 300 could be operated through an initial set-up process, in which good facial images of each of the family members (users 10) living within a residence are captured by the device 300. The supporting face recognition process can initiate image processing and analysis algorithms to determine whether the captured facial image is sufficient, relative to lighting and pose, for robust identification on an ongoing basis. As an example, the face recognition algorithm of commonly assigned U.S. Pat. No. 7,058, 209, "Method And Computer Program Product For Locating Facial Features", by Shoupu et al., could be used for this purpose. This set-up process can then generate one or more quality facial images for each individual, which can be retained as reference images 460 (see FIG. 5A). The local users 10 can provide the associated identity information (particularly names) via text input devices or voice recognition. Of course, identities of other individuals who are not residents, but who are sufficiently important to the local users, and who are at least occasionally present, could also be established. For example, the identities of grandparents, who live elsewhere but occasionally visit, could be included. Repeating individuals could be automatically labeled by the contextual interface 450 for tracking purposes. Electronic images with names, including scanned images could be provided as input. This data, documenting individual identities and relationships (family and friends) can be managed by the contextual interface 450.

Knowledge of user identity can be used to support the privacy and contextual features of the video communication device 300 in a variety of ways. As an example, within a family context, the parents could be identified as the "lead users", and they can use access control features, such as passwords or voice or face recognition, to limit access to the privacy settings of the privacy interface 450, or to the device 300 itself. In many cases, a "lead" user will be the same as the "primary" or "initial" user discussed previously. These password controls are an authentication control that can prevent an individual who is not a defined lead user from changing a range of defined privacy settings, or from using the video capture and transmission features of the device 300 at all. The privacy settings can also be used to allow users 10, who are not the identified lead users, the opportunity to use device 300, but with a limited set of operational options. In operation, the contextual interface 450 can access the user identification process 470 and the privacy interface 400 to associate an individual within the image field of view 420 with their authorization level to change privacy settings. As an alternative, the device 300 could accept the entry of a lead user's name and their associated password, regardless of whether the individual is identified as a lead user by the user identification process 470 or not. For example, a lead user can grant another individual temporary authority to alter a range of privacy settings. It is also possible that a lead user may use the privacy interface 400 to establish different privacy settings for different individuals. The contextual interface 450 would subsequently attempt to recognize known individuals during communication events, using the user identification process 470, and then associate their privacy settings with them. Individual privacy settings can include operational field of view restrictions, limitations on remote addresses or phone numbers that a user can call, recording options, or other factors.

Figure 6:
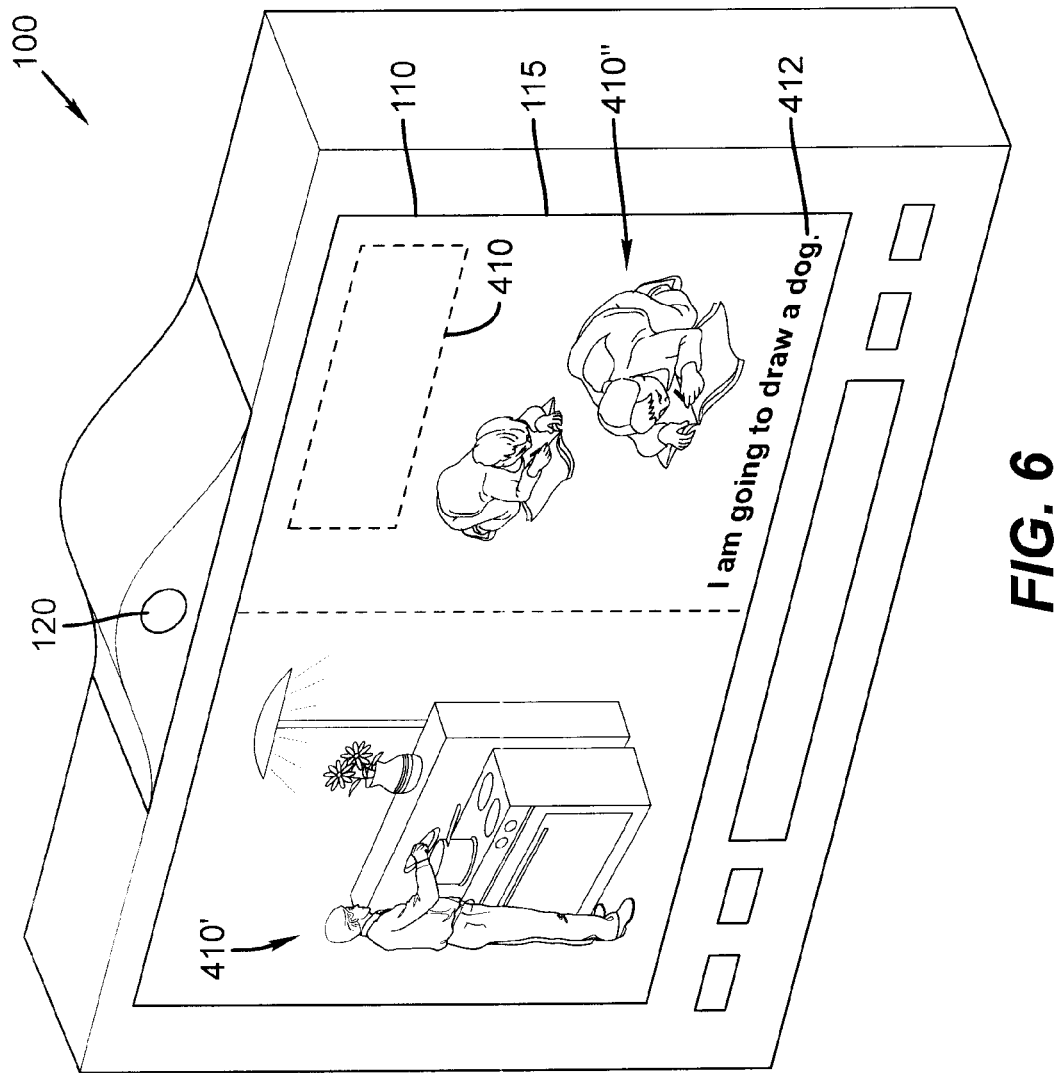
FIG. 6 depicts an electronic imaging device, which is a portion of the video communication system presenting split screen images of two remote scenes.

Likewise, user identity classification can assist the contextual interface 450 in the interpretation of events when it is supporting a communication event occurring in a local environment 415 in an automatic mode. For example, if a known subject or user 10 is within the image field of view 420 (as seen by a WFOV camera), but is lingering near the periphery of the WFOV, or at least outside the transmitted NFOV, the contextual interface 450 can recognize (using user identification process 470) that this individual is important within the context of the local users 10. Effectively, user identity is used a hierarchical tool to prioritize video capture. The contextual interface 450 can then expand the image field of view 420 to include the activities of both the primary or initial users 10 and this peripherally located individual or user 10. Alternately, the activities of this peripherally located individual can be presented on the local display 110 as a second split screen image 410'. Likewise, the images of the primary local users 10 and the peripherally located users 10 can be presented to the remote users 10b as split screen images. This is illustrated in FIG. 6, which depicts the display screen 115 of a remote viewer (at a site 364), in which a split screen image 410 would display imagery from the remote viewer's environment (site 364), and the greater portion of the display screen 115 displays split screen images (410' and 410") of two separated areas of activity in the local environment of a site 362. In such circumstances, the split screen image 410 at the local site 362 can also display two outgoing images from that site (362) or a WFOV image capturing all the activity. More generally a user 10 may have their display output multiple split screen images on their display 110, including the split screen image 410 for their locally captured content, a split screen image 410' showing a WFOV 420 at the remote location 364, and a split screen image 410" showing a NFOV 420 at the remote location. It is noted that multiple displays can be used instead of split screen or picture-in-picture displays.

Of course, the local users 10 have the option to over-ride image capture and transmission of the images of a peripheral individual to the remote site 364. This image capture, transmission, and split screen display feature of the video communication device 300 can also be used in a manual control mode. It is noted that a remote user 10b, observing split screen imagery of separate (and perhaps uncorrelated) activities going on within a local environment 415 may have trouble separating the associated audio, to preferentially follow one group over another. The microphones 144 of the audio system portion of electronic imaging device 100 can have directional pick-up capability, which can aid the remote user 10*b* in capturing audio and separating the associated audio using directional speakers 125. Alternately, one audio feed could be muted in favor of another. Voice recognition software can also be used with these audio feeds, to interpret voice content (speech) and generate text, which can then be provided to the remote users 10*b* as sub-titles 412 (shown in FIG. 6) or as a label of the person speaking.

The contextual interface 450 can also include data that connects remote users 10*b* to their importance to the local users 10*a*. As an example, various semantic data, including facial image data, voice recognition, and remote user location (such as phone # or IP address) can aid the contextual interface 450 in recognizing that the remote users 10*b* include individuals important to the local users 10*a*. That is, the contextual interface 450 can recognize that the remote users 10*b* are the parents, grandparents, friends, or other family members. As a result, the contextual interface 450 can determine that the remote users 10*b* (for example, grandparents) might be interested in the separate activities of one or more individuals (for example, grandchildren) that are occurring in a second and separated area from the primary area of activity (for example, involving the parents) within a local environment 415. On such a basis, the contextual interface 450 can cause the video communication devices 300 to offer split screen imagery of both sets of activities to both the display 110 at the local site 362 and the display 110 at the remote site 364. As a related point, the privacy settings maintained in the privacy interface 450 of the local device 300 may depend on the identity of the remote users 10*b*. Thus, as an example, privacy settings that obscure the nudity of unclothed children may not be applied if the remote users 10*b* are recognized to be the grandparents. However, if the identity of the remote users 10*b* changes during the course of a communication event, the device may need to recognize the changes (for example using face recognition), and automatically apply alternate privacy settings. Of course, depending on the circumstances, it may be better to apply the privacy setting changes quickly, gradually, or with a delay. The contextual interface 450 can also be used to edit incoming content (such as remotely originated video) to have it conform to the local privacy settings. As an example, remote video can be edited to obscure nudity or delete swear words, which local users 10*a* may not desire to have output into their local environment 415.

As described, the contextual interface 450 can have several operational modes (or video capture modes) to enable it to assist users 10 in capturing and sharing their activities with remote viewers. Although the device 300 can operate in a WFOV only mode, in practice, many users 10 will want the device 300 to use zoom, pan, and tilt functions to localize and track activities within an environment 415. The contextual interface 450 is key, as it can be tasked with recognizing the significance of the individuals and their activities in relation to their environment. Another key to the operation of the contextual interface, is its' use to monitor the available WFOV to determine what activities are occurring in the environment, while simultaneously enabling image capture from a field of view that can be very different from the WFOV image. The contextual interface 450 can support automatic operation, which includes responding to transitions in the individuals and activities. Several video capture modes of the device 300 have been previously described, and are listed in Table 1. Additional, background has now been given for definitions of various automatic modes, based on various video communication contexts and content, including 1) user classification, 2) user identity, 3) user lock and follow, 4) location and duration of activity within an area or environment, and 5) event type classification. For example, as previously described, a video capture prioritizing based on user classification or identity can use a hierarchical approach to selecting video content. Video capture utilizing a user lock and follow approach can be based on user identity, or be more event oriented, and can, for example, "follow the clown". Automatic video capture modes can be based on approaches that recognize regions of activity, without necessarily recognizing the activities themselves, or alternately on recognition and interpretation of gestures, user audio cues, or behaviors to determine changes in video capture or processing. Different video capture modes can also be defined based on different event classifications, as for example, the defined video capture settings for a party can be significantly different from those for a single person purposeful event.

TABLE 1

Video Capture Modes

Video capture modes define a range of settings that describe various operational capture attributes, including: the operation of WFOV cameras, the operation of NFOV cameras, the operation of pan, tilt, and zoom functions, the application of privacy settings, audio settings and processing, uses of video processing, and response (timing, magnitude) to intra-scene and inter-scene transitions.
Manual mode
Preview mode
Default modes—such as WFOV capture only, audio only, or initial capture
Automatic capture modes—based on contextual cues such as user classification or identity, user gestures, voice or audio cues, behaviors, or event classifications
Intermediate or semi-automatic modes—a hybrid of manual and automatic modes
Portable mode (including an outdoors mode)

Video capture modes can be applied differently from one video communication event 600 to another, or within an event, depending on either device 300 direction or user direction. The interface controls 190 can provide users 10 the opportunity to select the contextual mode for capture and transition management appropriate for an event. Other video capture modes for capture and transition management can be developed besides those mentioned, for example, to adapt to the device 300 being moved (portable operation). As another example, a device 300 can have an outdoors video capture mode, for which environmental conditions (such as lighting) can be recognized and accommodated. The contextual interface 450 can also interpret and anticipate the individuals it is observing, and their activities, rather than just react to them. In performing these interpretive functions relative to context and privacy, the contextual interface 450 utilizes semantic data to varying extents to recognize current and alternate video contexts that can be related to video capture modes. It is noted that semantics is defined as the study of information related to human meaning or experience. Semantic information (such as events, activities, people, locations, objects, music genres) can be associated with an informational asset (such as an image, a voice record, or a data file).

The operation of the contextual interface 450 has been with emphasis on various aspects of the image recognition and interpretation. Audio is also key, with the previously cited aspects of voice recognition, use of verbal commands and cues, monitoring of an audio field of view (430), and audio based motion tracking and locating, representing only a subset of the relevant issues. Notably, the audio quality will affect the ability of the video communication device 300 to provide an effective experience for the remote users 10*b*. The audio system can provide user interface controls 190 for altering the audio bass/treble tone sensitivity. Also as previously noted, the device 300 can be equipped with multiple microphones 144, including one or more directional microphones, which can both help localize a noise source and help to distinguish one sound source (or voice) from another. In addition, it can be anticipated that the audio system can employ sound cancellation and noise suppression technologies to enhance the audio experience, which can be facilitated through audio processor 325. It can be particularly important to reduce sounds in the local environment, ambient (such as from road traffic or a barking dog) or otherwise (electronic noise), that impair the voice pick-up for the remote users. Of course, there are circumstances where ambient sounds, such as music, are meant to be heard by the remote users 10b. Therefore, the interface controls 190 can include adjustable audio quality controls. The contextual interface 450 can also utilize a database or library of non-voice audio cues, including the sounds of clapping, laughing, crying, barking dogs, and meowing cats. This supporting collection of audio cues can be both generic and specific to a given residence, individuals, or location. Both reference images 460 and reference audio can be created and maintained for animals by the video communication device 300.

The use of audio cues can be particularly useful if the contextual interface 450 is attempting to recognize pets. While pets can often be distinguished by their visual appearance, their typical proximity to the floor can mean that they are out of the image field of view 420 of a camera 120. In practice, the recognition and tracking of pets by the video communication device 300 can be for the purpose of deliberately including or excluding or de-emphasizing their presence in the video capture and transmission process.

In designing the video communication system 290 for residential use, the management of user privacy, in both an electronic sense (privacy protocol, passwords, recording, encryption, etc.) and in a contextual sense (fields of view, capture warnings, identity, attire, events, etc.), can be important. The devices 300 of video communication system 290 have been described as employing a structure of a privacy interface 400 and a contextual interface 450, whose primary described attributes are summarized below in Table 2.

TABLE 2

| Privacy Interface—Settings and Functions include: | Contextual Interface—Settings and Functions include: |
|---|---|
| Privacy language protocol—for initiating video transmission and supporting across network encryption and decryption, for controlling recording and multi-way transmissions, for indicating transmission failure<br>Image capture indicators (including audio tones, visual cues, open shutters)<br>Picture-in picture (split screen)<br>Restrict or modify capture field of view (camera selection, camera controls, image processing of captured images)<br>Limit field of view requests of remote users<br>Control privacy relative to privacy sensitive regions of the human body<br>Control access to privacy settings (password) | Scene analysis and scene adjustment algorithms (& rules)<br>Manages the user determined restrictions and modifications to the field of view (cropping, blurring, shading)<br>Determines when to actively alter images to enhance privacy (limit field of view, blur, crop) relative to an area or an individual (such as for nudity)<br>Determines FOV size and location within a local environment relative to tracking an individual<br>Determines FOV size and location within a local environment relative to the presence of multiple individuals<br>Interprets cues, such as gestures<br>Recognizes event types and adapt image capture and transmission accordingly<br>Recognizes and classify types of individuals (children, adults) within an environment<br>Identifies individuals in the environment<br>Recognizes presence of animals<br>Maintains identity, relationships, event-types, and other contextual data<br>Associates local individuals with their privacy settings access or privacy settings<br>Associates local and remote individuals with local context (identity and relative importance)<br>Apply contextual changes at user direction<br>Apply contextual changes to incoming video |

A system 290 or device 300 may not operate, or even be equipped with all these described privacy and contextual management settings and functions. For example, a device 300 that is operating in a manual video capture mode can have little need for many of the settings and functions of the contextual interface 450. The operation of the overall user interface 440 can be simplified if a reduced contextual management structure is used. As an example, a rather simplified version of the contextual interface 450 can be defined with primary functionality to manage privacy and field of view relative to image areas (420, 422) and personal body privacy. As an enhancement, the features of determining FOV size and location relative to one or more individuals can be provided as an added function to the contextual interface 450, which enables a further level of automatic operation. Another complement of added functions, which enhances automatic operation, involves the recognition and response to a range of semantic interpretive cues, involving recognition of various human behaviors (including laughter, clapping, dancing, and jumping), human activities or events (including parties, dinner events, game playing) and human associations (such as with animals). The maintenance and application of human identity and relationship semantic information, relative to local or remote users, and using privacy and contextual information, represents another complement of added functions to the contextual interface 450, which can add significant value, but which require greater personal information.

As noted previously, user interface 440 can have interface controls 190, such as an on/off switch, an audio output volume control, or a display brightness control, which are basically independent of either the privacy interface 400 or the contextual interface 450. However, the privacy interface 400 and the contextual interface 450 are both very significant elements of the user interface 440. Each of these interfaces includes a range of user settings and controls and a directly accessible interface (such as graphical or menu interface) to enable user 10 access to these settings and controls. Each of these interfaces further includes internal interface or control settings, supporting databases, and supporting algorithms that determine the operation of a video communication device 300, or the interaction between multiple devices 300 within a video communication system 290. In a sense, the internal interface or control settings, or the application of the associated internal algorithms, represent the application of the related user inputs for settings and controls to the operation of the device 300 or system 290. Whether used in a manual or automatic video capture mode, the user interface 440 needs to enable users 10 to readily initiate or participate in a communication event, without being significantly encumbered by the options. As an example, both the privacy interface 400 and the contextual interface 450 can have a two-level structure, with the more transient settings and the more static or default settings separated. The user interface 440 can also offer a series of operational formats (video capture modes) with pre-determined privacy and contextual settings that can then be applied immediately. For example, a user 10 could select an appropriate format, such as "dinner party", "grandparents", "board game", "kitchen", "workshop", or "friends", for a given communication event. Either the users 10 or others, including the system manufacturer, can create a range of operational formats for the device 300.

In the previous discussions, the main elements of the video communication device 300, and particularly the privacy interface 400 and the contextual interface 450 have been qualitatively described relative to how they relate to human interpersonal interactions and relationships. However, the operation of device 300 and these interfaces can be further understood using a series of flow diagrams that describe the operational methodology utilized during communication events. FIG. 7A generally illustrates the overall operational processes that devices 300 step through when in use during a video communication event 600. As FIG. 7A shows, a typical communication event 600 begins with a process of invitation 605 and acceptance 610, during which a local device 300 and a remote device 300 establish connections across a network 360 (see FIG. 1). From a systems point of view, this connection process includes the use of a network protocol to locate, identify, and contact a desired address using an "electronic handshake" 365 between the two interacting devices. This electronic handshake process (365) can also utilize a privacy language protocol, which translates privacy settings across the network 360, as an exchange of authorization status regarding video transmission (rather than just audio), encryption and decryption, recording, and other privacy related features. Relative to the users 10, during invitation 605 and acceptance 610, the user interface 440 provides means to direct and receive calls, including such possible features as contact lists, caller ID, and incoming call or connection alerts. Users 10 can also be expected to determine any initial privacy or contextual settings they intend to use during this process of invitation 605 and acceptance 610, using the user interface 440, including the privacy interface 400 and contextual interface 450 as appropriate. This can involve the use of a preview mode, during which image and audio capture and privacy settings may be modified. Invitation 605 and acceptance 610 typically then leads to the initiation of video transmission (step 615), directly, or after a delay, depending on whether the users were employing initial audio mute or video blanking features.

Video transmission is initiated with a first video interaction or video scene 620, using one or more image capture devices 120 in each environment 415, according to the respective initial video contexts. An initial video context (such as an event classification) and an associated video capture mode (for video and audio capture and processing settings) may be user supplied, or device (300) supplied (in the latter case, likely using default settings). The initial video scene 620 for the local and remote users 10a and 10b proceeds naturally from their respective local environments 415. While a communication event 600 may end (end transmission step 617) without any consequential transitions between first and second video scenes 620, transition testing is likely occurring on an ongoing basis, particularly if the device 300 is operating in an automatic video capture mode.

The concept of user activity transitions and video capture transitions as been discussed previously, with various examples of both changes in user activities and in video capture settings, as for example, associated with event classifications. A particularly useful nomenclature for this invention is to define intra-scene transitions and inter-scene transitions. FIG. 4C depicts examples of transitions in content and context than can occur during a communication event 600. As the user 10a changed his position or activities with the first video scene 620, small changes in video image capture and processing relative to focus, contrast, eye gaze, field of view, or other factors may have been required. Intra-scene transitions describe small changes in video capture settings that can be completed without involving a change in the video context for a communication event or video scene, and are associated with small changes in user activities. Expressed another way, intra-scene transitions relate to small changes in user activities that are consistent with the nature of the present communication event or video scene 620. The concept of a "small change" is context dependent, as a small change for a purposeful event (FIG. 4C, video scene 620), compared to a large area spontaneous event (FIG. 2), can be quite different. In many instances, intra-scene transitions correspond to changes within portions of the local environment (or field of view) relating to scene composition or audio that reduce the communicative impact or quality of the video communication, unless corrected. However, small intra-scene changes in the video capture (such as panning a camera to include a second (new) local individual can provide a benefit to a remote viewer beyond just compensating for image or audio quality losses.

By comparison, an inter-scene transition relates to changes in the nature of the communication event, such that a change from one defined video context to a subsequent video context, or a large change in video capture settings, is required. For example, as the user 10a of FIG. 4C progressed from the first video scene 620 to the second video scene 620', a transition in video context and video capture settings may have occurred. In FIG. 4C, the user may have progressed from a purposeful event to a more spontaneous event, which emphasize different video settings. As an example, while a need for eye contact during the purposeful event can place a premium on gaze correction, the video capture for the spontaneous event can involve a larger field of view, intermittent eye gaze correction, and occasional track and follow imaging. Thus, the progression in FIG. 4C from first video scene 620 to second video scene 620' can represent an inter-scene transition, for which the changes in a communication event 600 are assessed to be sufficiently significant (relative to a defined video context or the associated video capture mode) to be identified as representing an ongoing transition in content and activity to an alternate video context.

In general, the transition test 630 monitors the ongoing video stream, as well as video and audio from outside a current transmitted field of view 420, to assess whether an inter-scene transition from a current video scene 620 to a subsequent video scene 620' (with an alternate video context) is occurring. The transition test 630 assesses video imagery for the current video scene, relative to earlier data, using metrics (for area of activity, rate of activity, field of view, or confidence levels), contextual cues, the defined video context (or deviations there-from), to identify a potential video scene transition. The transition test 630 then a transition process 640 is initiated to interpret and respond to the transition and change the operation of device 300 appropriately. On the other hand, if the changes within a scene are of lesser significance, appropriate responses can be provided by scene capture management 650.

Figure 7B:
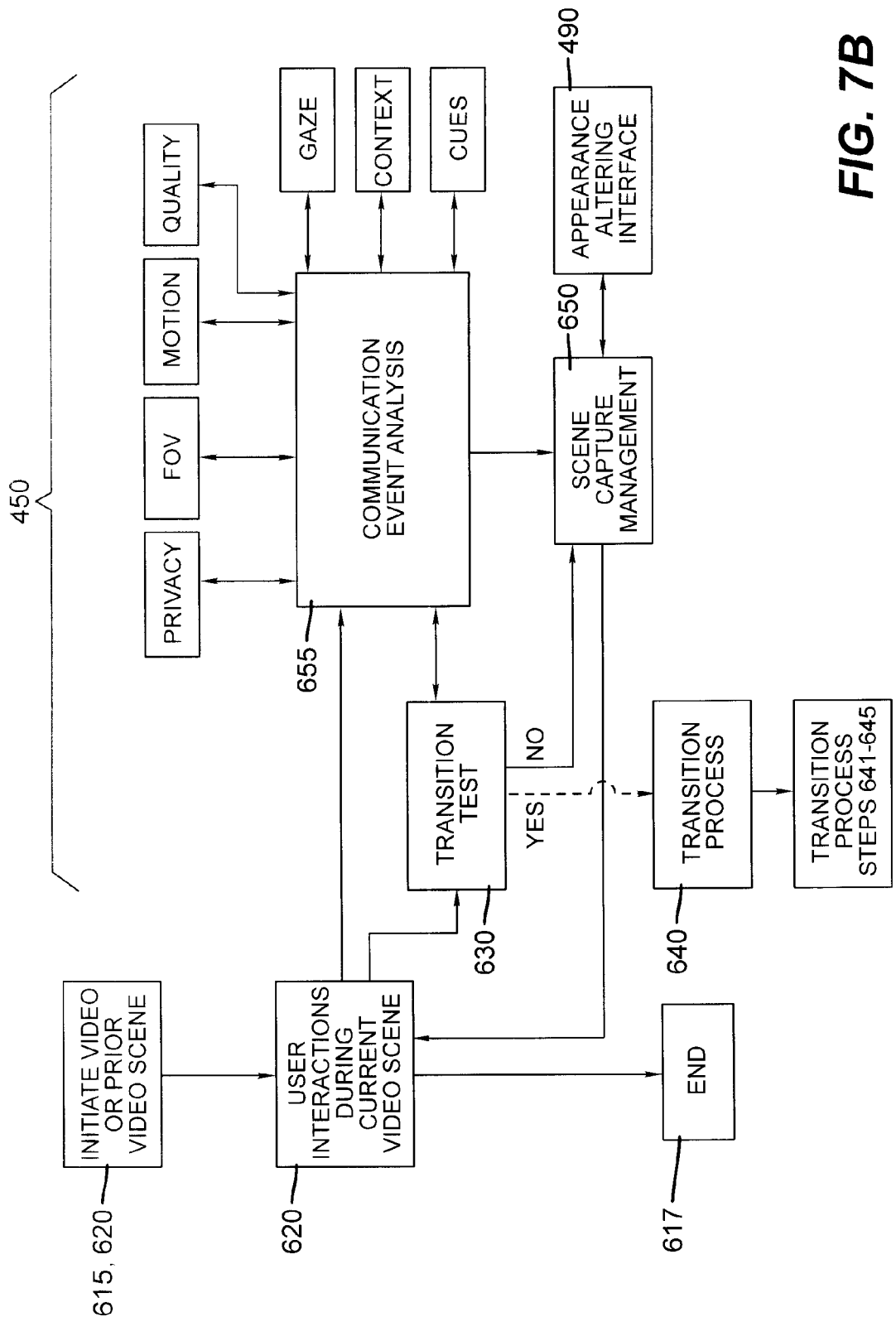
Figure 7C:
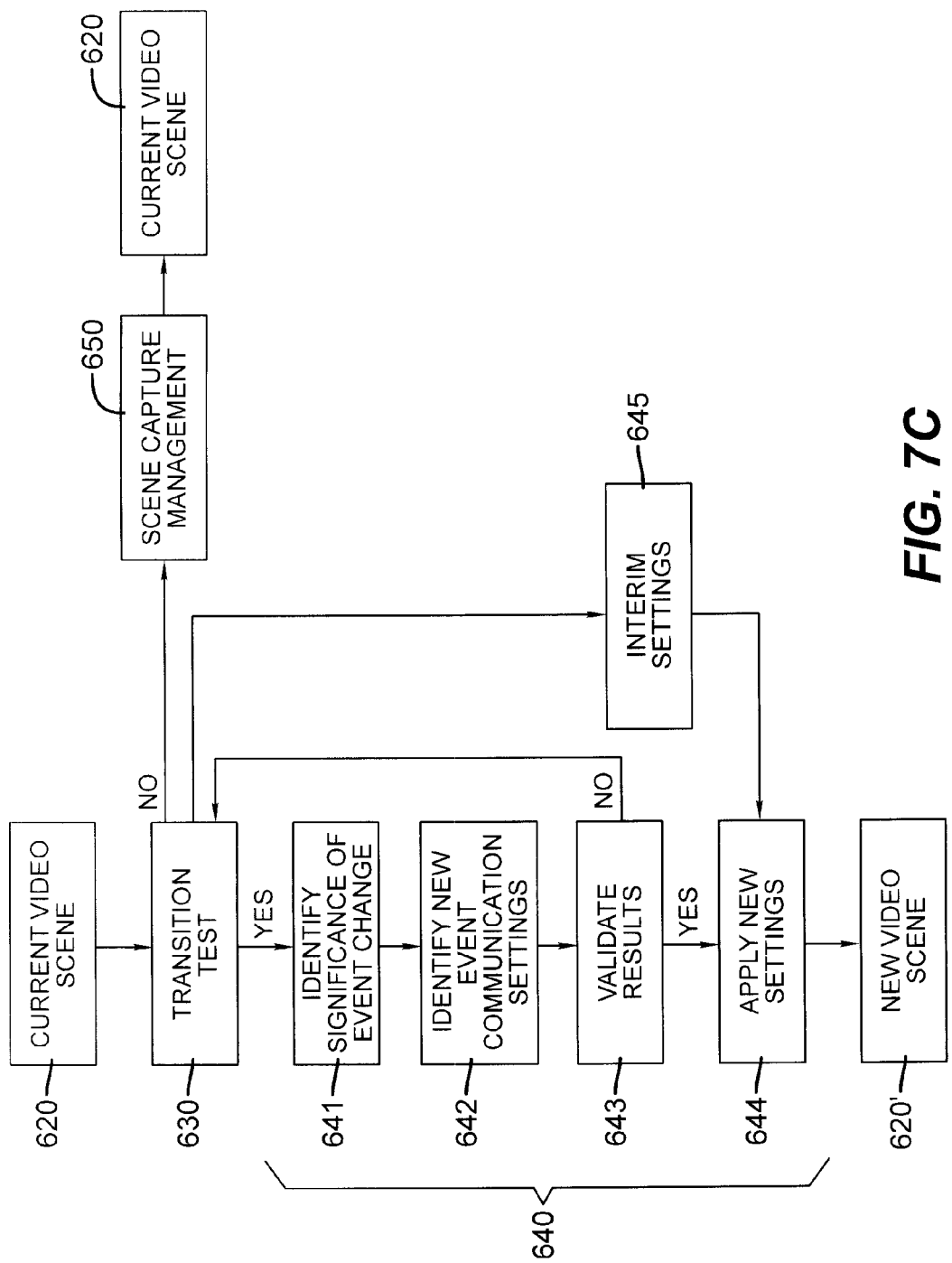
Figure 7D:
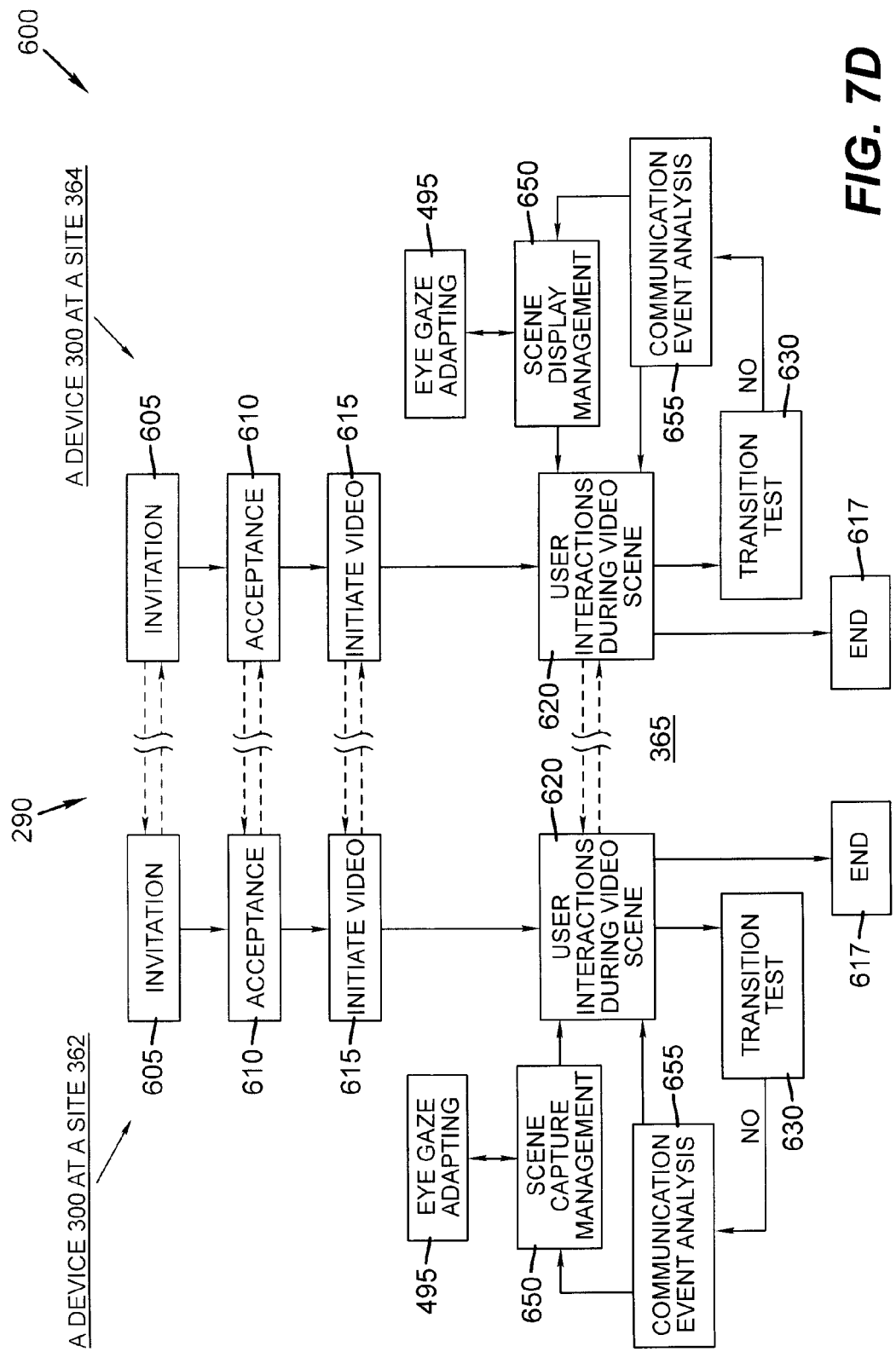

More broadly, the previously discussed contextual interface 450 includes an intelligent agent or artificial intelligence (AI) or set of algorithms that adaptively responds (and perhaps anticipates) user activities, and modifies the video capture process to improve the video experience. Contextual interface 450 can also be a learning system, that progressively gains understanding of user activities and communication needs. These algorithms, and the supporting system data that enables their operation, are outlined in Table 3. As shown in FIGS. 7A and 7B, the contextual interface 450 includes the transition test 630, the transition process 640, scene capture analysis 655, and scene capture management 650, which are all aspects or manifestations of this system intelligence. FIGS. 7B and 7C expand upon the operational process steps for a communication event 600 depicted in FIG. 7A, showing greater details regarding scene capture management 650 and the transition process 640. As shown in FIG. 7B, during a video scene 620, the device 300 can perform communication event analysis 655 and transition testing 630, for example as parallel path activities. Both the communication event analysis 655 and the transition test 630 are scene analysis algorithms (intra-scene analysis and inter-scene analysis respectively) tasked with assessing data directly derived from the video data streams (and audio) and identifying the significance of detected changes in scene content and context. The analysis approach is multivariate, as the scene analysis algorithms evaluate video scenes using a combination of scene content metrics, scene analysis rules, contextual cues, and statistical measures. Likewise, the scene capture management algorithm (650) and capture transition algorithm (FIG. 7C, step 644) are video capture scene adjustment algorithms tasked with modifying ongoing video capture by adjusting the defined video capture settings. FIG. 7D also expands upon the operational flow of system activities for a communication event 600 shown in FIG. 7A, but with emphasis on the interaction and data flow (including transmission of video and audio signals) exchanged between two devices 300 of a video communication system 290 across the video communication link represented by network 365.

Communication event analysis 655 examines the imagery from a video scene 620 to identify intra-scene transitions that may require video (or audio) capture or processing adjustments in order to enhance the user experience. In particular, communication event analysis 655 examines the scene content or context of current and prior video images with scene analysis rules relative to attributes including privacy, FOV, motion and activity, image or sound quality, gaze, context, and cues (such as voice, gestures, or emotions) to look for small changes in scene content within a video scene 620 that a device 300 can address with small changes in video capture or processing. These changes should be consistent with (or correlate to) the defined video context and associated video capture mode. For example, during the video scene 620 of FIG. 4C, as local user 10a moves about in his chair, small beneficial changes in focus, FOV, or brightness may be identified by algorithm 655. Communication event analysis 655 can examine video and audio both from within a current image field of view 420, but also from beyond it (as captured by a WFOV camera 120 (see FIGS. 4A and 4B). Communication event analysis can also produce intra-scene transition confidence values, to indicate the anticipated reliability of the identified video capture setting changes. Scene capture management 650 accepts the results from communication event analysis 655, determines what scene capture adjustments to make and how to make them, and applies them to the ongoing video capture and processing via computer 340, image processor 320, and other components.

By comparison, the transition test 630 is a scene analysis algorithm that examines the current and prior imagery (and/or audio) from a video scene 620 with scene analysis rules and scene metrics to identify scene content that may represent an inter-scene transition from a current video scene 620 with a defined video context and video capture mode to a following video scene 620'. The transition test 630 can also use data collected beyond a current NFOV, from either a WFOV 420 or an audio field of view 430, to identify a potential inter-scene transition. In particular, the transition test 630 determines that the current event classification or capture mode may no longer be appropriate or optimal for ongoing video capture because of changes in user activities relative to a previously defined video communication context. For example, the local user 10a of FIG. 4C transitioned from his activities in video scene 620 to new activities in video scene 620'. As this change in activities between scenes occurs, transition tests 630 would identify that the changes in user activity likely represent a significant scene change relative to the current video capture or processing settings. In the instances that a change in scene content is identified as a likely transition, the transition process 640 is then used to identify the nature of the transition in greater detail, and then identify and initiate appropriate changes to the ongoing video capture or processing.

TABLE 3

Primary processes and data for the contextual interface 450

Types of system data include:

Algorithm rules—based upon factors including event classification, privacy settings, timing expectations (rate & frequency of changes).
Quantitative algorithm metrics—includes thresholds, weighting factors, probability values, confidence values (intra-scene and inter-scene).

TABLE 3-continued

Primary processes and data for the contextual interface 450

Content (capture conditions) metrics—includes field of view (FOV) extent and direction, image quality (resolution (focus), color, brightness, contrast), audio quality.
Content (image) metrics—image patterns and data indicative of surface structures; image data indicative of location and duration of activity, rates of motion, gaze.
Video communication context (video context)—context or content based classifications that can have associated automatic video capture modes, including those based on: location and duration of activity within an area (detected range of motion), event classifications (including large group (party, dinner, games), small group or individual, spontaneous, purposeful, transitional, portable, lock & follow, and hierarchical (using user classification or identity) events).
Context (supporting cues and semantic information)—includes: classification of people, identity & relationships of people, gestures (including pointing, waving, & eye gaze) & behaviors (laughter, clapping, dancing, jumping), privacy cues, knowledge of objects & pets, knowledge of calendar or schedule.
Reference images 460
For an ongoing communication event (see FIG. 7B):

Communication event analysis 655—an intra-scene analysis algorithm that assesses video & audio from a current communication event 600 or video scene 620 using scene analysis rules and scene content metrics to identify intra-scene transitions in content and context for which small video capture or video processing changes (& audio too) that can be made to enhance the user experience.
Scene capture management 650—this capture transition algorithm receives the input from communication event analysis, and using scene adjustment rules, determines how & what scene adjustments will be made to the ongoing video capture & processing of the current scene, relative to timing, magnitude, and other factors.
Transition test 630 (see FIGS. 7B and 7C):

Transition test algorithm—an inter-scene analysis algorithm that assesses video & audio from a current video communication event 600 or video scene 620 using scene analysis rules and scene content metrics to identify inter-scene transitions in content or context to a new scene for which a change in the defined video capture mode can be made to adapt to large transitions in user activities.
Transition process 640 (see FIG. 7C):

Transition process 640 is a structured series of steps to identify a new video context and appropriate video capture and processing settings and associated confidence values for these determinations, and then to test the validity of the results, before applying them, and further enabling interim video settings if appropriate.
Video context (event) selection algorithm (for step 641).
New video capture mode selection (step 642).
Transition validation algorithm (for step 643).
Interim transition algorithm for interim video capture settings (for step 645).
Capture transition scene adjustment algorithm (for step 644)—enables change from a current video context to a subsequent video context, by changing the associated capture settings.
Appearance altering interface 490

Gaze adapting process 495, gaze direction confidence values.

---

Turning to FIG. 7C, the transition process structure (640) is illustrated in further detail, as a series of transition process steps 641-645. In a first step (641), the ongoing change in inter-scene content is contextually identified using current and prior video imagery, for example based upon statistical metrics and a video context selection algorithm, to determine a new appropriate video context classification. As examples, a transition in scene content from one event type to another, such as a group party activity to a group card activity, or from a purposeful to more spontaneous event (as in FIG. 4C), or from an event involving children to one involving their parents, can be identified as a change in the video context to a new or alternate video context. In a second step (642), the transition process 640 identifies resulting changes that can be made to the video or audio capture, or video or audio processing, to provide a new video capture mode that corresponds to the identified new event classification. The changes in the defined video capture settings can include field of view (FOV) adjustments, application of privacy settings, response to user motion or activities or gestures, appearance based image changes (such as for gaze), or improvements in the image quality. Preferentially, the changes are consistent with an available defined video capture mode, but custom video capture settings for a communication event 600 or video scene 620 can be identified and used if appropriate. In a third step (643), the transition process 640 can test (statistically) the validity of the identified inter-scene transition, an identified new video context (event) classification, the identified new video capture mode, and the associated video and audio settings. If the resulting analysis is affirmative (indicating validated scene transitions), the following step (644) defines and manages the transition and adjustment to a subsequent video context, with new video capture settings for the ongoing video. If the resulting analysis is negative, or sufficiently uncertain, the device 300 can continue with the current video mode, using scene capture management 650 or initiate interim video settings (step 645) until the uncertainties can be further resolved.

Although the contextual interface 450 responds to direct user input to enable some manual control over video capture and video processing, the contextual interface 450 is also designed to control the device 300 during automatic video capture modes to provide user's an enhanced video experience. In particular, each device 300 is thus intended to provide high quality video that responds seamlessly and gracefully to changes in the user environment 415 during video communication events 600. Any changes that the device 300 makes in the video capture and processing need to occur over an appropriate time period and frequency that enhances the video experience, but avoids annoying the users. In the prior discussion, the general operational flow, which is diagrammed in FIGS. 7A-C, was described. However, the analysis and assessment processes and steps still need to be described in greater detail.

While FIG. 7A, depicts transition test 630 as preceding communication event analysis 655, the two scene analysis processes likely occur in parallel, as depicted in FIG. 7B. Effectively communication event analysis 655 determines whether current user activities are consistent with the current video capture mode corresponding to the current video context or event classification, while the transition test 630 determines whether current user activities in the current scene are indicative of a transition (ongoing or pending) to a new video scene 620, which can be described by a new context classification and captured by a new corresponding video capture mode. Video context classification utilizes a series of rules that can examine various context related cues (user classification, user identity, gestures, behaviors (such as laughing or jumping), voice cues, privacy settings, semantic calendar knowledge, objects, or clothing) and various context defined event types (such as events based on location and duration of activity, track & follow, large group, small group or individual, spontaneous, purposeful, transitional, or portable) to classify a video scene 620 or a communication event 600 as an event. Video capture modes, defining video capture and processing settings, can then be associated with the video context classifications. Video context classification can be supported by a set of quantitative activity attributes (such as the number of people (or faces), areas of significant activity or distributions of people, FOV, rates of motion, or patterns of motion). Video context (event) classification can also be supported by a library of pre-defined reference images, with associated supporting reference data and statistics. For example, the quantitative measures related to one or two local users engaged in a purposeful activity would typically be quite different from the quantitative measures for a large number of people (15, for example) engaged in a party.

Both the video context selection algorithm and the scene analysis algorithms (transition test 630 and communication event analysis 655) of contextual interface 450 can use statistical analysis methods to reach decisions regarding the video scene content and context. As one approach, these scene analysis algorithms can use statistical tests to analyze ongoing video to determine whether a transition is occurring or not, by calculating probabilities as to whether a change in user activity has a small, intermediate, or large probability of being an intra-scene transition or an inter-scene transition. Additionally, these scene analysis algorithms calculate confidence values (or confidence levels), which are a measure of the confidence assigned to the value of an attribute (in this case, a transition), and which are often expressed as a percentage (0-100%) or a probability (0-1). Likewise, when a potential inter-scene transition is identified, the video context selection algorithm can use contextual cues and decision rules to determine a new video context classification, and calculate associated video context confidence values which can be used in transition process step 643 to support validity analysis of an identified inter-scene transition. Scene analysis rules support these processes, for example by defining analysis requirements, transition probabilities, and confidence levels appropriate for different video contexts.

The operation of communication event analysis 655 in analyzing intra-scene transitions using algorithmic rules and metrics in a current video scene 620 can now be better appreciated. Considering again the first video scene 620 of FIG. 4C, local user 10a is engaged in a purposeful video communication event 600 with remote user 10b. Initial capture settings, including for privacy, audio, image capture, and image quality are assumed to have been established by some combination of direct user input and device 300 selection. As the scene proceeds, local user 10a may move (such as stretch, fidget, or look away) while staying within the confines of the captured scene. Likewise, during the course of the video scene 620, users 10 may use e-mail, document scanners, the Internet, or other features to enhance their communication. As such activities occur, transition test 630 can conclude that these actions are below inter-scene transition valuation thresholds (or have low inter-scene transition confidence values), while communication event analysis 655 can conclude (with high intra-scene transition confidence values) that the ongoing activities are consistent with (correlate to) intra-scene metrics and settings for the current video scene 620 and associated video capture mode. Communication event analysis 655 then also identifies any changes in video capture and processing (and audio) that are consistent with the current video scene 620 that can be made in response to intra-scene user activities. For example, the scene analysis algorithm can use scene analysis rules based upon the type of event, as the changes that may be made for viewership of a large event (a party, for example) can be different than those for a single individual engaged in a purposeful event (scene 620 of FIG. 4C). Similarly, the number of video frames used by the algorithm to assess a change may vary depending on the event classification, scale and rate of user motion relative to the FOV 420, or other factors. Using a scene analysis algorithm, communication event analysis 655 can for example track user motion and determine that a small change in the capture FOV 420 or focus (image quality) is appropriate (or not, depending on calculated intra-scene adjustment confidence values) as a result of the local user 10 shifting to a new position in their chair (scene 620 of FIG. 4C). Other user actions, such as fidgeting, can fall below activity threshold metrics, and be ignored. As another example, as the local user 10a looks away and back again, communication event analysis 655 can determine that gaze adapting process 495 (discussed later) is to be disabled and then later enabled.

Scene capture management 650 receives the identified change data from communication event analysis 655, and any associated intra-scene adjustment confidence values, and then applies a capture transition algorithm to determine how intra-scene video capture and processing scene adjustments will be made by the device 300. This algorithm includes a set of scene adjustment rules, based upon factors including event classification, privacy settings, temporal issues (rate and frequency of the capture changes compared to the rate of change of the local activities and the remote viewers perception of change), the magnitude of the changes, or intra-scene adjustment confidence values. For example, as the local user 10a of video scene 620 of FIG. 4C moves in his chair, scene capture management 650 can cause the device 300 to make changes in the capture FOV 420 and image focus over the space of a few frame times or many seconds, depending on what level of remote user awareness is desirable for a given change. As another example, rules based weighting factors can prioritize changes in FOV 420 and focus during a lock and track event to occur prior to other changes in image quality (color) or gaze correction.

Likewise, the operation of the transition test 630 and the transition process 640 can be described in greater detail. Again, the transition test algorithm 630 assesses the video and audio from a current video scene 620 to identify large changes relative to the current video capture mode corresponding to large inter-scene transitions in user activities. The algorithm can use scene analysis and decision rules, involving video context and event classification data, current capture condition data, personal context data, weighting factors and thresholds, inter-scene transition confidence values, and other terms, to perform the analysis. Considering again FIG. 4C, as local user 10*a* progressed from video scene 620 to video scene 620', user 10*a* stood up, partially cleared the table, and obtained a drink. Using this example, as the local user 10*a* moves in his chair, the transition test 630 can first conclude that the activities are below a transition threshold and that low inter-scene transition confidence values statistically indicate that a transition is not occurring. Any appropriate video capture changes would then remain with communication event analysis 655 and scene capture management 650 to manage. Continuing the example, as local user 10*a* then moves his chair back away from the table, the transition test 630 may conclude that the activities are still below a transition threshold, but that the inter-scene transition confidence that a transition is occurring has risen to an intermediate level, for which interim video capture settings may be appropriate (step 645). Then when the local user 10*a* stands up, and starts to clear the table, the transition test 630 may determine that the user activity has exceeded an inter-scene transition threshold with a high confidence.

When the transition test 630 reaches an affirmative answer, the transition process 640 commences with the video context selection algorithm (step 641) to identify a new or alternate video context or event classification type that the local user(s) is engaged in. The algorithm can use system data representing the range of user activity within the field of view 420, as well as event classification, user behavior and gestures, classification, or identity, voice or object recognition, direct user input, or other data to support this assessment. Associated video context confidence values can be calculated to indicate the statistical probability of the identification of a correct event classification. In the following step 642, appropriate nominal video capture and processing settings are determined for the identified event type, preferably corresponding to a defined capture mode. As an example, the purposeful event of video scene 620 of FIG. 4C has become a more relaxed and spontaneous event in video scene 620' for which a larger field of view, aided by gradual pan, tilting, and zooming, and brightness and contrast corrections might be appropriate to provide enhanced video to the remote viewers. A video capture transition validation algorithm, shown in step 643, using the metric of the video context classification confidence value, can be applied, to verify the new video and audio settings before applying them. If the transition validation answer is affirmative, then a capture transition scene adjustment algorithm (step 644) initiates the video capture and video processing of device 300 to make the appropriate changes. Much like the previously discussed process of scene capture management 650, the capture transition scene adjustment algorithm of step 644 uses a set of scene adjustment rules to determine and manage the rate and timing of the changes to new video settings. For example, the video changes would likely be made more quickly (for example, within a few frames) if the activities were broadening within the local environment 415 quickly, rather than slowly.

Of course, the transition process 640 can conclude that an activity transition is occurring, with mid range confidence, or with high confidence of an inter-scene transition, but with low event classification confidence relative to the evolving user activities. Thus, a default or transitional video context or event classification may be assigned, and appropriate video settings established, via interim settings 645. For example, in FIG. 4C, interim video settings may apply to the activities during the time interval between video scenes 620 and 620', during which local user 10*a* was clearing the table and obtaining his drink.

For clarity, current video generally means a multitude of the most recent video frames captured from a current video scene 620. Whereas prior video generally means a multitude of video frames from the current video scene which preceded the current video frames. However, prior video can further include a multitude of video frames (or associated derived data) from one or more prior video scenes 620'.

In the above discussions, the described statistical testing and validation to identify scene transitions and the appropriate changes (whether intra-scene or inter-scene) was largely reactive, although the scene analysis algorithms assess both current and prior video imagery. As another approach, proactive or anticipatory statistical analytical methods can be used to identify potential scene transitions and the appropriate video capture and processing changes. For example, a Bayesian network methodology can be used. Bayesian networks are based upon a graphical model of probabilistic relationships among a set of variables, for which the probability of an event X is best determined based upon a person's degree of belief in that event, rather than on a classical physical probability of an event occurring. Degrees of belief are assigned to propositions, and then combined and manipulated using the rules of probability. Bayesian networks are also particularly useful for managing conditional probabilities, where the probability of one event is conditional on the probability or occurrence of a previous one (prior knowledge). In Bayesian inference, evidence is collected that is meant to be consistent or inconsistent with a given hypothesis. As evidence accumulates, the degree of belief in a hypothesis changes. With enough evidence, it will often become very high or very low. Alternately stated, Bayesian networks enable the calculation of conditional probabilities for the nodes in the network, given that the values of some of the nodes have been observed or provided. In the simplest case, a Bayesian network is specified by an expert and is then used to perform inference. In other applications the task of defining the network is too complex for humans, and the network structure and the parameters of the local distributions must be learned from data.

Bayes' theorem (Eq. 1) relates the conditional and marginal probabilities of random events A and B, taking into account the conditional probabilities or linkages between the two events;

$$P(A/B) = [P(B/A) * P(A)] / P(B) \quad (1)$$

where $P(A/B)$ is the conditional or posterior probability of event A, given B. Likewise, $P(B/A)$ is the conditional or posterior probability of event B, given A. Probabilities $P(A)$ and $P(B)$ are the marginal or apriori probabilities of events A and B respectively, as new events occurring independent of prior events (prior experiences). The probability of an event A conditional on another event B is generally different from the probability of B conditional on A. However, there is a definite relationship between the two, and Bayes' theorem is the statement of that relationship.

The Bayesian network approach can be used to support the contextual interface 450 in event classification and decision-making. As examples, there are individual marginal probabilities P(event) for each type of event (such as a large group event, a spontaneous event, or a purposeful event) occurring. Likewise, as an example, there can be conditional probabilities associated with a purposeful event transitioning to a spontaneous event (as in FIG. 4C), which may be different than for a spontaneous event transitioning to a purposeful event. As the probabilities for a transition from one event type to another are based upon knowledge of human behavior, rather than on a classical probability for a physical event (a coin flipping to heads or tails, for example), Bayesian analysis can be particularly useful.

Of course, as a current video scene 620 of a video communication event 600 evolves into a subsequent video scene 620', there are various possibilities (alternate video contexts or event classifications) that the subsequent video scene 620' may actually become. Thus a Markov probability model, which addresses the possibility of a first event randomly becoming one of a set of potential subsequent events, can be useful. However, in considering the operation of device 300 in a residential environment, it is reasonable to expect these branching probabilities to be conditional upon the current event state. For example, a purposeful event is probably more likely to evolve into a small group spontaneous event or a track and follow event than to a large group event. This type of statistical problem may then be addressed by a directional Markovian probability model (such as a $1^{st}$ order Markov source model).

In summary, the Bayesian and Markovian probabilistic inference methods may be used individually or in combination (as a hybrid) to enable the contextual interface 450 to manage event transitions. For example, the Bayesian probabilistic inference method can be used in scene analysis of current and prior video imagery to identify a potential inter-scene transition (transition test 630), testing whether an activity change is, or is not, a transition. If a transition is identified as an inter-scene transition, than a directional Markov model can be used to determine the likely event classification for the new video scene 620'. Much as before, confidence values can be tabulated, to measure the certainty of the Bayesian inter-scene transition inference or the Markovian inter-scene event classification inference. These can again be used for validation tests, perhaps resulting in the use of interim event settings. Such an approach, using a Bayesian model, can be considered to be pro-active or anticipatory, as it attempts to predict a new event state (and video capture mode), based on belief models of what may occur. It may be more difficult to implement as compared to the previously discussed statistical approach, which was more reactive.

As another consideration, the degree of automatic operation of contextual interface 450 and device 300, relative to the expectations of the users 10, may be conditionally dependent on earlier or initial video scene 620, as the video communication event 600 evolves through subsequent video scenes 620'. As an example, FIG. 4C depicts a local user 10a progressing from a purposeful type vent in video scene 620 to a more spontaneous type event in a subsequent video scene 620'. During the first video scene 620, local user 10a is in close proximity to electronic imaging device 100, and will likely expect or accept significant manual interaction with the device 300. As the subsequent spontaneous video scene 620' occurs, local user 10a will likely prefer automatic operation from device 300, relative to the managing of FOV, focus, brightness, privacy, and other attributes. However, the contextual interface may be able to satisfactorily address the user's automatic operation expectations based on scene analysis using only location and duration of activity within an area or face tracking as a cue. By comparison, the local user 10a of FIG. 4C may have migrated to the purposeful video scene 620 from a prior spontaneous party event type video scene (not shown). A demanding scene analysis and transition testing regime, using a wide range of event classification rules and context cues (including user classification or identity, gesture or behavior based, many event types) may be required to support user expectations during the spontaneous party type event. Then, in the subsequent purposeful video scene 620, although local user 10a can potentially accept limited automatic or manual operation, it is likely that many such local users will expect the prior highly automatic operation to carry through into the new circumstance.

Figure 5B:
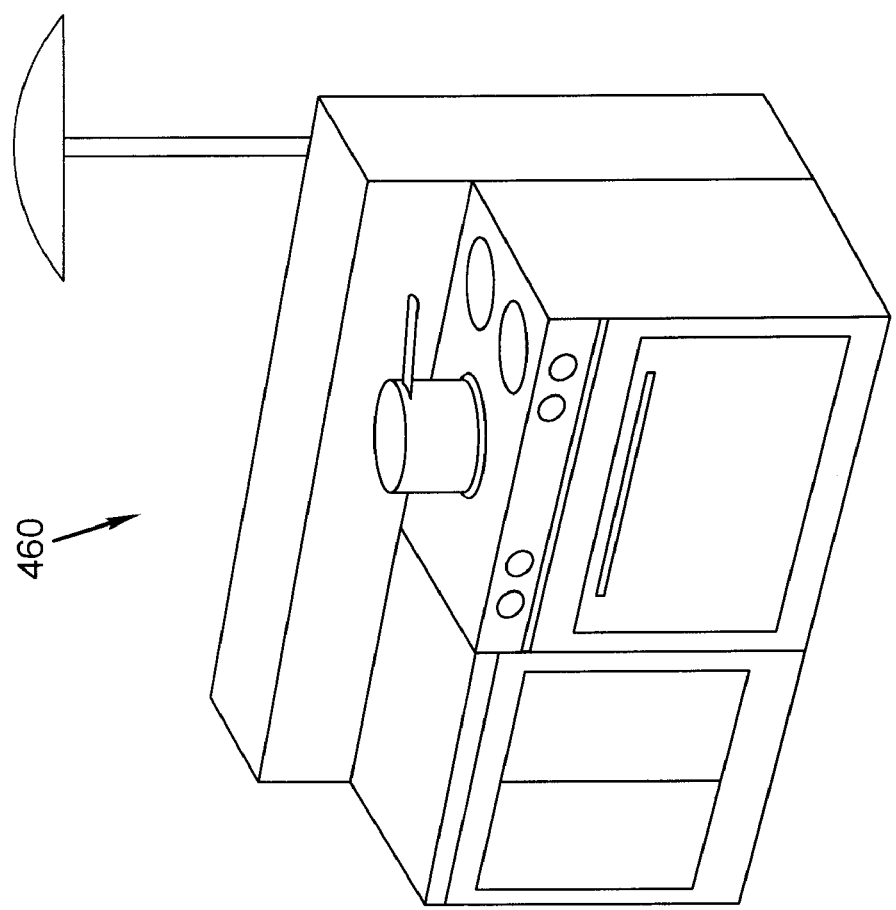
FIGS. 5A and 5B illustrate the concept of reference images.
Figure 5A:
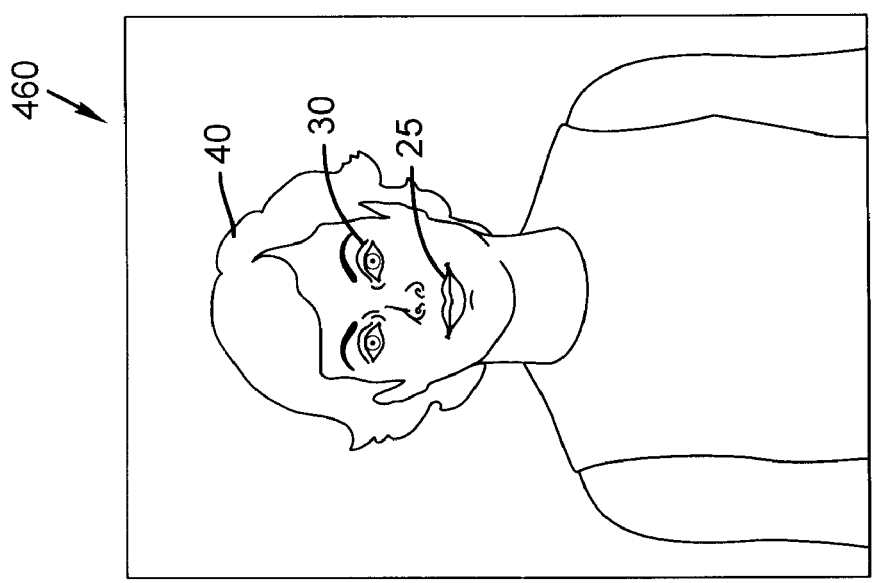

Other contextual issues are often evidenced in personal human interactions. For example, it is not uncommon to clean the house or residence, or at least part thereof, before having visitors over. As previously suggested, users 10 may have similar concerns when using the video communications system 290. It is possible that some users 10 may want their video communication device 300 to assist in the process of having their local environment 415 appear cleaner or more organized. This type of issue can be addressed by providing an optional appearance altering interface 490, which can be an additional feature to the contextual interface 450. As an example, video communication device 300 can employ a set-up process to acquire one or more reference images 460 of the local environment 415, as illustrated in FIG. 5B. As these reference images 460 basically represent calibration standards, the users 10 would be encouraged to have the local environment 415 clean and clear, as well as well lit, for this process. Then, subsequently when a local user 10 desires that the device 300 enhance the appearance of a local environment, the device can access the appropriate reference images, and assemble and apply an alteration to the captured imagery of the local environment. For example, the interface controls 190 can include a "de-clutter" button that a user 10 can use to activate this process one or more times. A first application may remove the appearance of dust and small debris. Further applications could remove larger objects 260 (such as the lamp of FIG. 2). Of course, if a user 10, during the course of a communication event 600, then interacts with a hidden object, such as the lamp, the visual incongruities for the remote viewer could be interesting. Presumably, such a hidden object would then be included in the subsequent imagery acquired during that communication event. Users 10 would provide their input through the user interface portion of the appearance altering interface 490. The interface 490, in turn would provide direction or input to scene capture management 650 relative to the video processing effects applied to an ongoing video capture.

Users 10 may also desire to change the appearance of their local environment 415 in other ways. For example, the appearance altering interface 490 can be used to change the illumination, for example to simulate black lighting. Likewise, users 10 may desire that the appearance altering interface 490 have capabilities to extract the images of the users from their local environment, and substitute in an alternate virtual environment (for example, a beach). The virtual environment images can be still images or video and the images can be stored as a library of virtual environment images in the device or obtained from other sites over a network. It can also be anticipated that some users 10 may potentially also desire that the appearance altering interface 490 have capabilities to alter personal appearance, relative to their skin, hair, clothing, or other aspects. For example, a user 10 may have the video communication device 300; through the appearance altering interface 490 of the contextual interface 450, for cosmetic reasons, change the appearance of their face 25, hair 40, or color of clothes. In such instances, it can be useful to use a reference image 460 of the user 10, in addition to current images of the same user 10, to create these effects. A comparable process can also be provided for altering the voice characteristics of the users 10.

The operation and consumer acceptance of the video communication system 290 is also dependent on the image quality obtained. While the acquired images do not necessarily have to yield "true colors", the color image quality needs to be acceptable relative to skin tone and other important memory colors. The resultant image quality is not only dependent on the spectral quality of the lighting, but also on the light level and the light level uniformity. The ambient lighting in a room can vary widely, depending on the types of room or fixture lighting used, as well as the contribution of daylight, which is often also weather dependent.

Image quality can be managed using signals derivable from the ambient light detector 140 that is indicative of whether the ambient lighting is acceptable or not. For example, ambient light detector 140 can measure the ambient light level 200 in the local environment 415. Ambient light detector 140 can also include spectral filtering or spectral dispersion devices (such as dichroic filters or diffraction gratings) to enable measurement of the optical spectrum of the ambient light. It may be sufficient for the video communication device 300 to use the spectral data simply to estimate a blackbody color temperature that approximates the room lighting. For example, typical daylight solar radiation approximates a 5900 K blackbody source. Alternately, spectral measurements can be obtained at a few choice wavelengths so that the video communication device 300 can assess the degree to which the ambient light 200 comprises common residential lighting spectra (such as from sun-light, incandescent lights, fluorescent lights, LED lighting etc.), either individually or in combination. For example, an effective light source model can be assembled by determining that the ambient light 200 at a given moment is 25% daylight and 75% incandescent lighting. Finally, the ambient light detector 140 can include a monochromator or a spectro-radiometer, to obtain detailed spectral measurements. A newly captured light source spectrum or model can also be compared to prior spectral data and color correction data that could be maintained and updated for capture from a given electronic imaging device 100. The reference images 460 can also be used as targets for providing acceptable image quality, by adjusting the current color values towards the expectation color values present in these images. Color changes can be tracked with an appropriate color space model, such as CIELAB.

Operationally, the video communication device 300 can obtain ambient lighting data from ambient light detector 140 and process it through an image quality validation algorithm to determine if the lighting generally meets acceptable limits. If not, the device 300 can advise users 10 to alter the lighting of the local environment 415 in all or part of that environment 415. Generally, it can be expected that local users would either turn on additional lighting or increase the amount of sunlight entering the local environment 415. Alternately, the device 300 can have direct control, perhaps wirelessly, over room lighting (such as illumination light source 215) or other lighting, so that it can automatically enhance the situation. Color correction values can also be developed and maintained for the different cameras used by the video communication device 300. Ultimately, image processor 320 can derive intensity and color correction values and apply them to the captured and outgoing transmitted images.

It is also noted that a residence may have multiple electronic imaging devices 100, with multiple displays 110 and cameras 120, linked in an internal network 360, as part of local video communications device 300. The multiple electronic imaging devices 100 can be used either simultaneously (such as multiple users 10) or sequentially (such as room to room) during a communication event 600. For example, as a user 10 moves from one room with an electronic imaging device 100 to another, the video capture of a communication event can track and follow the change in activity from room to room. A video capture mode with this activity following function can be either automatic or manually controlled, presumably by a local user. It can also be expected that users 10 may provide different privacy settings for different rooms (local environments 415) in their residence, which can effect how the device 300 responds when following activity from room to room. While a networked electronic imaging device 100 may be in use for a given communication event, that does not mean that electronic imaging devices 100 in other rooms are likewise on, and capturing or transmitting audio or video data. However, if this is occurring, the local displays 110 can show multiple split screen images 410 depicting image capture in each of the local environments 415. The contextual interface 450 can also apply video context knowledge of activity or event type, user classification, or user identity, as well as remote viewer identity or classification, to determine which captured content is captured and transmitted.

Figure 8:
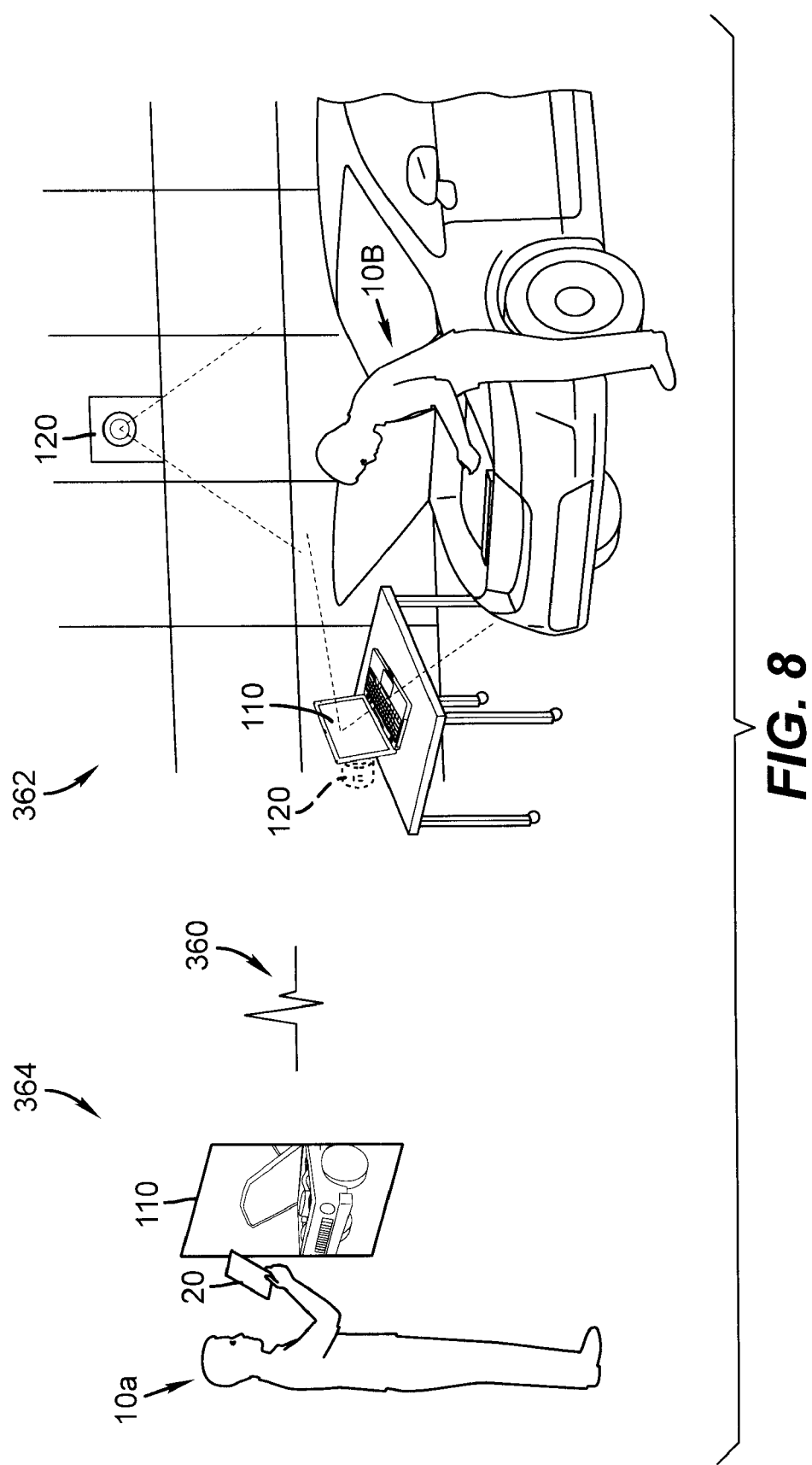
FIG. 8 depicts an embodiment of the video communication system being operated in the context of a local environment.

The video communication device 300 is intended to be an easy to use device that can also be at least semi-portable, such that consumers may use the device in various ways. As was depicted in FIG. 2, the device 300, or at least an electronic imaging device 100 portion thereof, can be mounted in a fixed fashion on a kitchen cabinet. FIG. 8 illustrates an alternate usage case, in which an electronic imaging device 100 is being used in a workshop or garage. In this example, the local user 10a could be communicating with a remote user 10b to obtain assistance with an automobile repair. Expanding the use cases, the electronic imaging device 100 may be generally mounted on the kitchen cabinet of the local environment 415 of FIG. 2, and then temporarily removed to the garage-like local environment 415 of FIG. 8. The electronic imaging device can also be transported and used in other locations within a residence, such as to a table (see FIG. 10). In addition to a given consumer's usage tendencies, the portability will largely be determined by the screen size. For example, if the display 110 is basically a large television screen or equivalent, then mobility will likely be quite limited. Whereas, if the display 110 is basically a computer lap-top, or electronic book screen or equivalent, then the mobility can be good. The device 300 can be basically the size of a cell phone or a personal digital assistant (PDA) or equivalent device, with greatly enhanced mobility. In that case, the screen size of such devices may reduce the functionality of the miniaturized video communication device 300, relative to the privacy and contextual features, although an addition of GPS location determining functionality may add new features and capabilities. As one relevant issue, effective split screen imaging can be difficult on a small screen. However, with the ongoing advances in micro-projectors, small electronic devices, such as cell phones with LED based projectors, are anticipated in the consumer electronics industry. Those devices, with their larger effective screens, may prove quite suitable for this application.

The functionality of the video communication device 300 is also dependent on the selection and placement of the image capture devices (cameras) 120 used with the device. The video communication device 300 can be provided with a single image capture device (FIGS. 3A and 6), or two image capture devices (FIGS. 1, 3B, and 4), or more. As stated previously, a pairing of a WFOV camera and at least one NFOV camera (with pan, tilt, and zoom capabilities), as shown in FIG. 4A, is particularly useful. Alternately, multiple NFOV cameras can be used which are pointed in different directions to provide different fields of view. As another variation on the device configuration, the electronic imaging device 100 depicted in FIG. 3A illustrates the display 110 and image capture device 120 as "forward looking", generally aimed in the +Z direction. The electronic imaging device 100 can also be a two-sided device, with a display 110, an image capture device 120, or both, provided not only in the +Z direction, but also facing in the −Z (opposite) direction. In such as case, the device would both display and capture images for two directions of a room or local environment 415. An electronic imaging device 100 can also be equipped with a very wide-angle camera, spanning a full angle (θ) of ~180° or larger, particularly if a fish eye lens camera or a 360° panoramic camera is used. With a 360° panoramic camera, such as a camera described in U.S. Pat. No. 6,373,642 by Wallerstein et al., or in U.S. Pat. No. 6,424,377 by Driscoll et al., the device 300 can readily image or monitor activity in the surrounding area of the local environment 415. Images captured by very wide-angle lenses typically need image distortion corrections. The image processor 320 can provide these corrections for images that are presented to local or remote viewers. It is also noted that a video communication device 300 can further use one or more image capture devices 120 within the local environment 415 that need not be in physical proximity to the electronic imaging device 100. For example, a camera 120, or an electronic imaging device 100 (with cameras 120 and a display 110) can be located in another room of the residence. These additional image capture devices 120 or devices 100 can be networked together, and enable the device 300 to capture a more expanded field of view that users may move around in. They also can enable enhanced imaging by acquiring images from perspectives that may be too limited if the image capture devices 120 are positioned solely at the electronic imaging device 100. The image processor 320 can then generate an enhanced composite image.

Of course, as users 10 move around in their local environments 415 or residences, the users 10 can end up in situations where they are not in direct eye contact with a camera 120 at an electronic imaging device 100, or with the image of a remote viewer displayed on the electronic imaging device 100. As examples, the users 10 of FIGS. 2 and 4C (scene 620″) are not in direct eye contact with their electronic imaging devices 100, whereas the local user 10a of FIG. 4C scene 620 is in direct eye contact. One interesting approach to this problem is proposed in the paper "Concept and Partial Prototype Video: Ubiquitous Video Communication with the Perception of Eye Contact", by Emmanuel Munguia Tapia, Stephen S. Intille, John Rebula, and Steve Stoddard, which was published in the Proceedings of UBICOMP 2003. In the proposed system, which assumes the acceptance of ubiquitous or pervasive computing, camera sensors are imbedded in an array-like fashion in the walls and appliances. A directional video image projector (the "everywhere displays projector") is mounted advantageously near the ceiling. Then when a local user glances at an imbedded camera during a communication event, the directional projector can display an image of the remote viewer on the exterior surface of the wall or appliance the camera in imbedded in. While this approach resolves eye contact issues, the physical infrastructure required by the system, the pervasiveness, and the visual discontinuity of seeing a disembodied head image of the remote viewer floating on the wall, might all be unacceptable.

Figure 9A:
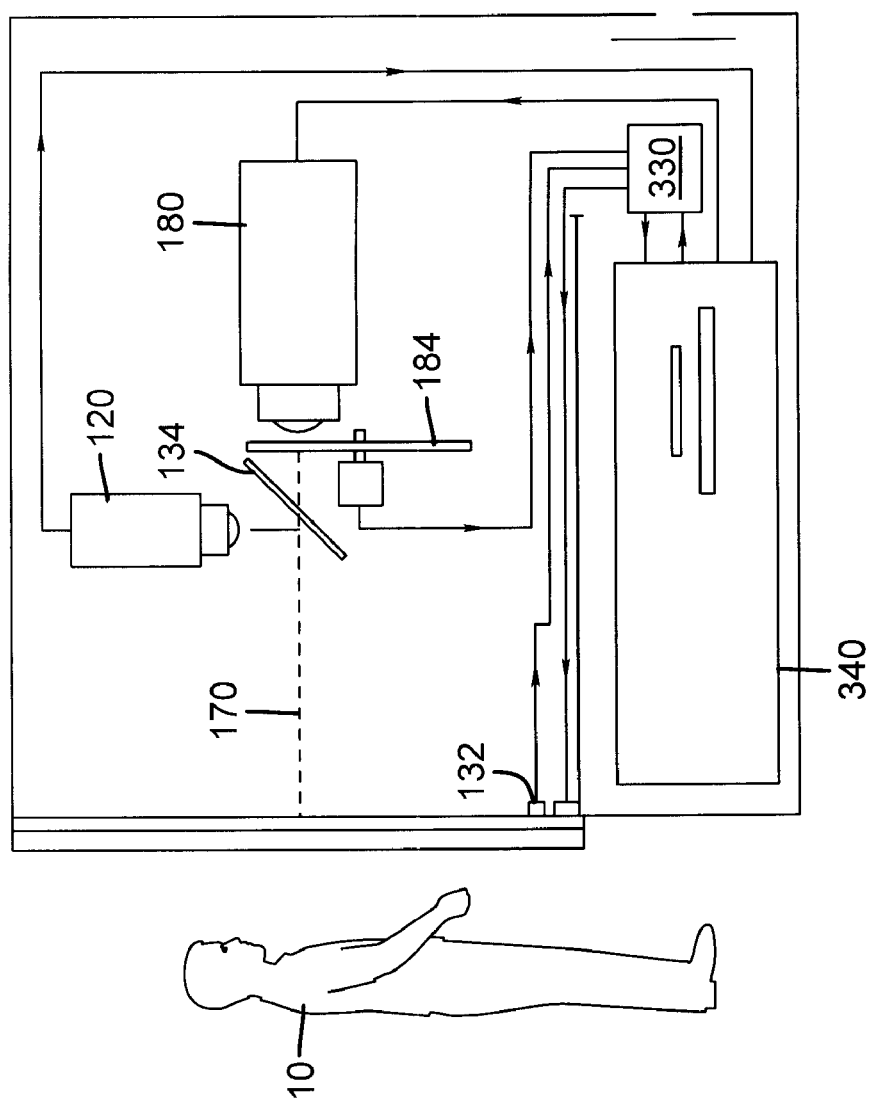
FIGS. 9A and 9B depict alternate constructions for an electronic imaging device that can be utilized by an embodiment of the video communication system. The device of FIG. 9A is a prior art device.

Notably, in traditional video-conferencing applications, eye contact with minimal parallax error is considered to be quite important for conveying the sense that a remote viewer is really speaking with the local participant (and visa-versa). Numerous prior art patents describe structures for electronic imaging devices in which a camera is imbedded behind a display. Then when the local viewer looks directly into the display, the camera looks through the display at the viewer, and acquires a direct-on image for transmittal to a remote viewer. An example for a prior art "display that sees" device is shown in FIG. 9A, which is described in commonly assigned U.S. Pat. No. 7,042,486, entitled "Image capture and display device" by Manico et al. This exemplary electronic imaging device 100 comprises a camera 120 and a projector 180, and a flickering or switching screen 132. In this device, a semi-transparent (partially silvered) mirror 134 is used as a beam splitter, so that camera 120 and an image display projector 180 share a common optical axis 170 to the switching screen 132. A shutter 184 modulates the projector 180 to block light from reaching the screen during a portion of each frame time corresponding to an image capture by camera 120. The shutter 184 is synchronized with the switching screen 132, such that the shutter's light transmitting state corresponds to the diffusing state of the switching screen 132, and the image provide by projector 180 is displayed at switching screen 132. Whereas, the shutter's opaque position corresponds to the light transmitting state of switching screen 132. In that case cameras 120 peers through the switching screen 132 at a user 10.

The traditional configurations for eye contact teleconferencing systems are described in a number of patents, including the above Manico '486 patent, and U.S. Pat. No. 5,639,151 entitled "Pass-Through Reflective Projection Display" and U.S. Pat. No. 5,777,665 entitled "Image Blocking Teleconferencing Eye Contact Terminal", both to McNelley, et al.; and U.S. Pat. No. 5,194,955 entitled "Video Telephone" to Yoneta et al., for example. As illustrated by the configuration of FIG. 9A, these traditional video-conferencing systems, which are burdened with partially silvered mirrors and beam splitters, are typically bulky, particularly in the depth direction. Additionally, the currently commercialized products using this general construction are targeted to the corporate executive market rather than consumer markets.

Figure 9B:
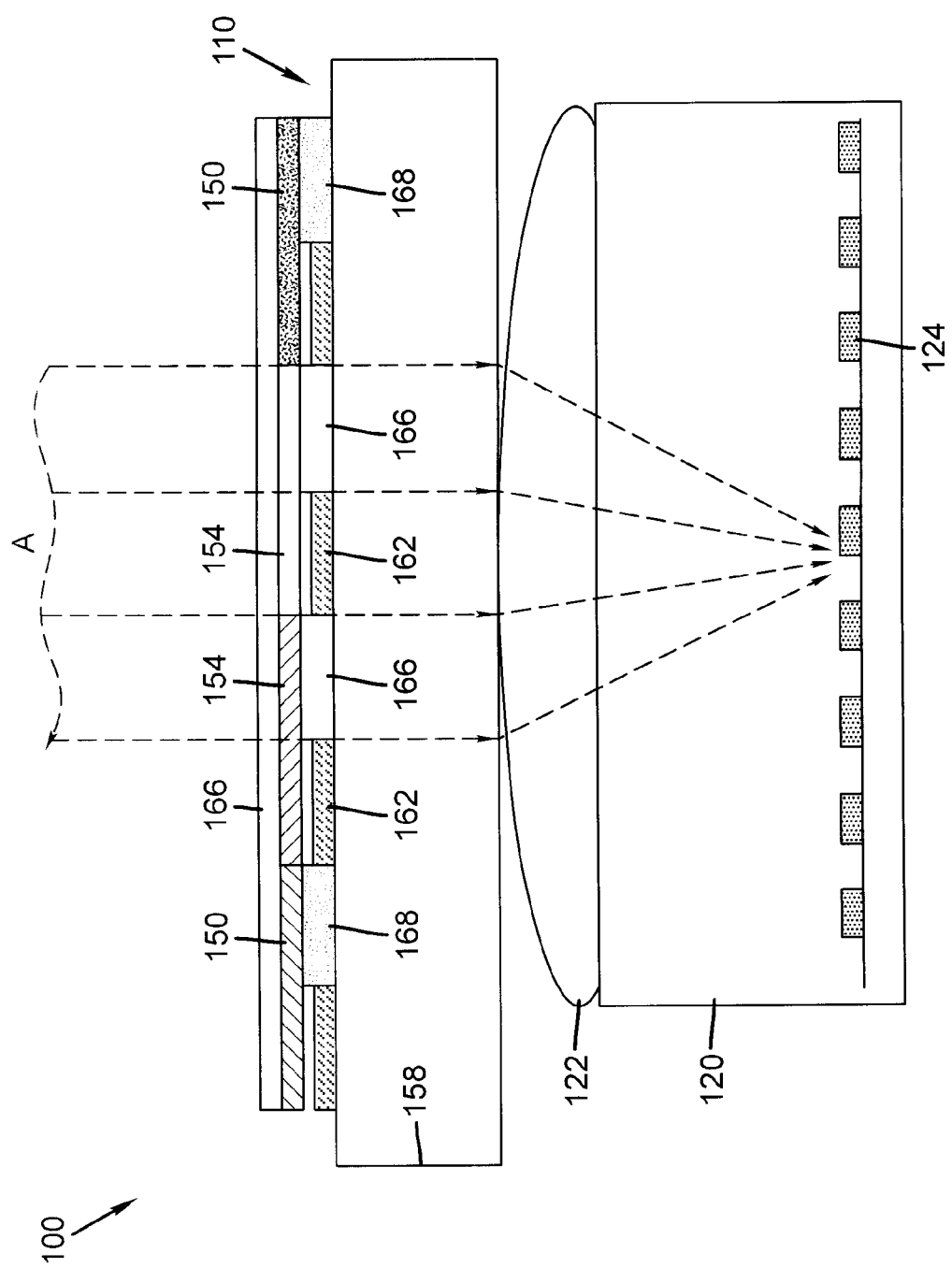

As an alternative approach for providing a display with an imbedded camera, various parties have proposed a closer integration of image display and image capture components. As one example, illustrated in FIG. 9B, and described in commonly assigned U.S. patent application Ser. No. 11/555,822, by Kurtz et al., and entitled "An Integrated Display Having Multiple Capture Devices", an electronic imaging device 100 with pixel integrated image display and image capture is shown. This device basically comprises a camera 120 that peers through a display 110 that comprises a configuration of partially transparent pixels. In particular, electronic imaging device 100 comprises display pixels 150 and window elements 154 formed on a substrate 150, with patterned thin film electronic components 162 providing control signals and drive current. A pattern of reflective electrodes 168 and transparent electrodes 166 can be used to bring signals and power to each pixel. Some pixels (the window pixels or elements 154) have transparent electrodes 166 both top and bottom, while the normal display pixels 154 have reflective electrodes 168 on the bottom side. The display and window pixels may be white light emitters, or color specific (red, green and blue) light emitters, fabricated with organic light emitting diode (OLED) or polymer light emitting diode (PLED) technologies (for example). An ensemble of partially transparent pixels (window elements 154) is used to form one or more apertures A, through which a camera 120 sees through. Although there are potential image artifacts, such as a screen door effect, that can effect the captured image quality, camera 120 can generally focus and function in a normal way. As the camera 120 is closer to the front display surface, this configuration is much more compact (particularly in the depth direction) than that of FIG. 9A, and is closer structurally to the electronic imaging device 100 shown in FIGS. 2A and 2B. This integrated approach could be particularly useful in the case that the display 110 functions as computer or television monitor, as is generally depicted in FIG. 1. The FIG. 9B approach can basically enable a compact integrated electronic imaging device 100, with improved eye contact imaging, as the camera 120 is imbedded behind the display 110, rather than positioned off to a side.

Although eye contact is certainly useful in the particular application, it may not be a necessary feature, at least for all video capture modes. As previously discussed, the prior art video-telephony and teleconferencing devices are typically attempting to simulate eye to eye contact, or a direct-on viewing, between a local user and a remote viewer who are arranged in a conference room type setting. Basically, these systems are designed with the assumption that the local and remote users are generally facing their display screens both direct on and centered to the screen (the user's face is at the same level as the screen). In such cases, a video communications device that enables a camera to look through the screen at the expected eye position (screen center) can then provide a good simulation of eye contact, and thus an enhanced user experience.

Alternately, various software approaches have been suggested to solving the eye contact problem when a user is looking at the display (from a centered position) and is captured by an offset camera. For example, U.S. Pat. No. 5,675,376 by Andersson et al. describes a video-conferencing system that employs software for targeting and extracting eye image data (pupil & eyelids) and editing it into live image data, to alter the appearance of the displayed image of the remote participant, such that the remote teleconferencing subjects appear to be looking straight ahead, as a correction for an offset camera. As another example, the approach of U.S. Pat. No. 6,724,417 by Hillis et al., which is also for a video teleconferencing system, uses a view-morphing algorithm that is applied synchronously to video images captured by at least two video imaging devices. A composite eye contact image view of the local participant is created for remote viewing by interpolating between the captured images.

Figure 10:
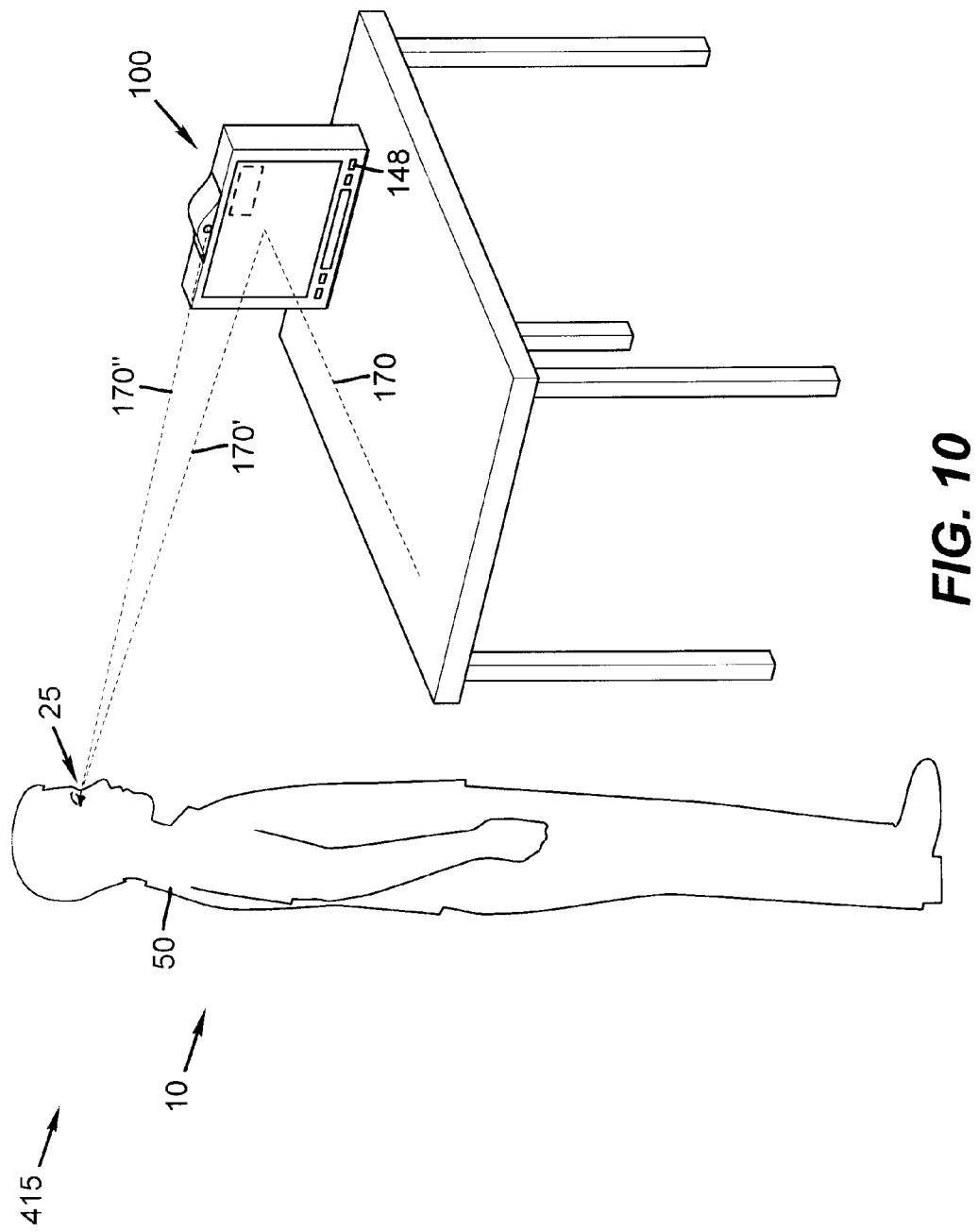
FIG. 10 depicts geometrical arrangements that affect the directionality of the display of remote users on an electronic imaging device utilized by one embodiment of the video communication system.

However, by comparison to teleconferencing, it is anticipated that the residentially targeted video communication system 290 (and devices 300) will encounter numerous use scenarios where the assumptions of direct on, eye contact image capture and image viewing will break down. As FIGS. 2 and 4C (scene 620') depict, the eyes of users 10 can be positioned in an offset fashion (vertically or laterally) relative to the electronic imaging device 100, as well as in a direct-on fashion (FIG. 4C, scene 620). To consider this further, FIG. 10 depicts a local user 10 looking downwards at an electronic imaging device 100 having a camera 120. If this local user 10 was sitting at the table, level and centered with the display 110, then the user 10 and display 110 would be aligned along an optical axis 170 and an imbedded camera can acquire eye contact images of the user. However, in the case shown, an alternate optical axis 170', which is tilted with respect to optical axis 170, extends from the center of the display 110 to the eyes of the user 10. Therefore a camera 120 imbedded behind the display 110, and looking down optical axis 170, would be unlikely to effectively acquire facial images of user 10 for presentation with good eye contact to a remote viewer. In this type of dynamic environment, similar eye contact issues arise relative to viewing of images of remote participants. In particular, there is the question of how the gaze of the remote user 10b is presented on the local display 110 to the local user 10a. For example, if an image of a remote viewer is presented on display 110 with eye contact down optical axis 170 (see FIG. 10), while local user 10 is looking towards the display along optical axis 170', then perception of eye contact is likely lost.

As can now be appreciated, both image capture of the local user to provide eye gaze perception for a remote viewer, and image display of the remote viewer with eye gaze correction relative to the local user are complicated by the variable geometrical relationships of users 10, displays 110, and cameras 120. Indeed, both eye contact image capture and eye contact image display may need to change dynamically as users 10 move around, effectively requiring eye gaze tracking for both image capture and display. However, the relevance of these issues depend on the degree to which user's 10 accept the fact that they are engaged in a video communication event, compared to the extent to which they would prefer to have the sense of "almost being there", as if they were just looking through a window into the other environment. The relevance of these issues also depends on the video context, and particularly the event classifications, as user expectations for eye contact will vary with event type.

The quality of image capture to obtain images that enable enhanced eye contact can depend on the configuration of the video communication device 300. As an example, a device 300 can include a wide angle image capture device 120, a second image capture device 120 which is imbedded behind the display screen 115, and a third image capture device 120 which is mounted somewhere outside the image display screen 115. The second image capture device 120 likely has a NFOV and zoom capability. Its pan and tilt capabilities can be limited by the construction of the display 110 (if for example, it is a device of the type of FIG. 9B), and it may be best used along an optical axis 170' (see FIG. 10). The third image capture device 120 also likely has a NFOV and zoom capability, but as it is not imbedded behind the display screen 115, its pan and tilt capabilities can be larger. This image capture device 120 can acquire quality images from the local environment 415 under more diverse circumstances, such as along an optical axis 170" (see FIG. 10). Thus, it can potentially capture direct-on images of local users 10a (or objects 260) over a wider range of capture geometries. In the manner of Hillis et al. '417, multiple non-imbedded, panning and tilting, cameras 120 can be used to provide facial images of a user 10, from which a composite eye contact image can be created. However, a user 10 may simply not be looking towards display 110 or a camera 120. Thus at some point, image capture that enables good eye contact may neither be contextually relevant or technically possible.

Likewise, the geometry and issues for eye contact image display can be considered in greater depth. Considering again FIG. 10, the image of a remote user is to be displayed on display 110 to a local user 10 (much as in FIG. 4C, scene 620). The typical video-conferencing systems would present this image with direct-on centered view, such that a user 10 positioned along optical axis 170 would observe the remote user with the sensation of eye-to-eye contact. However, as shown in FIG. 10, the user 10 (particularly their face 25) may not be situated along optical axis 170, and therefore the displayed image of the remote user would not appear to be looking towards the face of user 10. As a method to compensate for this issue, the video communication device 300 can utilize an algorithm to estimate direction or location of a user 10 in their local environment 415 relative to a display 110. In particular, this algorithm would determine the angular direction or location of the users face (tracking pose) or eyes (eye-tracking) in three-dimensional space relative to display (or center thereof) 110. The video communication device 300 can utilize a variety of techniques, including stereo camera imaging or optical or sonar/audio based range finding and mapping to determine the location of the user 10. In some instances, the image processor 320 can then apply a gaze adapting process 495 to the images of the remote user to be shown on display 110, to change the appearance of their eyes, to have their image appear to be looking at the user 10. For example, the eye gaze appearance altering approach of the Andersson '376 disclosure can be applied to the pupil and eyelid image data to have the remote viewer appear to be looking in an appropriate direction (which may be straight ahead (optical axis 170)).

However, while people can look laterally (side to side) or longitudinally (up or down) by mere eye movements, in general these off axis eye positions are not sustained, and an individual's head pose quickly adjusts towards the area of interest, with the eyes returning to center. Thus, a more extensive gaze adaptation, involving at least head pose, can be required to provide satisfactory eye contact image display. For example, the image of the remote user may need to be tilted and pivoted to have them appear to be looking at the local users. The dual camera approach of the Hillis et al. '417 might be extended for this purpose. More specifically, an eye-gaze appearance altering method, such as that described in "Synthesis of Novel Views from a Single Face Image", by Thomas Vetter, which was published in Max-Plank-Institut, Germany, Technical Report No. 26 (1996), can be used to modify the pose of a face to create such effects. As another approach, U.S. Pat. No. 6,806,898 by Toyama et al., describes a video-conferencing system where images of the user captured by a camera are converted into a virtual 3D space. The images are altered to correct for head-pose alteration and eye-gaze direction, to create the perception of eye contact for the images viewed by the remote viewer. The approach of Toyama et al. '898 might also be extended to provide a generalized gaze and pose image alteration, rather than just altering the image of the viewer to appear to look straight ahead out of the display. If the video communication device 300 that is located at the remote site 364 has multiple image capture devices 120 positioned at various locations within that local environment 415, then the image stream from the camera 120 which gives the best perspective of the remote user 10b, with the least post processing by the gaze adapting process 495, when presented to the user 10 at the first site 362, can be used.

As suggested previously, the need and application of eye contact image display of a remote viewer into a local environment can be situationally dependent, on the context of both the events and the activities occurring in both the local and remote environments. For example, interesting questions arise when there are multiple individuals in the local environment. As one option, the image of a remote user can be modified to look towards the average location of the multiple locally positioned individuals. As another option, the image of a remote user can be modified to look towards the locally positioned user 10a that is currently speaking. To some extent, the larger the field of view 420 used to capture a user 10 and their surroundings (their local environment 415), the less relevance this issue has.

More specifically, gaze correction for eye contact image display needs to be applied selectively, depending on gaze metrics and context (the video context and associated context rules). For example, when the user 10 of FIG. 2 is working in the local environment 415 of the kitchen while looking at the home appliance (stove) 270, or other objects, other than the video communication device 300, the user 10 can be presented to a remote viewer in the larger context of the environment 415, without gaze correction. But when the user 10 looks up at the device 300 (or generally towards a camera 120), contextual interface 450 can recognize this using temporal and directional gaze metrics, and apply a gaze correction algorithm to the image of user 10, so that the remote viewer sees user 10 in a direct-on eye-contact manner.

As can now be appreciated, eye gaze corrected residential video communications can be beset with dynamic geometry and context issues that effect both eye gaze related image capture (how and when to obtain an eye contact image of a local user for remote display) and eye gaze related image display (relative to the direction and manner of image alteration of the remote viewer's eye gaze, to have it be best seen locally). As described, eye gaze correction can simultaneously depend on user positioning and context at both the local and remote sites. This is partially shown by FIG. 7D, which depicts the interactions of two video communications devices 300 of a video communication system 290 during a video communication event 600. To address this, during a video scene 620, communication event analysis 655 uses scene analysis algorithms with context rules to examine the local video scene characteristics relative to a variety of factors, including gaze metrics (amount of head or eye motion, rate of movement, direction or pose to camera 120), field of view, personal cues (including behavior or speech), and video context (event classification), to determine whether eye gaze image capture or correction is appropriate. For example, if a local user 10a is engaged in a purposeful event, context rules would indicate that directed eye gaze is likely needed, supported by a range of gaze metrics. Whereas, if a local participant is involved in large group event, and glances at the display 110, without particularly communicating with a remote viewer, then directed eye gaze is not likely needed. Generally, the gaze context rules can anticipate that as the capture field of view is decreased and directed to fewer individuals, then the sensitivity and need for directed eye gaze image capture or correction increases. Even in such situations, the scene analysis algorithm can assess, for example using pose angle estimations and trigger or threshold levels, whether a local user 10a is intending to look at a display 110 to communicate directly with the remote viewer. These pose angle estimates can be obtained from a gaze tracking process, which follows the gaze direction of a viewer to observe where a person's attention is focused. While it is desirable to track the actual movement of the eyes, it is frequently sufficient to infer the gaze direction from the head pose, as described in "Model-Based Head Pose Estimation for Air-Traffic Controllers", by Xavier L. C. Brolly, Constantinos Stratelos and Jeffrey B. Mulligan (published at ICIP 2003, the IEEE Conference on Image Processing).

The eye-gaze correction scene analysis algorithm can use a set of eye-gaze context rules to associate the sensitivity (using triggers or threshold levels) or need for eye gaze correction with the video context for a current video scene, including event classification and capture field of view. These context rules can define a range of variation for the participant gaze metrics or characteristics indicative of eye gaze image capture based upon the current video context. Likewise, the context rules can define a range of gaze metrics indicative of remote scene characteristics that will affect eye gaze image display. As with the prior uses of scene analysis algorithms, the gaze analysis process can calculate current gaze metrics and associated gaze confidence values as statistical quality assessment metrics. The current gaze metrics can then be compared to the range of gaze metrics expected for participants in the current video scene. If the contextual interface 450, via communication event analysis concludes with high gaze direction confidence values that gaze directed image capture or image processing of a local user is appropriate, then the gaze adapting process 495 can provide direction to the cameras 120 to adjust image capture (camera selection and settings (zoom, pan, and tilt)) to acquire images for eye contact viewing for the remote viewer. The gaze adapting process 495 can also provide input to the image processor 320, via scene capture management 650, to alter the captured images as necessary to provide eye contact image video imagery for the remote viewer.

As discussed previously, the images can be altered to improve eye gaze perception by altering either pupil or eyelid image data or by altering head pose. Potentially, body pose or scene orientation can also be changed to enhance eye contact imaging. However, the gaze adapting process 495 can also consider the video context, video scene characteristics, and eye gaze metrics of the remote environment to determine the direction or orientation of the displayed image of the local user 10*a* in the remote environment at a site 364. As an example, if the video context for the remote site involves several people located within a large field of view 420, then the displayed eye contact image of the local user 10*a* may direct their eye gaze to an average position. As a further example, if the eye gaze for the displayed eye contact image of the local user 10*a* is to be directed to a particular remote individual, than their location or orientation relative to the display 110 may need to be known. Thus, a variety of information, including video context (event classification), field of view, and remote speaker location, or gaze metric data, can be collected by one device 300 and provided across the network 365 to another device 300, to be used by the gaze adapting process 495 as input for directing eye gaze related image processing. As with the previous scene adjustment algorithms, the eye gaze adapting process 495 can use (eye-gaze) confidence values as metrics to indicate the certainty of a need for an eye gaze correction or the use of a given identified eye gaze correction. The eye gaze adaption processes also need to consider timing issues. If a user is looking into a display and eye gaze corrections are needed (that is imbedded cameras do not naturally provide centered eye gaze), then the length of both preceding time delays and correction transition times can impact the graceful of the presentation.

As described, eye gaze correction for eye contact image display to a remote viewer can utilize gaze related data from the remote site 364, which is used in local video image processing at a site 362 before transmission to the remote site. While this approach involves data exchange across the network, it can reduce bandwidth usage, as compared to finishing eye gaze correction of incoming video at the remote site. However, both approaches can be used for device 300. As another alternative, a local device 300 can independently analyze the incoming video from the remote environment to derive gaze related scene characteristics, such as gaze metrics and video context, that can effect perception of the local gaze corrected video when viewed at the remote site. However, this approach is likely less efficient than the prior approach of exchanging relevant data across the network 365.

As a related issue, it is noted that remote users 10*b* can interact or interface with activities in a local environment 415 of a local user 10*a* both passively and actively. In the passive case, the remote user 10*b* watches the transmitted images as provided by the local user 10*a* or the device 300 of the local user 10*a*. In a more active approach, the remote user 10*b* requests or initiates image capture field of view changes at the local site 362. As an example, the remote user may seek a field of view change to a narrow field of view 420, such as depicted in FIG. 4B. For example, the remote user 10*b* can use an interface control 190 to shift the NFOV 420 from a first location (the table) to a second location (the children). The split screen image 410 of the display 110 of the local user 10*a* can show the capture NFOV 420 moving around within the larger WFOV 420, in response to the directions of the remote viewer. In the most active case, a prompt and response sequence can actively direct the cameras using gestures. Indeed, the user interface 440 of the video communication device 300 can provide various gesture based interface controls 190. These gesture-based controls can not only drive the operation of the system, but also contribute to the interaction between the local and remote participants.

Figure 11A:
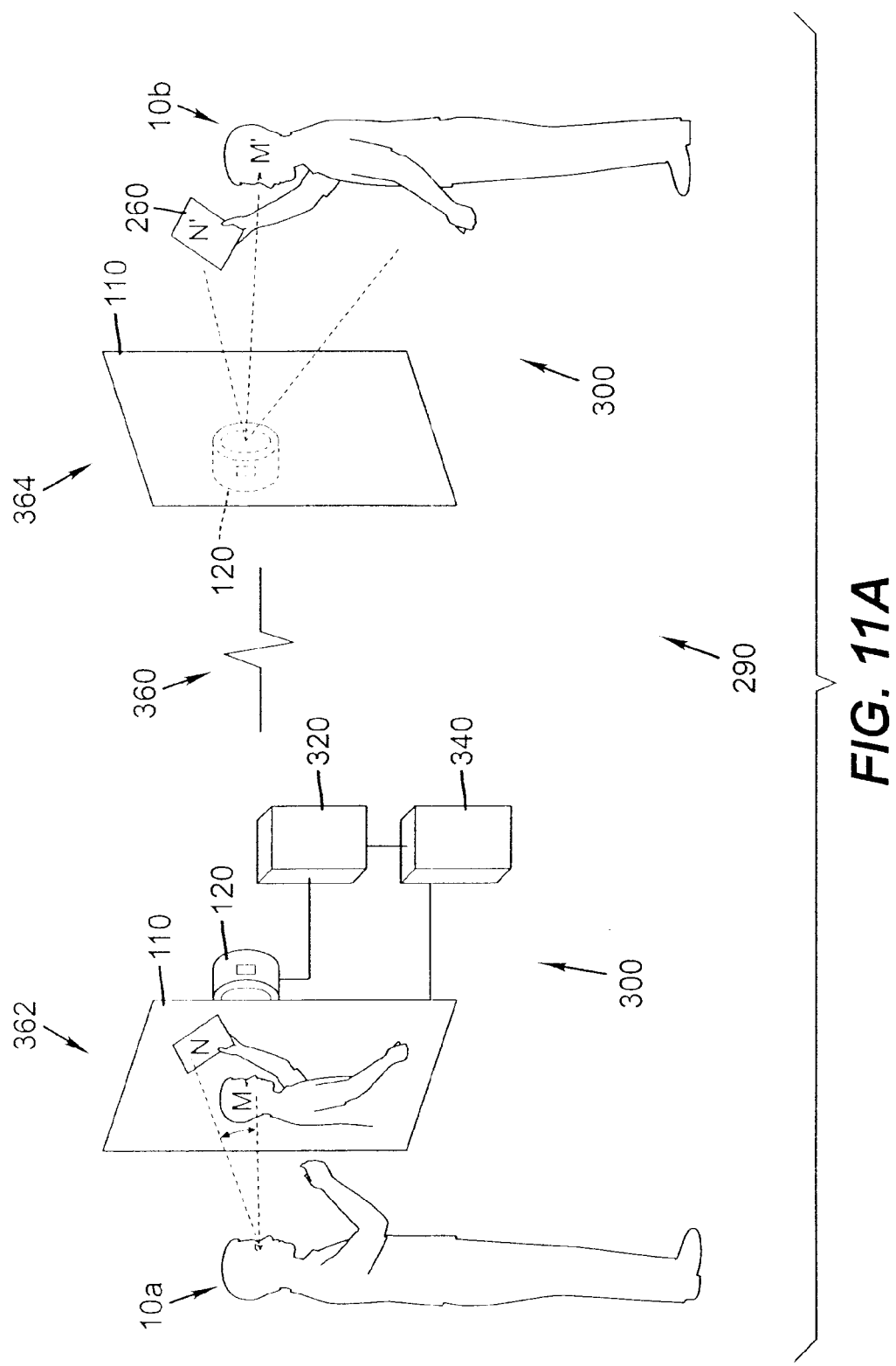
FIGS. 11A, 11B, and 11C depict the interaction of motion tracking between local and remote locations.
Figure 11B:
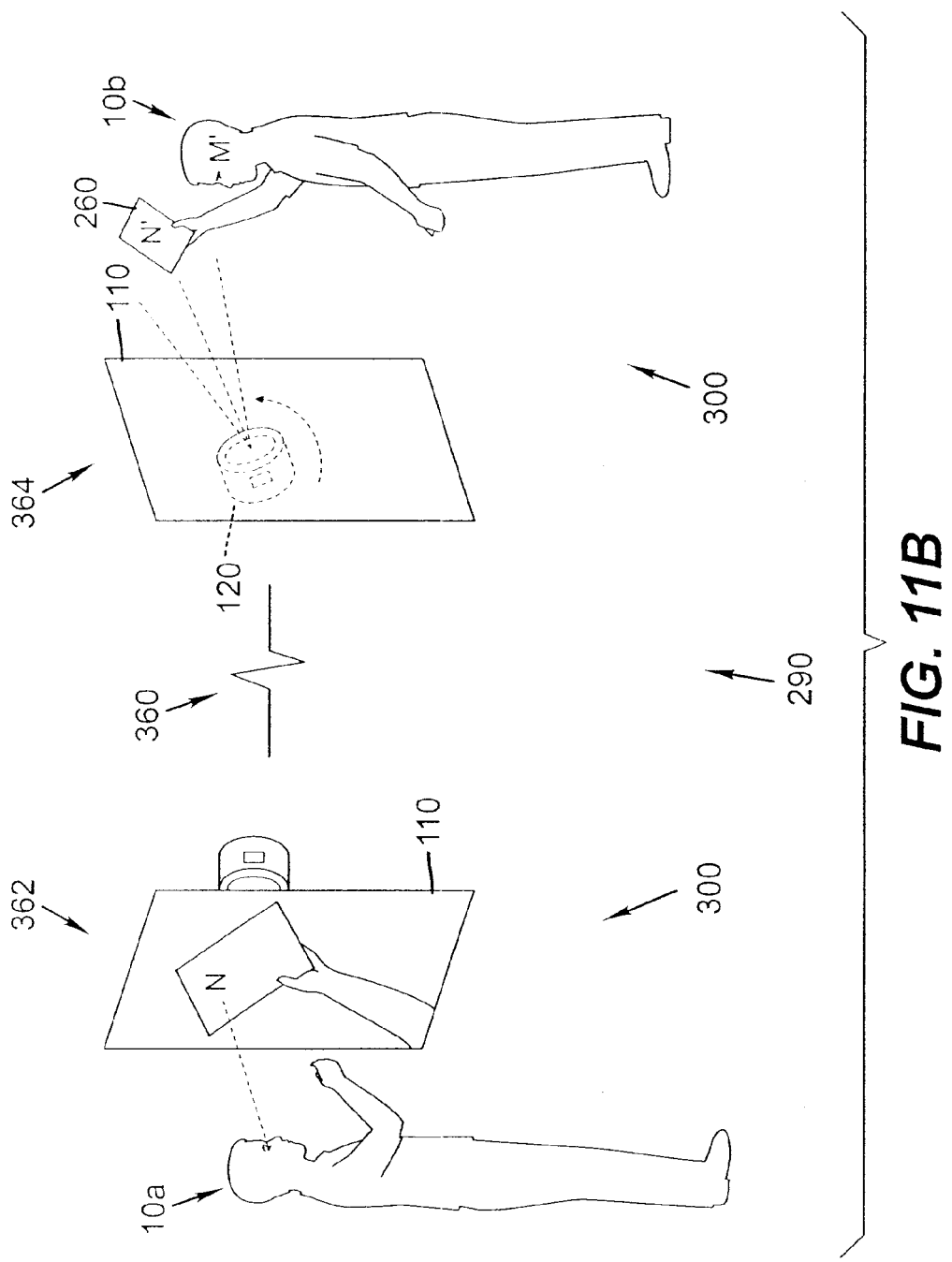

The schematic diagrams of FIGS. 11A and 11B give an example of a prompt and response sequence applicable to the video communication system 290. Users 10*a* and 10*b* communicate over a network 360, via their respective video communication devices 300. Each display 110 shows an image of the other viewer, as previously described. However, the imaging system associated with capture device 120 at site 362 can be provided with additional capabilities for sensing visual prompts from viewer 10*a*. As one approach, gaze tracking can be used as a gesture cue, for example, based upon head pose estimation, as described in the Brolly et al. reference. In the example of FIG. 11A, viewer 10*a* is initially looking at the image of viewer 10*b*, at a relative position M. As shown in FIG. 11A, position M corresponds to location M' at site 364. Capture device 120 at second site 364 is initially directed toward location M'. In effect, the two participants are in eye contact communications. However, during viewer interaction, the attention of viewer 10*a* is redirected, and the viewer's eyes adjust to look upward, followed by gaze detection algorithms, to another relative position N. As shown in FIG. 11A, position N corresponds to position N' at site 364. The computer 340 at first site 362 ascertains the new direction of interest for user 10*a*, and via communications controller 355 and the network 360, instructions are sent to the computer 340 at site 364, to modify the camera angle of image capture device 120 to the new position shown in FIG. 11B.

It is recognized that the application of gaze tracking with gaze correction for eye contact image display and gaze tracking as a gesture interface may interact. In FIG. 11A, user 10*a* was gazing at location M, corresponding to location M' of site 364, which aligned with the face of remote user 10*b*. In this example, a camera 120, looking at user 10*a* through display 110, would acquire a direct on, eye contact, image of user 10*a* for display on display 110 to user 10*b* at site 364. User 10*b* would then see a direct on, centered, eye contact image of user 10*a*. As the vision of user 10*a* shifts to location N and the camera 120 at location 364 adjusts to look towards location N', then user 10*a* is no longer looking directly at the camera 120 of site 362. A gaze correction algorithm applied to the image of user 10*a* may confuse the remote user 10*b*, as to whether the local user 10*a* has looked away towards location N/N' or not. However, if the image of location N' is subsequently presented to the local user 10*a* on their display 110 in a manner centered with that display, then local user 10*a* would again be looking at their camera 120 and will see object 260 (location N'), but not necessarily the face of user 10*b* (location M'). User 10*b* can see an eye contact image of user 10*a*, but eye contact imaging is asymmetrical, favoring user 10*b*.

Figures 12A, 12B:
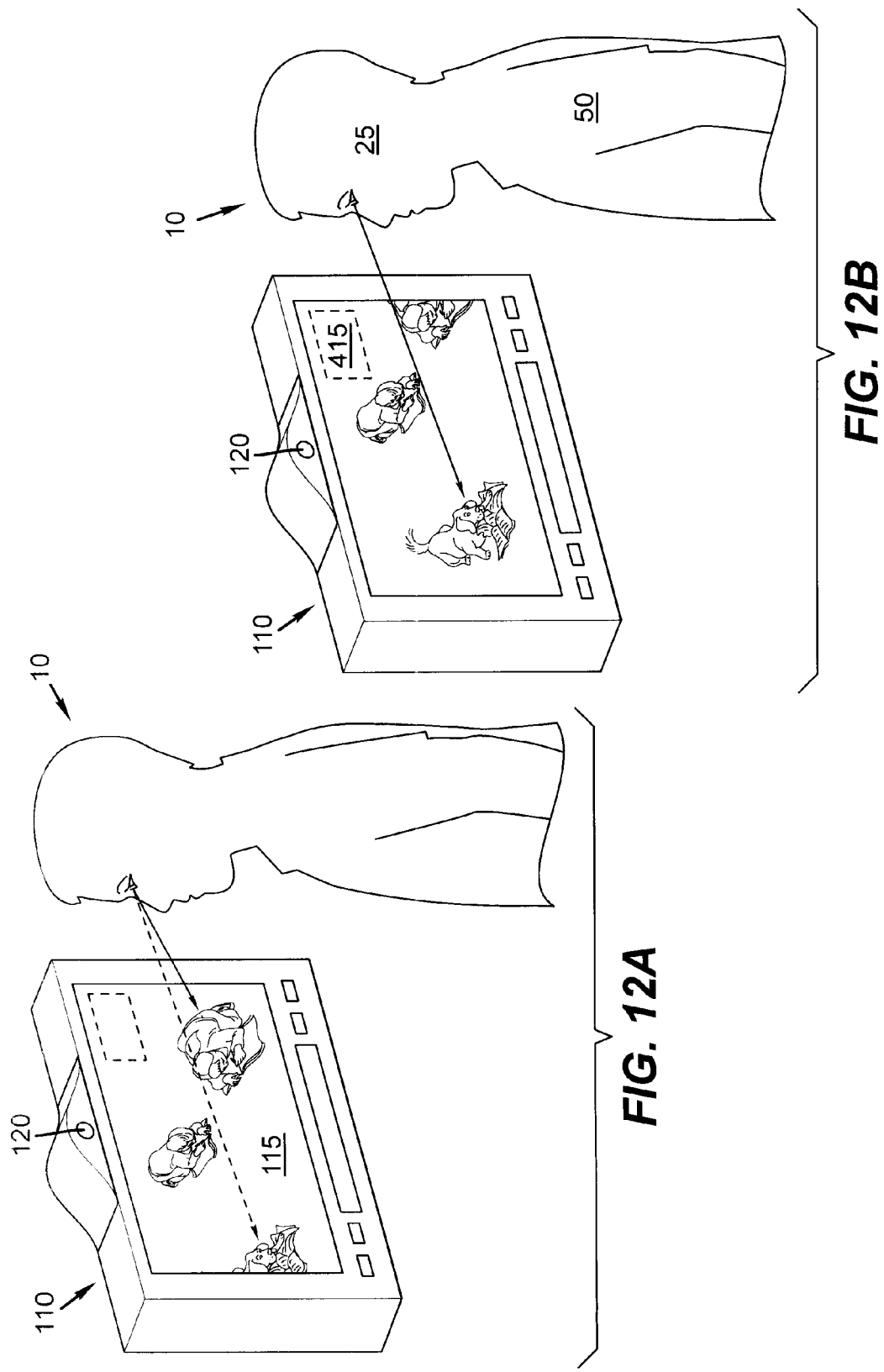
FIGS. 12A and 12B depict the content displayed on an electronic imaging device changing in response to a gaze-tracking cue relative to the gaze of a viewer.

In another example of gaze tracking as a gesture interface, the contextual interface 450 detects that the user 10*a* moves laterally or changes pose while looking at the display screen 115. This is similar to the circumstance where an individual looks out a window, and shifts their view to "look around the corner". For example, as shown in FIG. 12A, user 10 is looking at a screen 115 of a display 110 of a video communication device 300. The user 10 is shown looking at a video scene having two children and a dog, where the dog is at the scene periphery, and is partially cut off. If the user 10 wanted to see the dog better, and the display screen 115 was a window, then the user could shift their viewpoint as if too look out the window. The user's head and face 25, if not their body 50 are shifting to an alternate pose to provide a new view. The device 300 can detect this change of pose or position and change the scene orientation and position, for example, as suggested in FIG. 12B, where the peripheral image content is adjusted towards screen center. Effectively, the contextual interface 450 changes the image capture at the remote site 364 so that the portion of the field of view 420 captured at the remote site 364 moves laterally as well, such that the image displayed at the local site 362 changes in a way that is similar to that experienced when looking through a window.

The contextual interface 450 can be called upon to manage priority decisions between the applications of gaze tracking and gaze correction. Gaze tracking, when used as a gesture type control, can take priority over its use with gaze correction, to reduce user confusion. However, gaze tracking, complemented by zooming out to a wider field of view, can help reduce contextual confusion. Again, capturing a larger field of view around the local user 10a and remote user 10b, rather than just close-up portrait pictures will provide greater context and diminish the conflict issues concerning gaze direction.

Figure 11C:
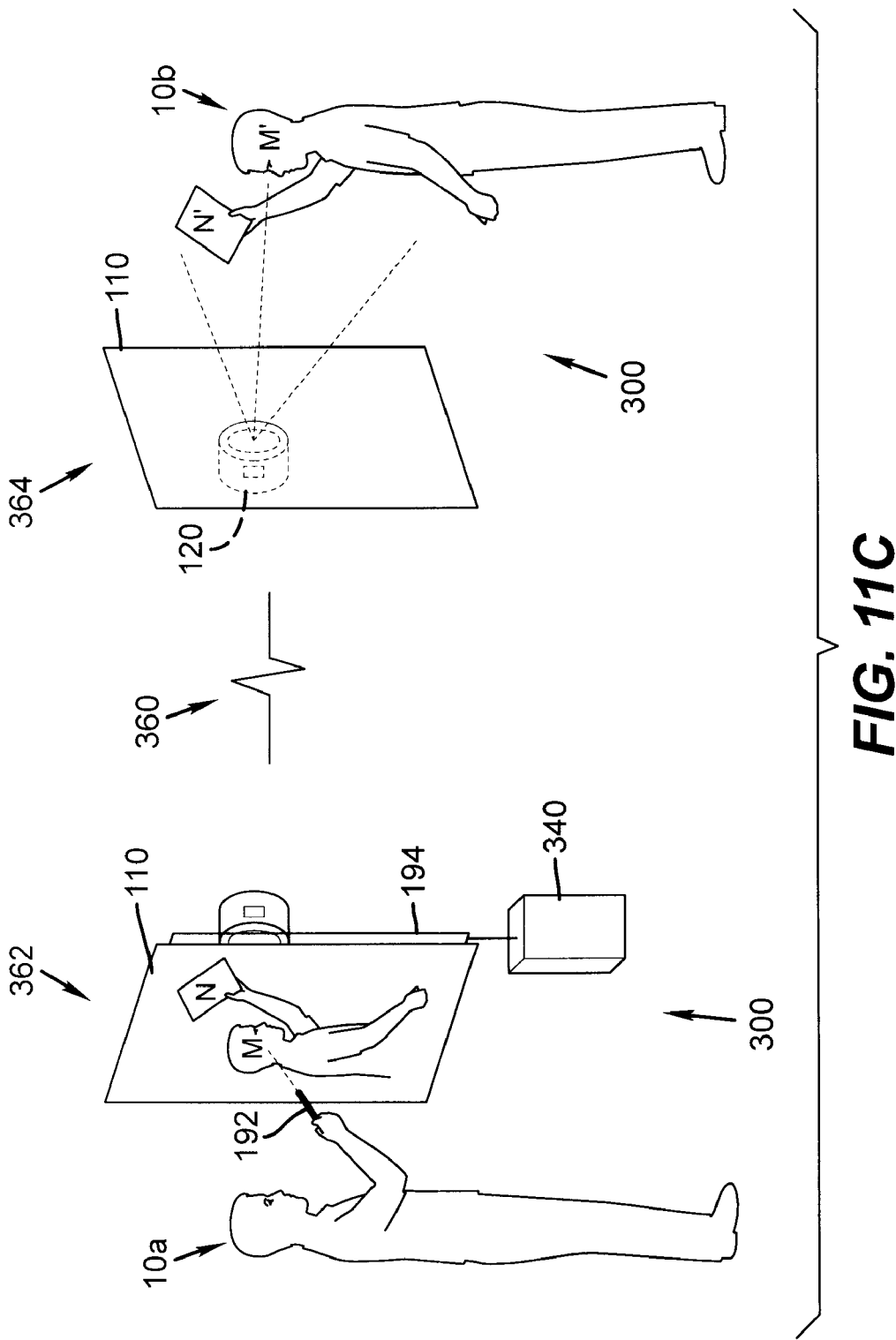

FIG. 11C depicts an alternate example for a gesture based user interface that can be used with the video communication device 300. In FIG. 11C, viewer 10a is provided with a pointer device 192 that can be used to point to a location of interest, shown as location M. A separate prompt detector 194 is provided, which can for example be a two-dimensional sensor that detects the position of a light beam from laser pointer (192). This pointer-based prompt detector 194 works in conjunction with computer 340 to provide instructions over network 360 to the image capture device 120 at a second site 364. The pointer and prompt detector of FIG. 11C basically represents a tool-based form of gesture tracking. Alternate gesture tracking schemes can also be used with the video communication device 300. For example, gesture algorithms that analyze images to identify and follow hand, arm, head, or body motions can be used.

In some respects, the use of gesture tracking or pointer based gesture tracking (FIG. 11C) is more robust than a gaze-tracking interface (FIGS. 11A, B and 12A, B). Although the users 10 may need to learn a gesture language, the opportunities for misinterpretations of the user's intent is smaller. Additionally, it is noted that the contextual interface 450 can employ a range of other interfaces or algorithms to interpret user activities and understand social interactions. These alternative interfaces can use emotional cues, linguistic cues and dialog understanding, or social signaling based on non-linguistic and largely unconscious cues concerning the social situation. The non-linguistic cues, including gestures, which a speaker uses to guide listeners and signal intent, are collectively called prosody. Prosody includes such speech factors as voice pitch, pacing, and loudness and may occur consciously or unconsciously. In this system, these cues can be principally used to guide transition management from capture of one image field of view or video context to another, although they might be applied to the privacy control or gesture tracking aspects as well.

It is also noted that video imagery of the individual participants can be exchanged between local and remote sites using animation technologies. For example, the method described in U.S. Pat. No. 6,919,892, entitled "Photo Realistic Talking Head Creation System and Method", by Cheiky et al., involves capturing multiple images of an individual (subject) to build an image library. The photo realistic talking head library is constructed using selected images of the subject at different angular positions, with different eye characteristics and different mouth characteristics at each of angular positions. The library of photo realistic images can then be used to create an animated performance of a subject (or avatar) having the photo realistic quality required to convey personal identity, emphasize points in a conversation, and add emotional content. As a result, video-like images of the subject can be conveyed across a network (such as the Internet) with a reduced bandwidth requirement, but with less compression induced artifacts (such as blur) affecting the resulting imagery. While the methods of Cheiky et al. '892 are targeted for applications such as news casting, the use of avatars can also be applied to the residential communication system 290.

Thus far, the present invention for a video communication system 300 has been described as a system that generates video imagery (basically the picture portion of a television signal) and the accompanying audio. It should be understood the system can also use digital still cameras or image processing to extract still images from a video stream. As an example, a key frame extraction algorithm that identifies the video frames that have the best composition and facial expressions can be used to create still images from the video output of system 290. The system 290 or device 300 can also generate metadata, including semantic data, which is stored with (or linked to) the image data, whether still or video. This metadata can include information such as the date, the identities of the local and remote participants, type of event data, key words extracted via voice recognition software, privacy settings for the communication event, and annotations or titles entered by users. This metadata can be useful in the archiving and recall of the video, still image, or audio data generated by the device 300 or system 290.

The video communication system 290 has been described basically as a video-telephony system that is principally intended for personal residential use. However, system 290 can be extensible for other residential communication uses, particularly ones where privacy and contextual issues impact image management. As one example, the system can be used for a home office teleconferencing event, where the local user 10 wants to maintain home privacy while conducting business. As another alternative, local users 10 could use the system 290 and device 300 as an aid in managing home security. For example, local users 10 could call in to the system 290 and devices 300 from a remote location, mediated by security controls (passwords) and have the system show current or prior events occurring within their residence as captured by the cameras 120.

The use of system 290 and device 300 for personal communications can also extend to emerging non-traditional uses, including enabling users to export video data onto the World Wide Web. In particular, the system can be used to supply imagery to an on-line community or "metaverse" such as "Second Life", or for a video-blog (including at YouTube), or other purposes. Certainly, many current on-line participants in such communities seem to have privacy and content expectations that appear different than those of many people who are less rapid adopters of these Internet technologies. On the other hand, the video communication system 290 and devices 300 with the privacy and contextual controls may provide users 10 with the means to create video content for the Internet with a greater control than they might otherwise have.

The video communication device 300 can be used for a variety of other purposes. As was previously mentioned, local users 10 can use it as a television. As another alternative, when the device 300 is not in use for video communications, it could operate as an electronic picture frame, and display still or video images of personal interest to the individuals of the local environment. The electronic picture frame mode can be passive or active, and in the latter case, the device 300 can be used to detect and identify local users 10 and display still or video images of known interest to a given user. If the local device 300 includes multiple electronic imaging devices 100 distributed within a residence, the active picture display operation can be operated to provide images at the various devices 100 as a local user 10 moves about their residence.

As further example of interest, there are concepts for smart medical homes, in which individuals, and particularly the elderly may be monitored relative to their health status as they live in their residence. Accordingly, a variety of sensors may be distributed about the residence, including sensors in the furniture, flooring, appliances, and medicine cabinet. Cameras may also be used to monitor the individuals, but the individuals may find them too invasive. While cameras may be hidden behind electronic picture frames to make them more unobtrusive, the mere presence of the cameras may leave the individuals uneasy about being monitored. As an alternative, these residences can be equipped with the video communication devices 300, which the residents can use to communicate with remote friends and relatives, as well as with their health monitors (for example, a nurse). Then, should a health monitor have a reason to need an image, the health monitor (a remote viewer) could temporarily over-ride the privacy settings of the local privacy interface 400. However, the local individuals or users 10 can still be presented with capture alerts, as well as split screen images 410 displaying both the health monitor and the outgoing images of the user 10 and their local environment 415.

The video communication system 290 and devices 300 can be adapted to other purposes beyond residential communications, particularly ones in which privacy management or contextual management is valued. As an example, it is anticipated that systems of this type can be used in educational applications in which, for example, a student and teacher are interacting through the system. In another example, it is anticipated that systems of this type will be used in business environments where coworkers at different locations virtually share a desk to create a common workspace through video communication. It is also noted that the video communication system 290 has been principally described as a system in which the local display 110 is displaying images of one or more remote users, along with a split screen image 410 of a local user 10 in the local environment 415. The system can display a remote environment at a remote site 364 without a remote user 10*b*, as most simply, the remote user 10*b* may temporarily disappear. Alternately, the device 300 can display a remote environment 415 entirely lacking a remote user 10*b*. As another example of other purposes, the video communication system 290 can be used to display a video view as supplied from a remote site continuously to create the illusion that the display is a window looking out at the remote site, such as a favorite holiday destination or some other scenic view.

As a variation on the alternate image theme, a local user 10*a* could view a program of wildlife scenes or dance scenes while the device 300 captures the responses and participation of the local user, within the limitations of the predetermined privacy and contextual settings. This type of operational model, might lend itself to numerous applications, in various fields, including education, market research, and behavioral and drug research. Additionally, the video communication system 290 and devices 300 can be used to enable a multi-way communication event in which at each site a displayed image shows common video (such as a television show), while other displayed images show the local users 10*a* or participants and the remote users 10*b* or participants. For instance, the display 100 of FIG. 6, which shows three image sets, can be displaying the television program on the left side image (410'), the remote participants on the right side image (410"), and the local users 10 in the inset split screen image 410. As a result, both local and remote participants can share a common viewing experience of a featured program (such as a sports event).

It is anticipated that different embodiments can be provided for applications with different types of two way video communication systems that have different image capture capabilities, different image processing capabilities, different audio capabilities, different digital signal processors, different transmission and receiving capabilities and different display capabilities. The different types of capabilities will limit the extent that visually based inputs will be possible. As an example, a large wall mounted unit with a high-resolution image capture device and a powerful digital signal processor will be able to detect inputs such as hand gestures, audio commands and body movements. In contrast, a mobile phone with a low-resolution image capture device and a more limited digital signal processor may not be able to detect hand gestures or body movements but it is likely to have audio command capabilities and motion detection. It can be anticipated that the best performance will be achieved if the video communication devices 300 at the local site 362 and the remote site 364 are comparable, if not identical.

Those skilled in the art will recognize that the two way video communication system as described as a preferred embodiment can also include other forms of media during the two way communication such as still images, text, spreadsheets, audio recordings and other forms of images that could be shared during a conversation between two or more people. For example, text documents could be displayed separately; such as in a split screen image 410' of FIG. 6.

The invention has been described in detail with particular reference to certain preferred embodiments thereof, but it will be understood that variations and modifications can be effected within the spirit and scope of the invention. It is emphasized that the apparatii or methods described herein can be embodied in a number of different types of systems, using a wide variety of types of supporting hardware and software. In particular, the video communication system 290 and devices 300 have been described as using a construct of scene analysis algorithms, scene adjustment algorithms, scene analysis rules, and contextual classifications as aspects of the automatic operation of contextual interface 450. The interaction and application of these video capture analysis and adjustment mechanisms have been described by a series of operational diagrams (FIGS. 7A-D). However, other equivalent methods, mechanisms, and operational interactions, including changes in the order thereof, can be used to accomplish the claimed functionality. It should also be noted that drawings are not drawn to scale, but are illustrative of key components and principles used in these embodiments.

The invention has been described in detail with particular reference to certain preferred embodiments thereof, but it will be understood that variations and modifications can be effected within the spirit and scope of the invention.

The invention claimed is:

1. A method for operating a video communication system at a local site, the method comprising the steps of:
   determining initial privacy settings for a video communication event;
   establishing a video communication link with a video communication system at a remote site;
   capturing video images of a field of view of at least one image capture device, and transmitting the video images in accordance with the initial privacy settings;
   using a scene analysis algorithm to automatically determine a video context based at least in part upon a determined contextual classification for the communication event based upon the video images;
   determining a video context based upon the contextual classification and the video images;
   automatically determining new privacy settings in accordance with the determined video context;
   analyzing the captured video images to identify privacy sensitive areas in the captured video images, using a scene analysis algorithm which examines a content of the video images and image context characteristics of the video images based upon the determined privacy settings;
   modifying the image characteristics in the identified privacy sensitive image areas in the captured video images, to control the image and image context characteristics shared with the remote viewer, to an extent consistent with the determined privacy settings; and
   transmitting the modified video images to the remote site.

2. The method according to claim 1, wherein said image context characteristics are analyzed to determine a correlation with at least one of the initial and the determined privacy settings.

3. The method according to claim 1, wherein the video images are captured in a sequence and wherein the scene analysis algorithm evaluates both current and prior video images in the sequence to at least determine a video context.

4. The method according to claim 1, wherein privacy settings establish field of view limits that control the ranges of panning, tilting, or zooming of the at least one image capture device.

5. The method according to claim 4, wherein the remote viewer can direct image capture within the local site, but only within the field of view limits.

6. The method according to claim 4, wherein the portions of the video images corresponding to the limited portions of the field of view are modified by image altering methods, including cropping, blurring, or shading.

7. The method according to claim 1, wherein the initial privacy settings are at least one of default privacy settings and are settings determined during a preview mode.

8. The method according to claim 1 wherein the video context is determined from by identifying contextual cues in the video images that include at least one of event classifications, user classifications, user identity, user gestures, and user behaviors.

9. The method according to claim 1 wherein the video context is determined with respect to defined automatic video capture modes that each specify a range of defined video capture settings, the automatic video capture modes including at least one of a fully automatic mode, a semi-automatic mode, a preview mode, a lock and follow mode, a hierarchical mode, a portable mode, a media space, and a mode selected based upon an event classification.

10. The method according to claim 1 wherein the privacy settings relating to video content, define or are defined by, factors including image display, audio usage, body gestures, personal body privacy, user identity, remote viewer identity, or objects present in a capture field of view.

11. A video communication system for controlling audio or video content shared between a video communication device at a local site, and a remote a video communication device, the system operating during a communication event and comprising:
   at least two video communication devices, each having:
      an image display device;
      at least one image capture device which acquires video images of the local environment, and individuals therein, according to defined video capture settings;
      an audio system having both an audio emission device and an audio capture device; and
      a computer, which is operable to enable a privacy interface, a contextual interface including a scene analysis algorithm, an image processor, and a communication controller which enables transmission between local and remote video communication devices during a communication event;
   wherein the privacy interface allows a user to establish provides privacy settings that control the capture, transmission, display, or recording of video image content from the local environment; and
   wherein the contextual interface is adapted to use the scene analysis algorithm to assess the video images captured by the at least one image capture device and to automatically determine a contextual classification for the communication event based upon the video images and to determine a video context based at least in part using a determined contextual classification for the communication event and the video images, and
   wherein the contextual interface further automatically determines new privacy settings in accordance with the determined video context, and wherein the image processor modifies outgoing transmitted video in accordance with both the new and user provided privacy settings.

12. The system of claim 11, wherein the computer adjusts the operation of the at least one image capture device or the image processor to control the video image content in accordance with the determined modifications.

13. The system according to claim 11, wherein the privacy settings are expressed as privacy setting metrics, which are to used by the scene analysis algorithm to correlate the privacy settings with the video context.

14. The system according to claim 11, wherein the modification defines a limit of a field of view captured by the at least one image capture device.

15. The system according to claim 11, wherein said modification causes a portion of a captured field of view of the at least one image capture device not to be displayed, transmitted, or recorded.

16. The system according to claim 11, wherein the image display device at the local site displays with a split screen, a split screen image portion showing images of the local environment that includes both the outgoing image and at least some image portions effected by privacy settings, including at least one captured field of view omitted by the current privacy settings.

17. The system according to claim 11, wherein shared video image content originating with the remote viewer is modified to conform to privacy settings provided at the local site.

18. The system according to claim 11, wherein access to the privacy interface, and the privacy settings therein, is limited in a variable way relative to different individuals at the local site.

19. The system according to claim 11, wherein the privacy interface enables visual or audio alerts to indicate the occurrence of local image capture, image transmission environment to a remote viewer, or local or remote recording of the local image content.

20. The system according to claim 11 wherein the video context is determined by identifying contextual cues in the video images that include at least one of event classifications, user classifications, user identity, user gestures, and user behaviors.

21. The system according to claim 11 wherein the video context is determined with respect to defined automatic video capture modes that each specify a range of defined video capture settings, the automatic video capture modes including at least one of a fully automatic mode, a semi-automatic mode, a preview mode, a lock and follow mode, a hierarchical mode, a portable mode, a media space, and a mode determined based upon an event classification.

22. The system according to claim 11 wherein the privacy settings relating to video content, define or are defined by, factors including at least one of image display, audio usage, body gestures, personal body privacy, user identity, remote viewer identity, and objects present in a capture field of view.

* * * * *